Figure 1:
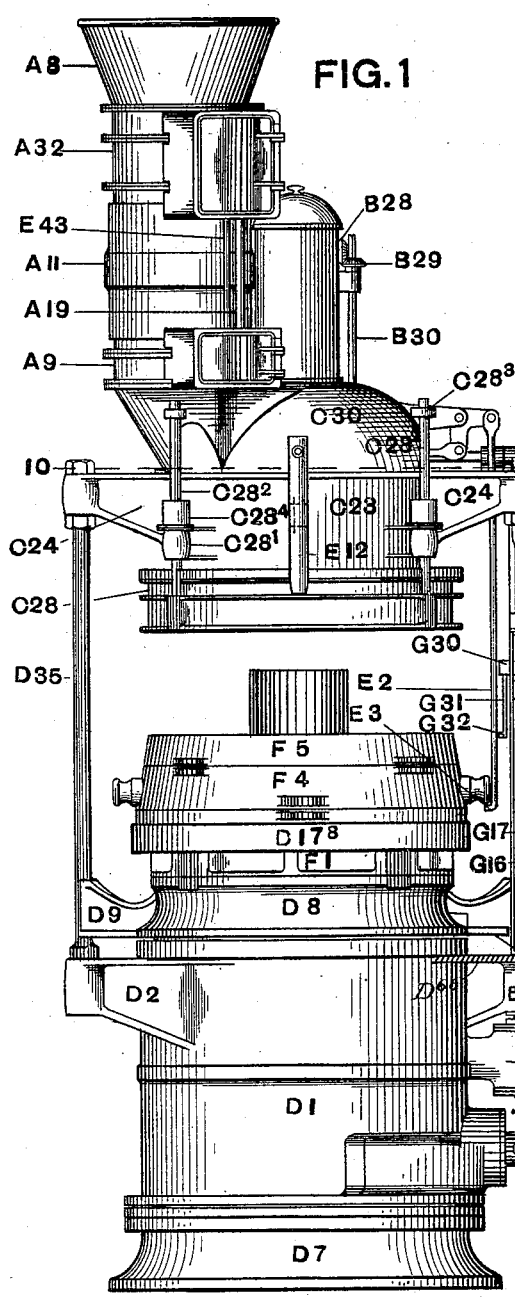

No. 632,242.  
H. C. COOPER.  
MOLDING MACHINE.  
(Application filed Dec. 19, 1898.)  
Patented Sept. 5, 1899.

(No Model.)  
20 Sheets—Sheet 1.

WITNESSES  
INVENTOR  
Harry C. Cooper  
BY  
ATTORNEY.

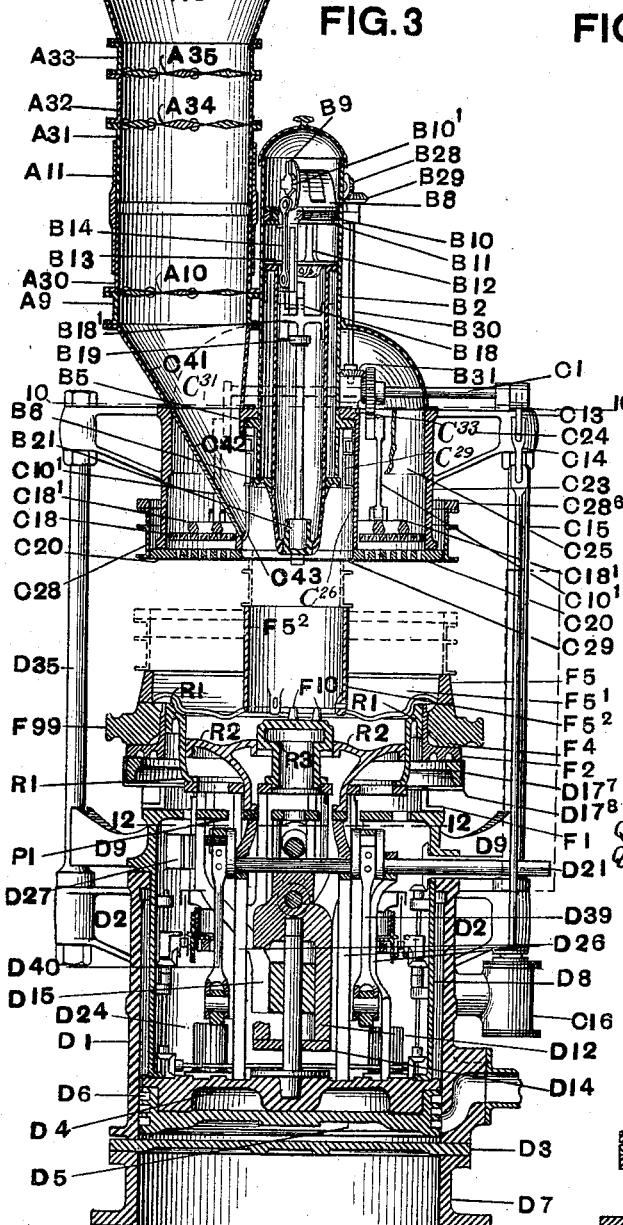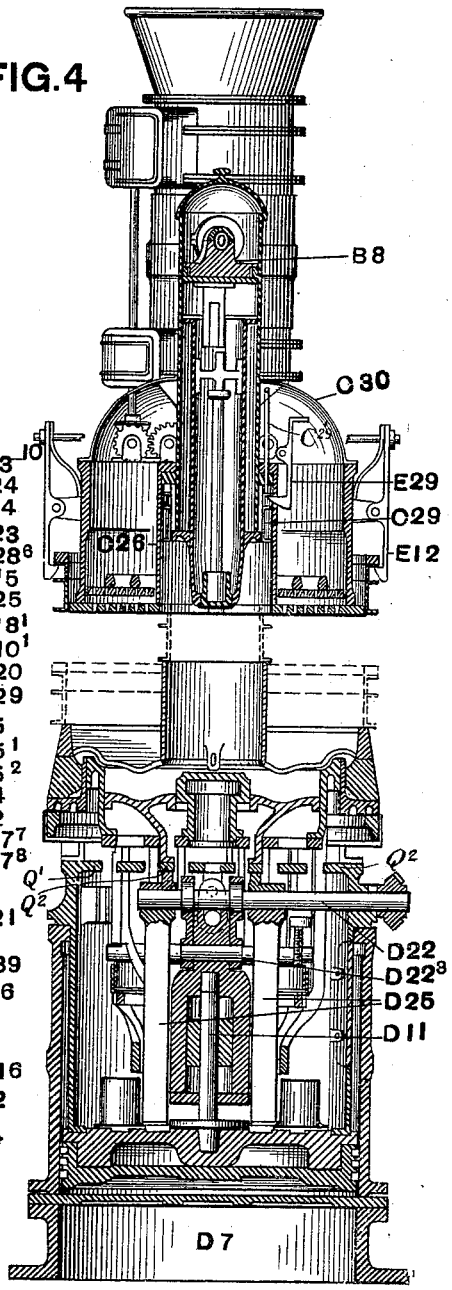

No. 632,242. Patented Sept. 5, 1899.
H. C. COOPER.
MOLDING MACHINE.
(Application filed Dec. 19, 1898.)
(No Model.) 20 Sheets—Sheet 3.
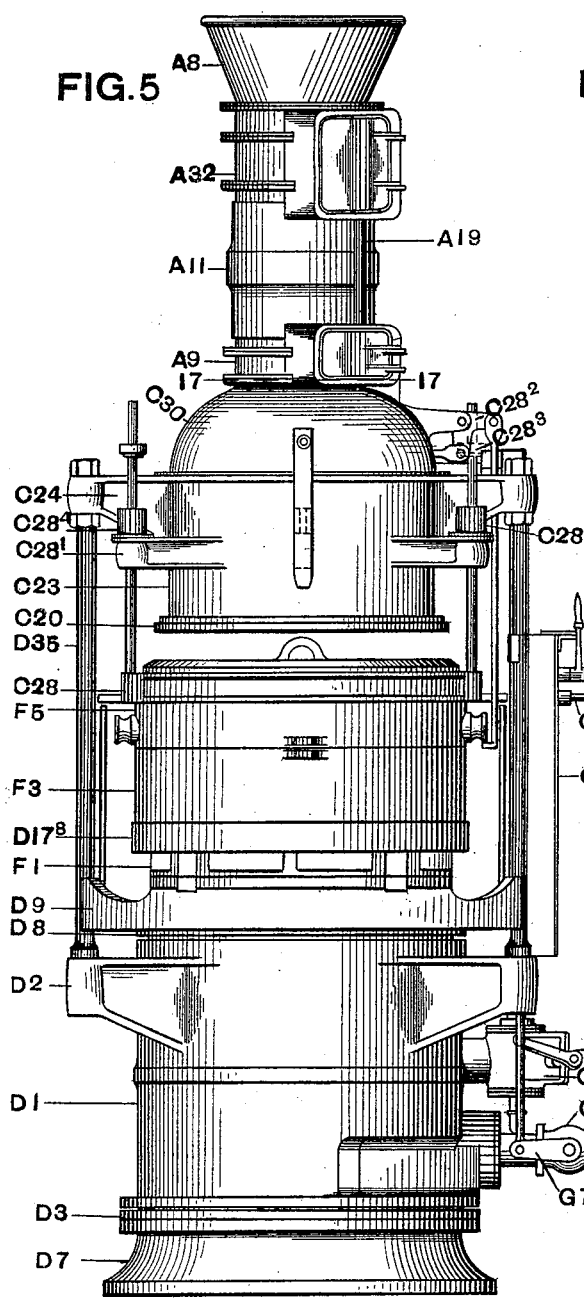
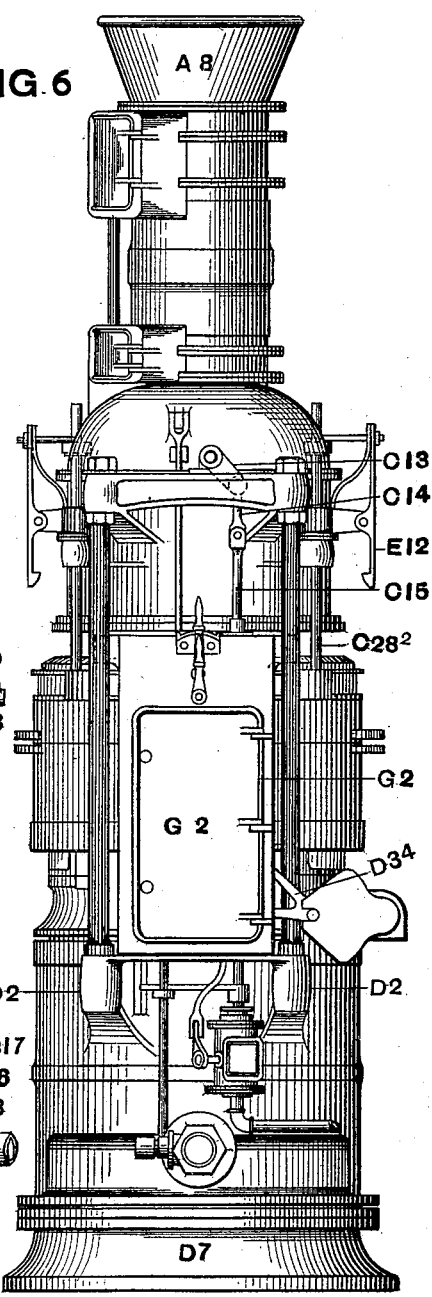
WITNESSES:
INVENTOR
Harry C. Cooper
BY
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 4.
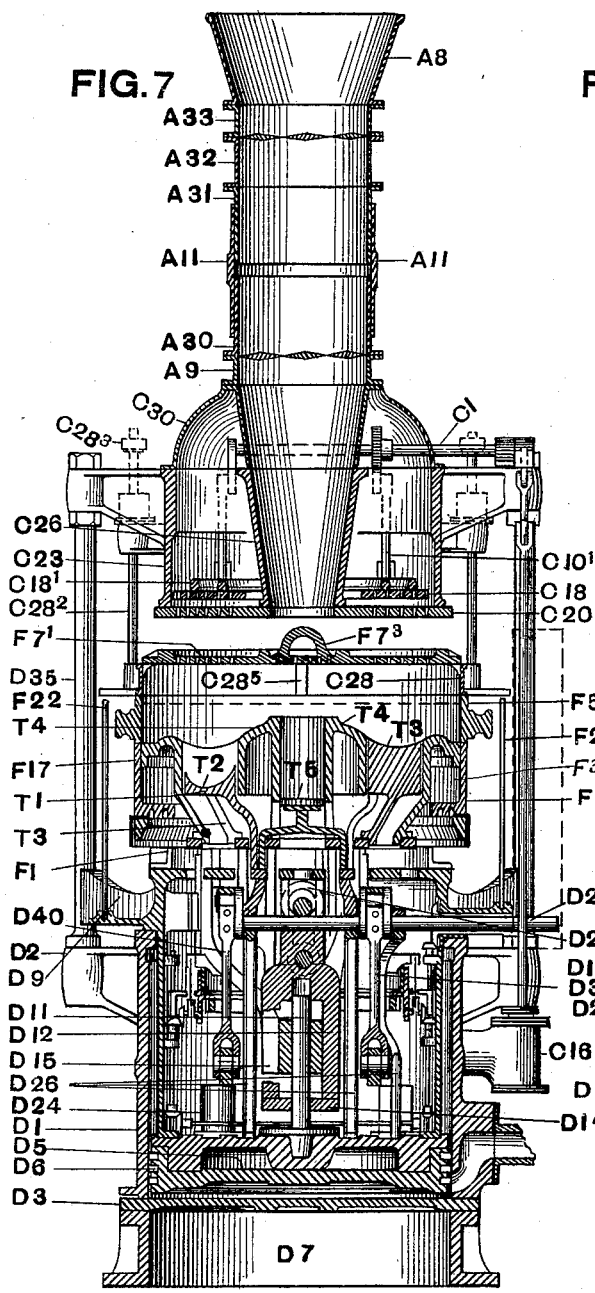
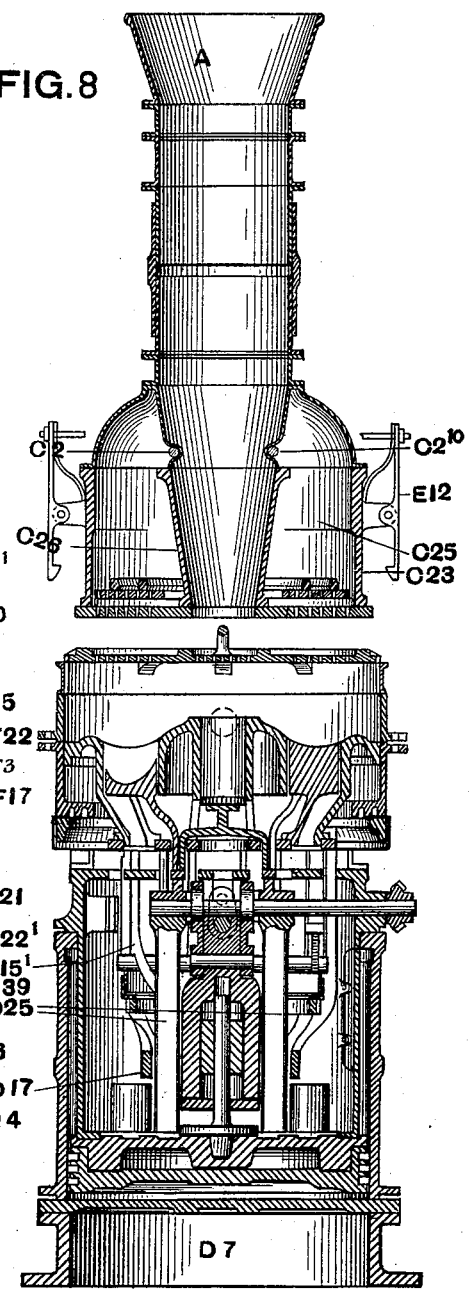
WITNESSES:
INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 5.
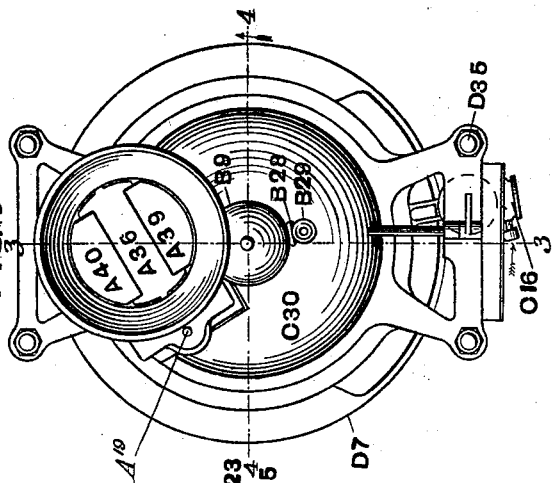
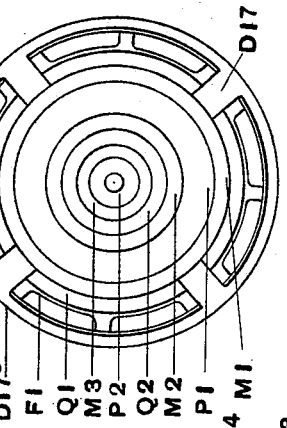
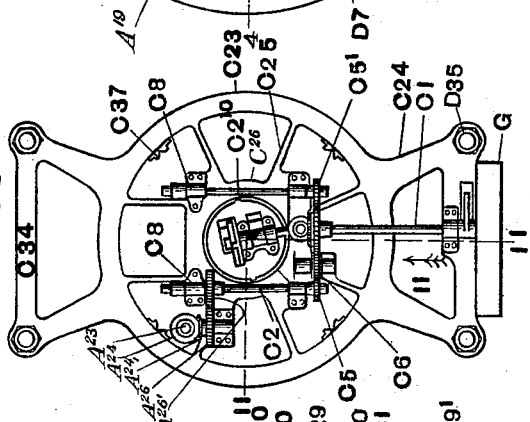
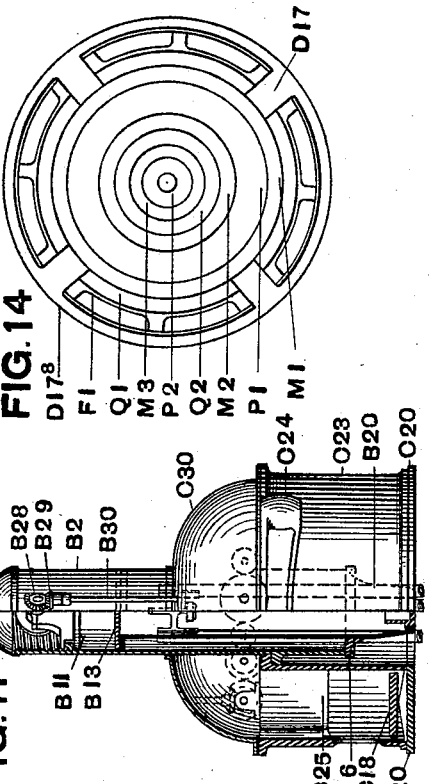
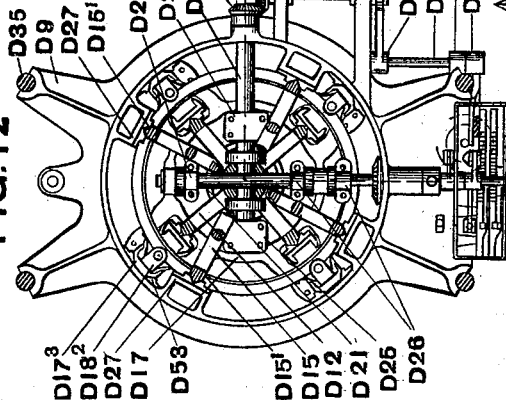
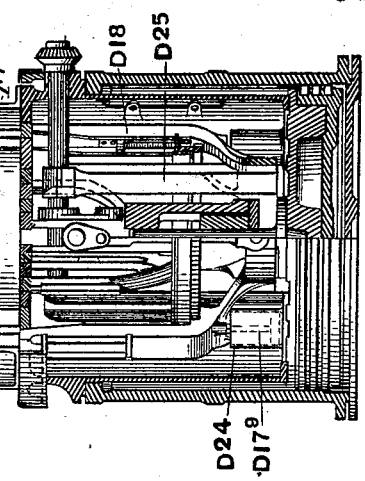
WITNESSES
INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 6.
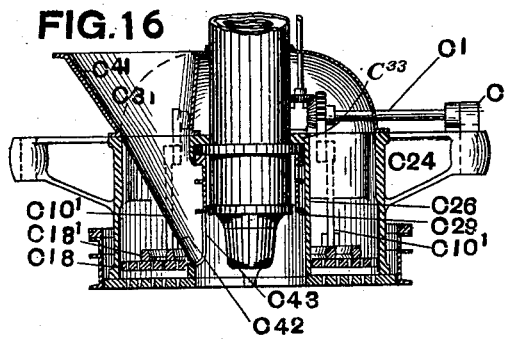
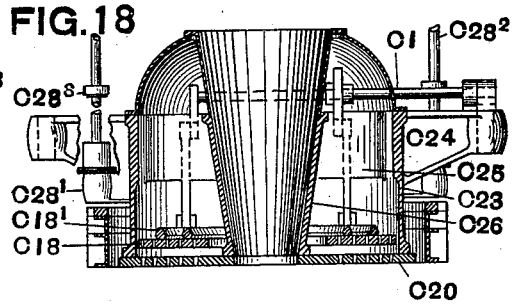
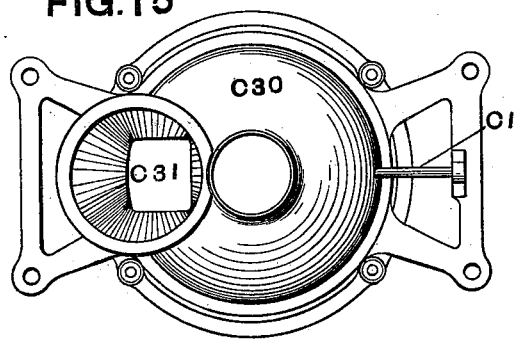
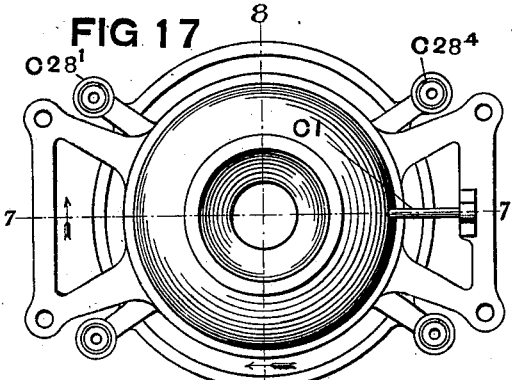
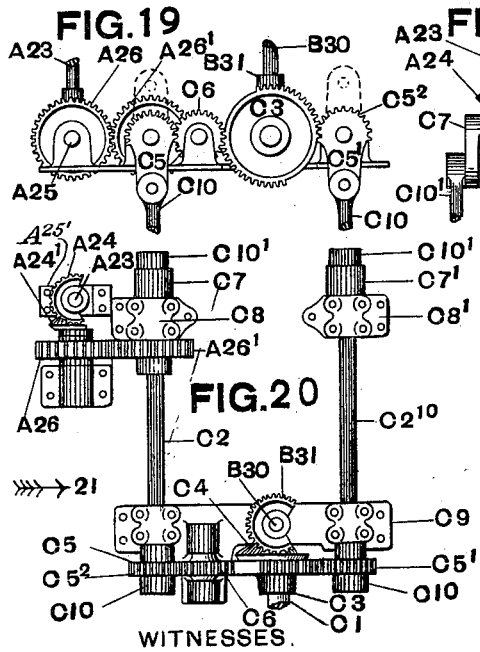
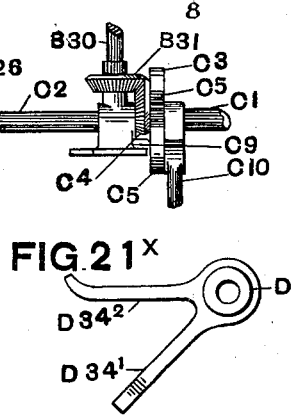
WITNESSES.
INVENTOR
Harry C. Cooper
BY
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 7.
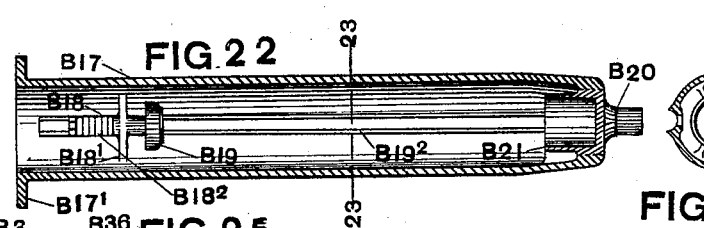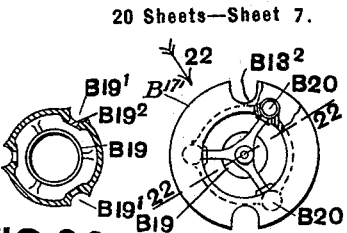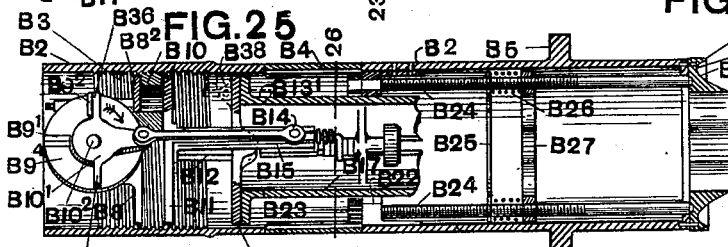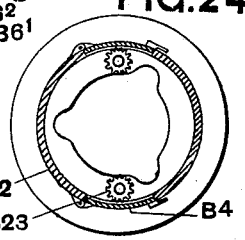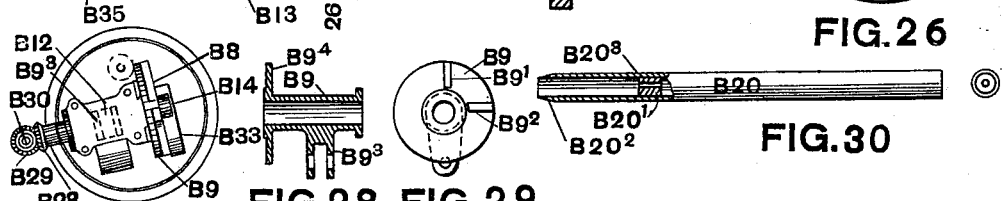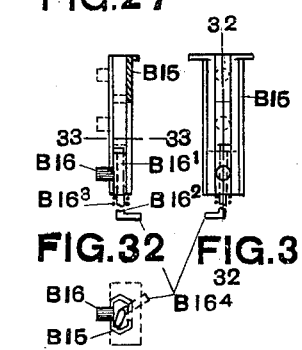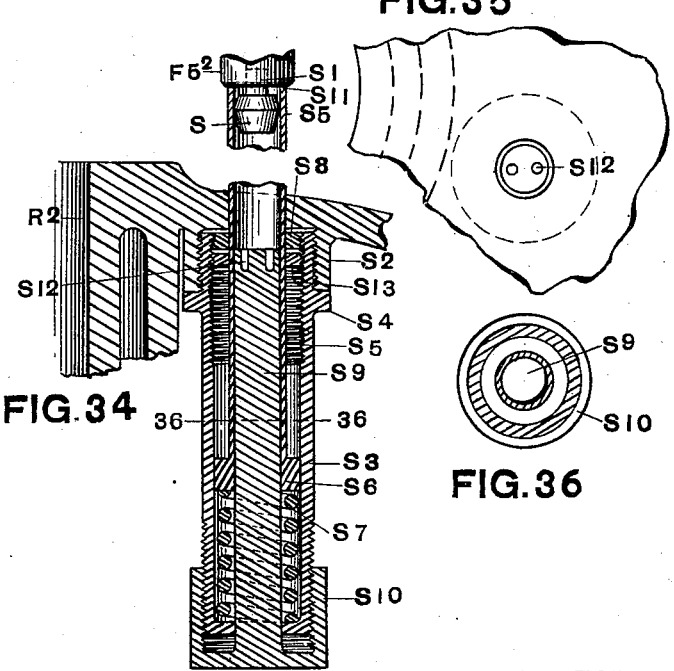
WITNESSES:
INVENTOR
Harry C. Cooper
BY
Walter H. Chamberlin
ATTORNEY.

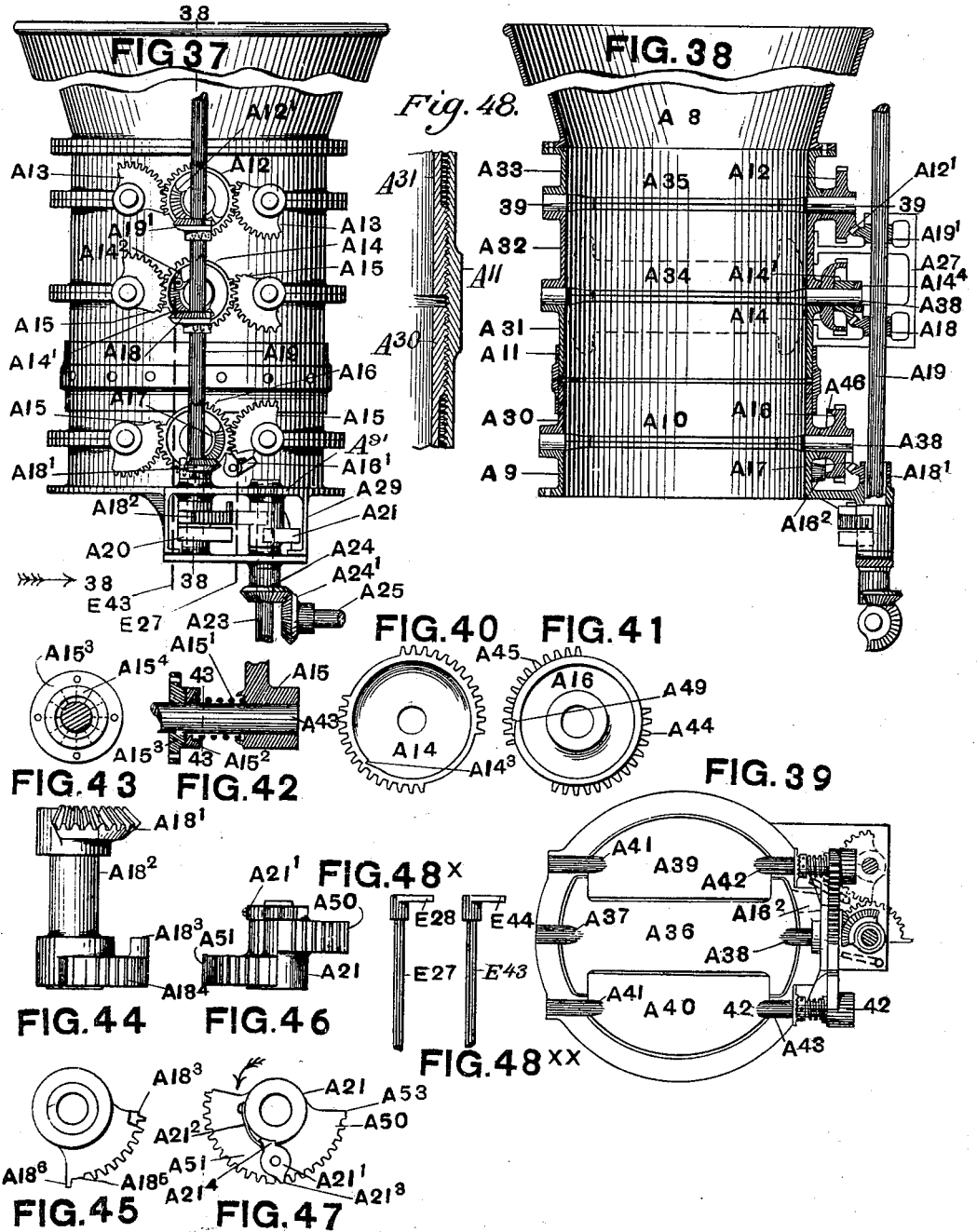

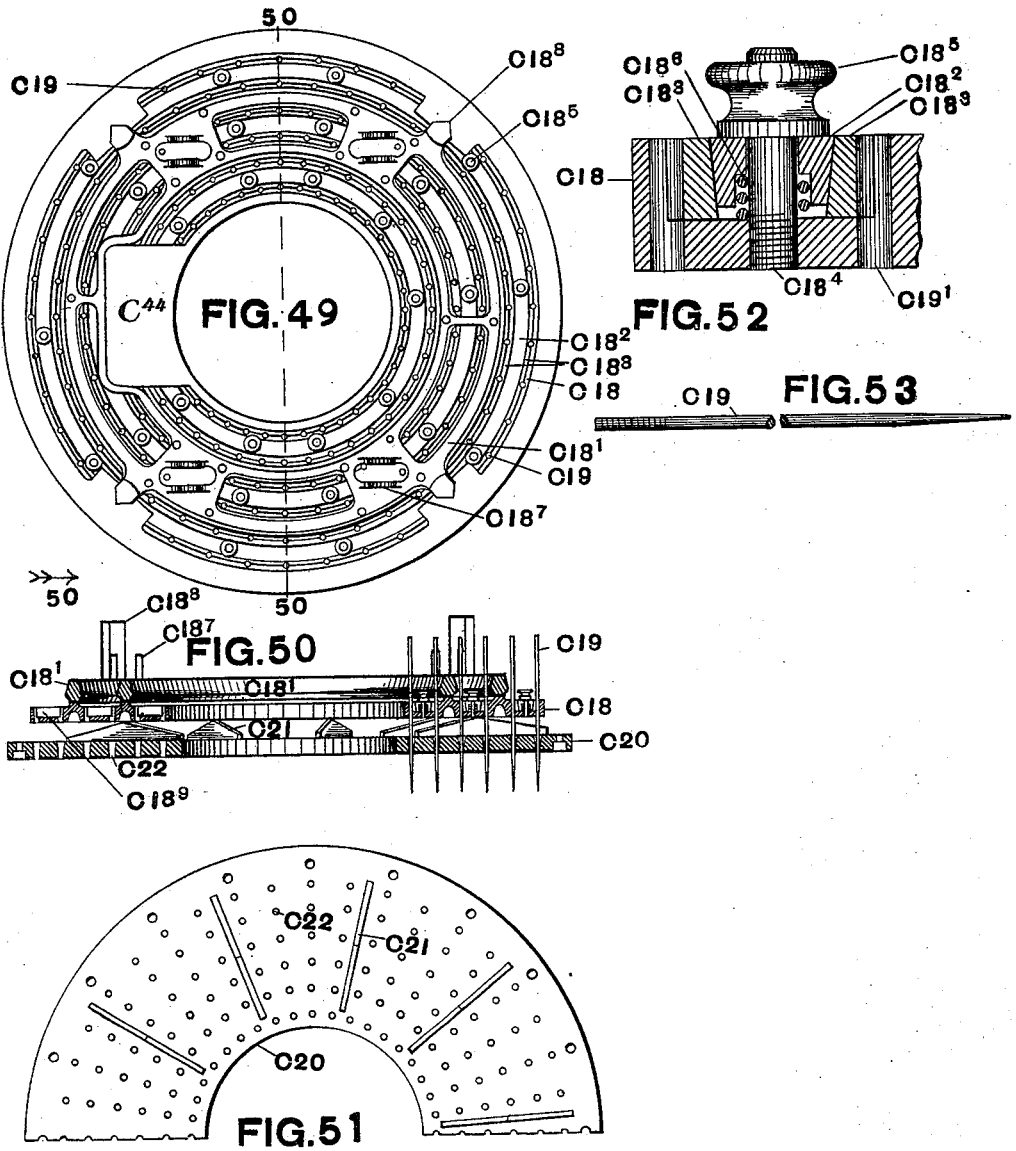

No. 632,242. Patented Sept. 5, 1899.
H. C. COOPER.
MOLDING MACHINE.
(Application filed Dec. 19, 1898.)
(No Model.) 20 Sheets—Sheet 10.
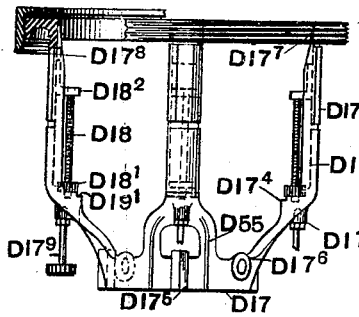
FIG. 54
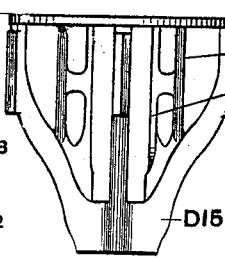
FIG. 56
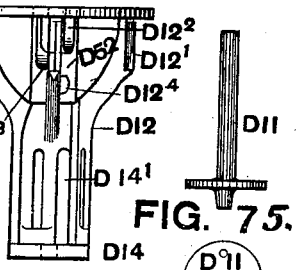
FIG. 58 FIG. 75. FIG. 76.
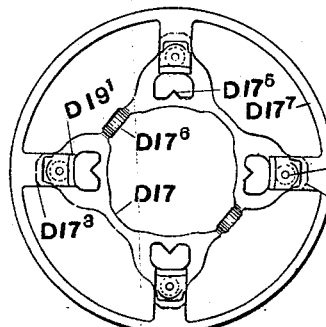
FIG. 55
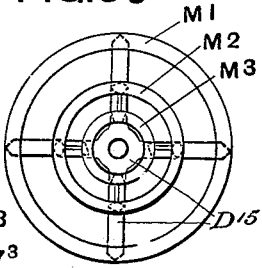
FIG. 57 FIG. 59 FIG. 73.
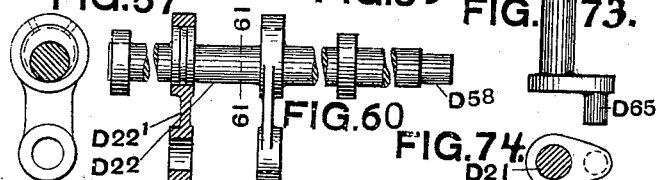
FIG. 61 FIG. 60 FIG. 74.
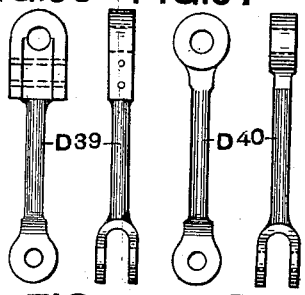
FIG. 65 FIG. 67
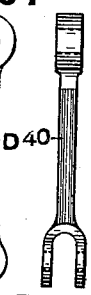
FIG. 66 FIG. 68
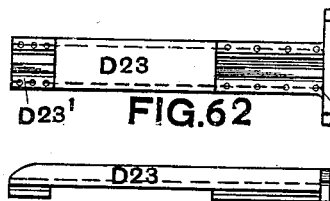
FIG. 62
FIG. 63
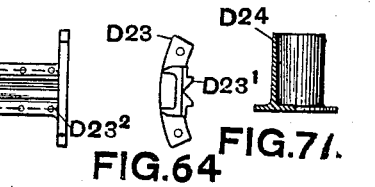
FIG. 64 FIG. 71.
FIG. 72.
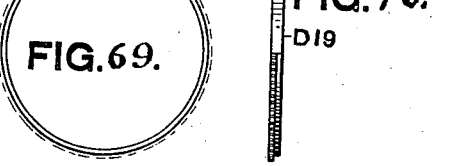
FIG. 69. FIG. 70.
WITNESSES
INVENTOR
Harry C. Cooper
BY
Walter W. Chamberlin
ATTORNEY.

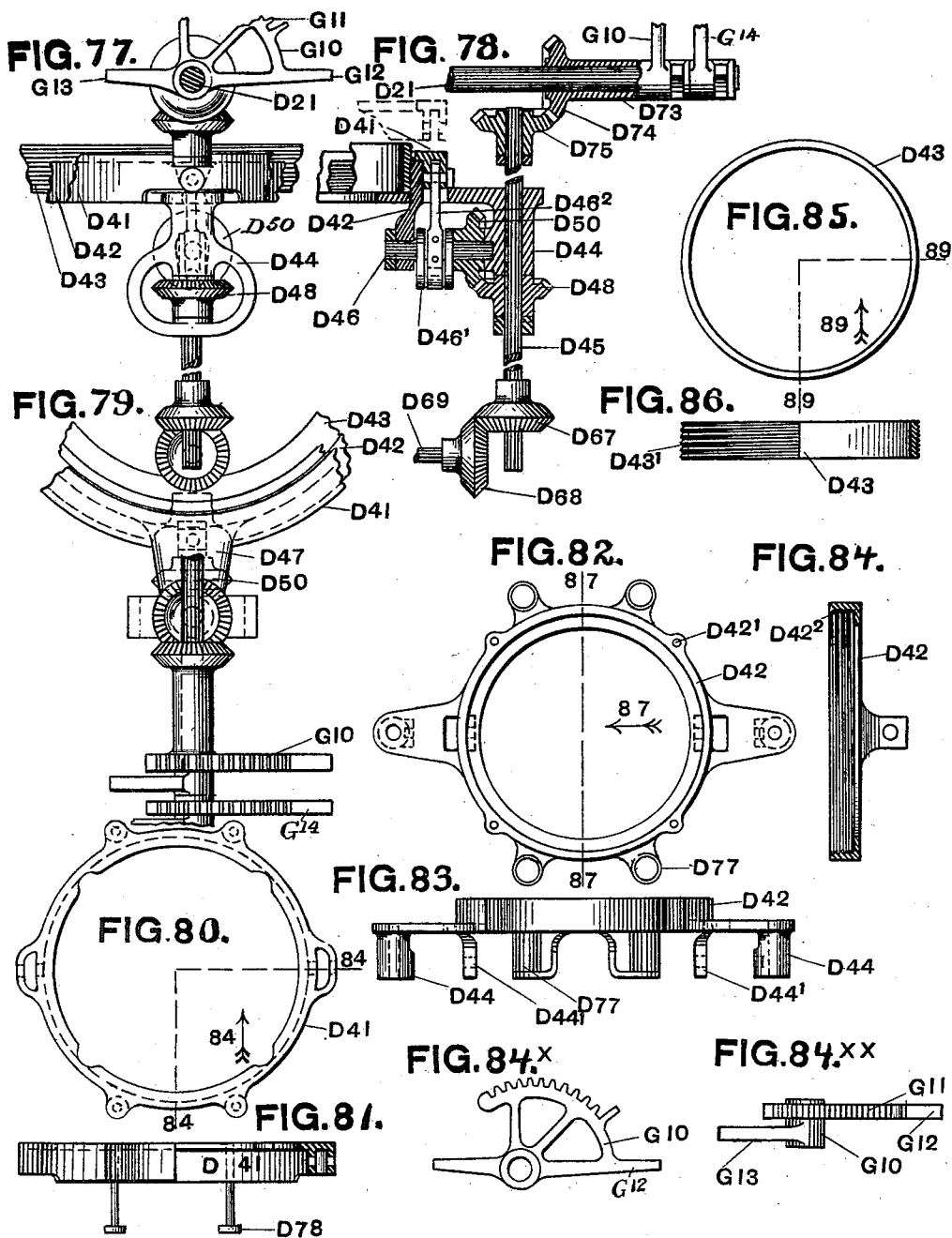

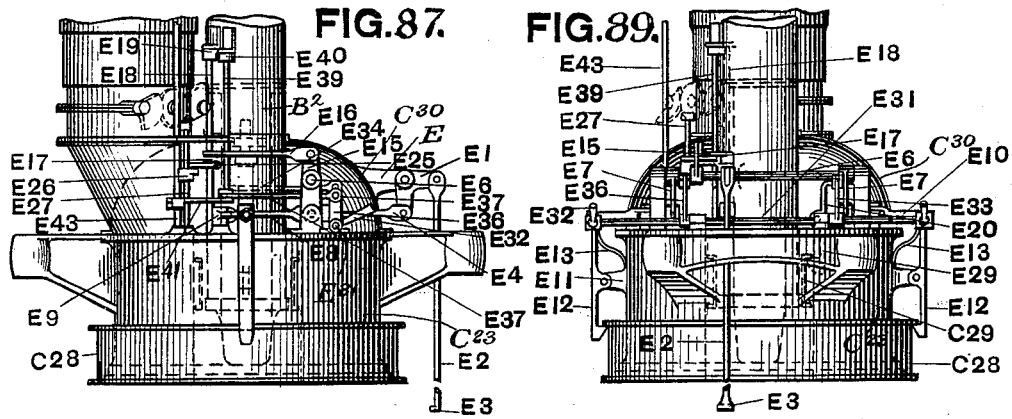
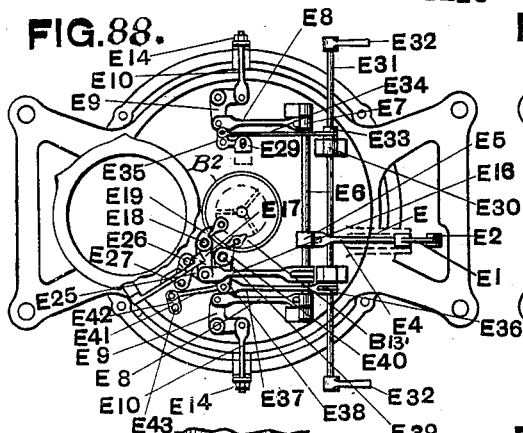
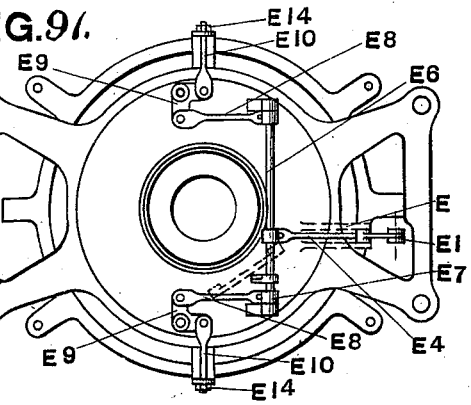
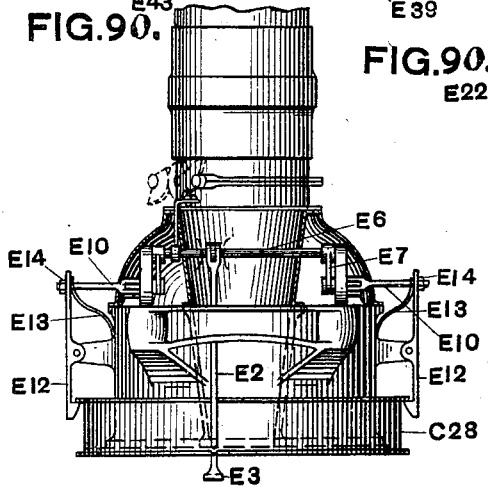
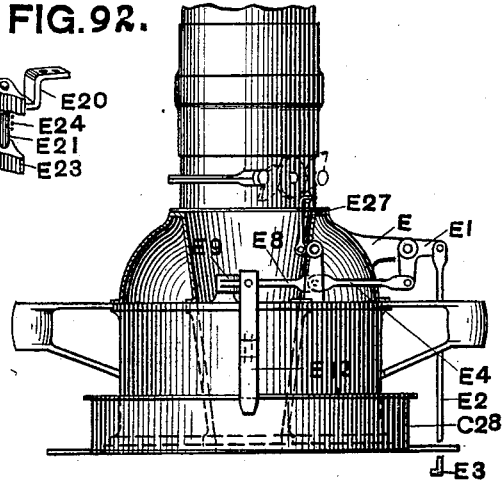

No. 632,242. Patented Sept. 5, 1899.
H. C. COOPER.
MOLDING MACHINE.
(Application filed Dec. 19, 1898.)
(No Model.) 20 Sheets—Sheet 13.
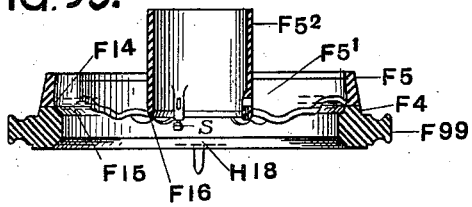
FIG. 93.
FIG. 95.
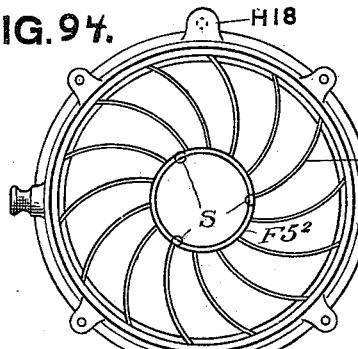
FIG. 94.
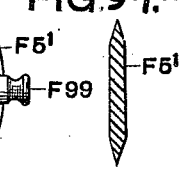
FIG. 94.x
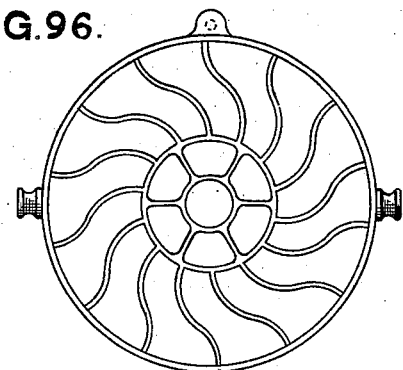
FIG. 96.
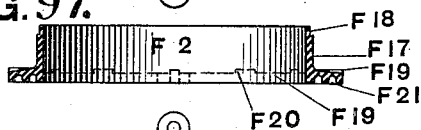
FIG. 97.
FIG. 99.
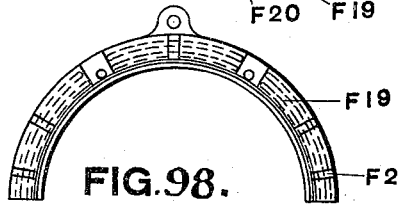
FIG. 98.
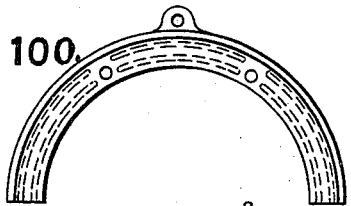
FIG. 100.
FIG. 101.
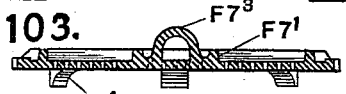
FIG. 103.
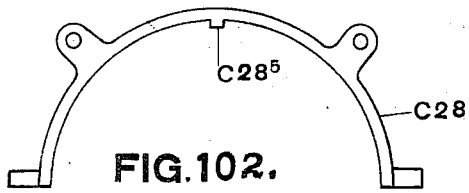
FIG. 102.
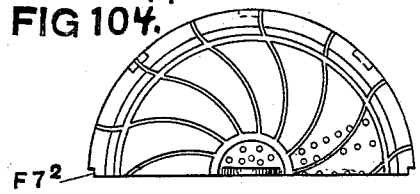
FIG. 104.
WITNESSES:
J. H. Glendening
J. H. Weber
INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 14.
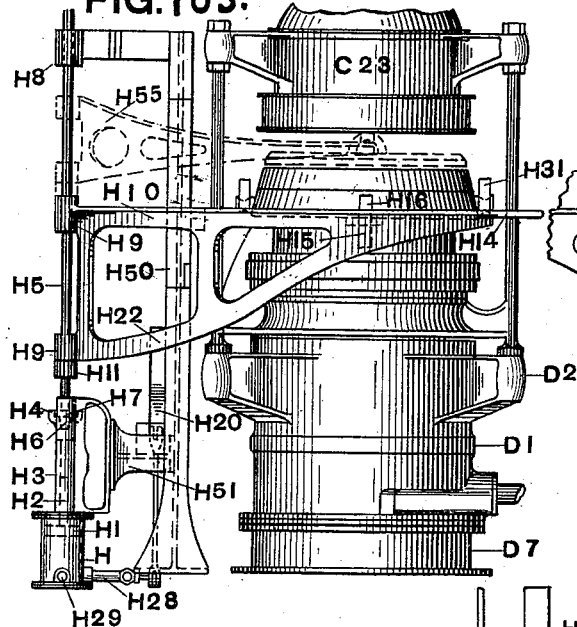
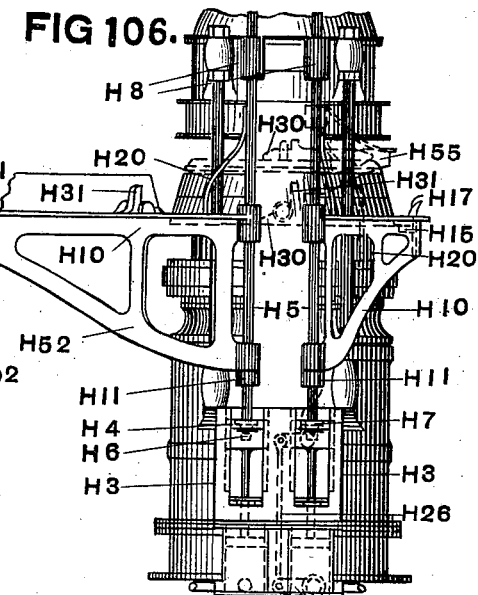
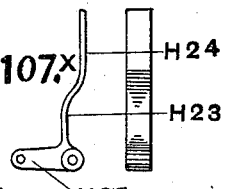
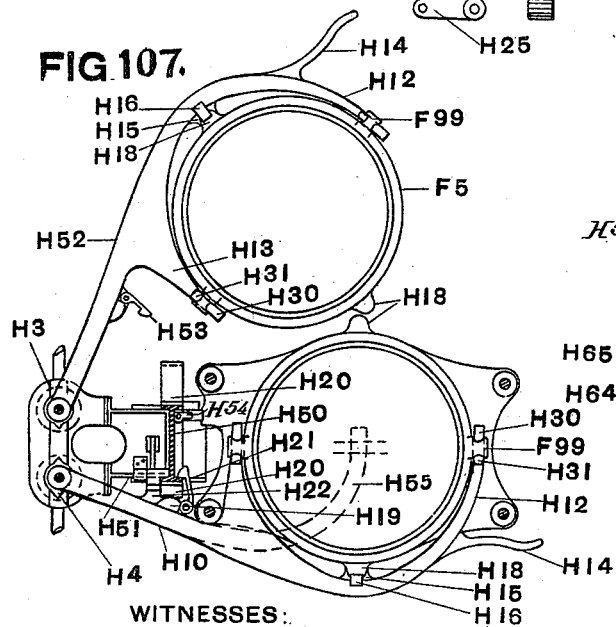
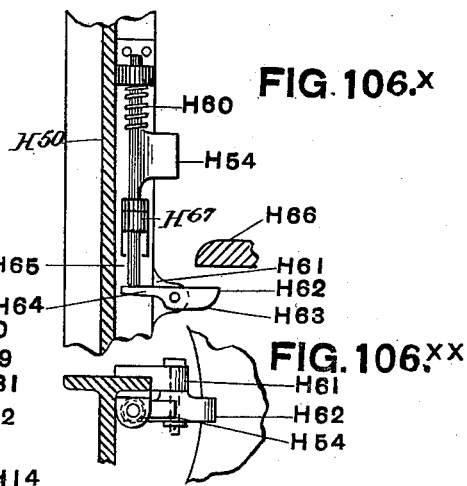
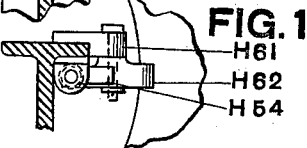
WITNESSES:
INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 15.
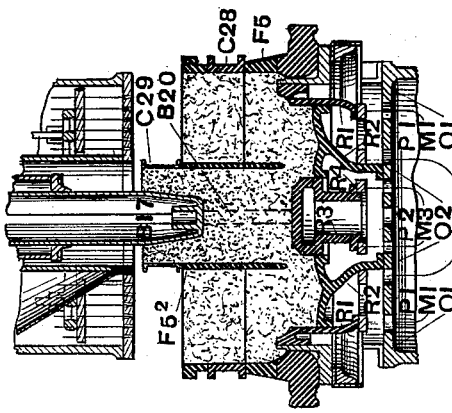
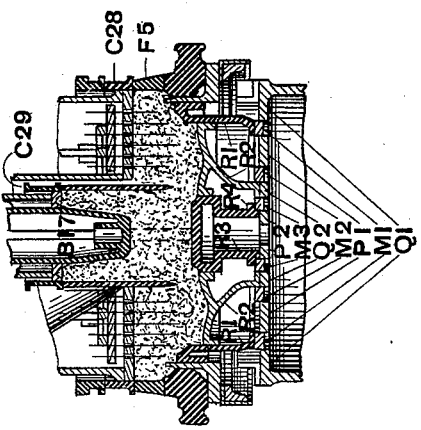
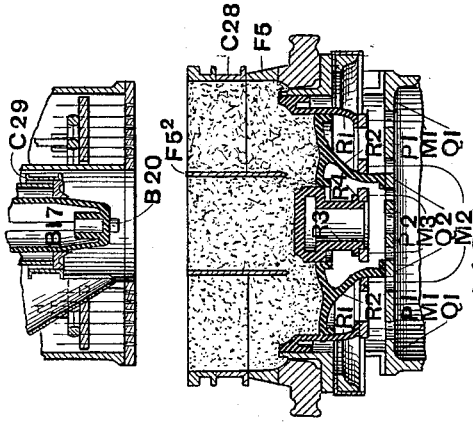
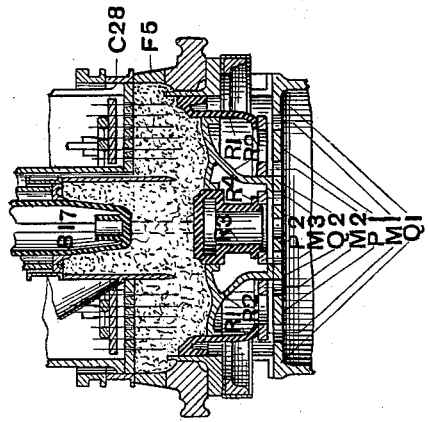
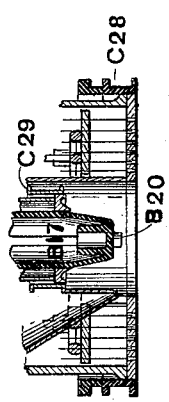
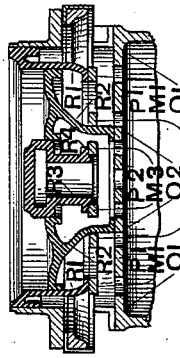
WITNESSES: INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)
(No Model.) 20 Sheets—Sheet 16.

WITNESSES:

INVENTOR
Harry C. Cooper
BY
ATTORNEY.

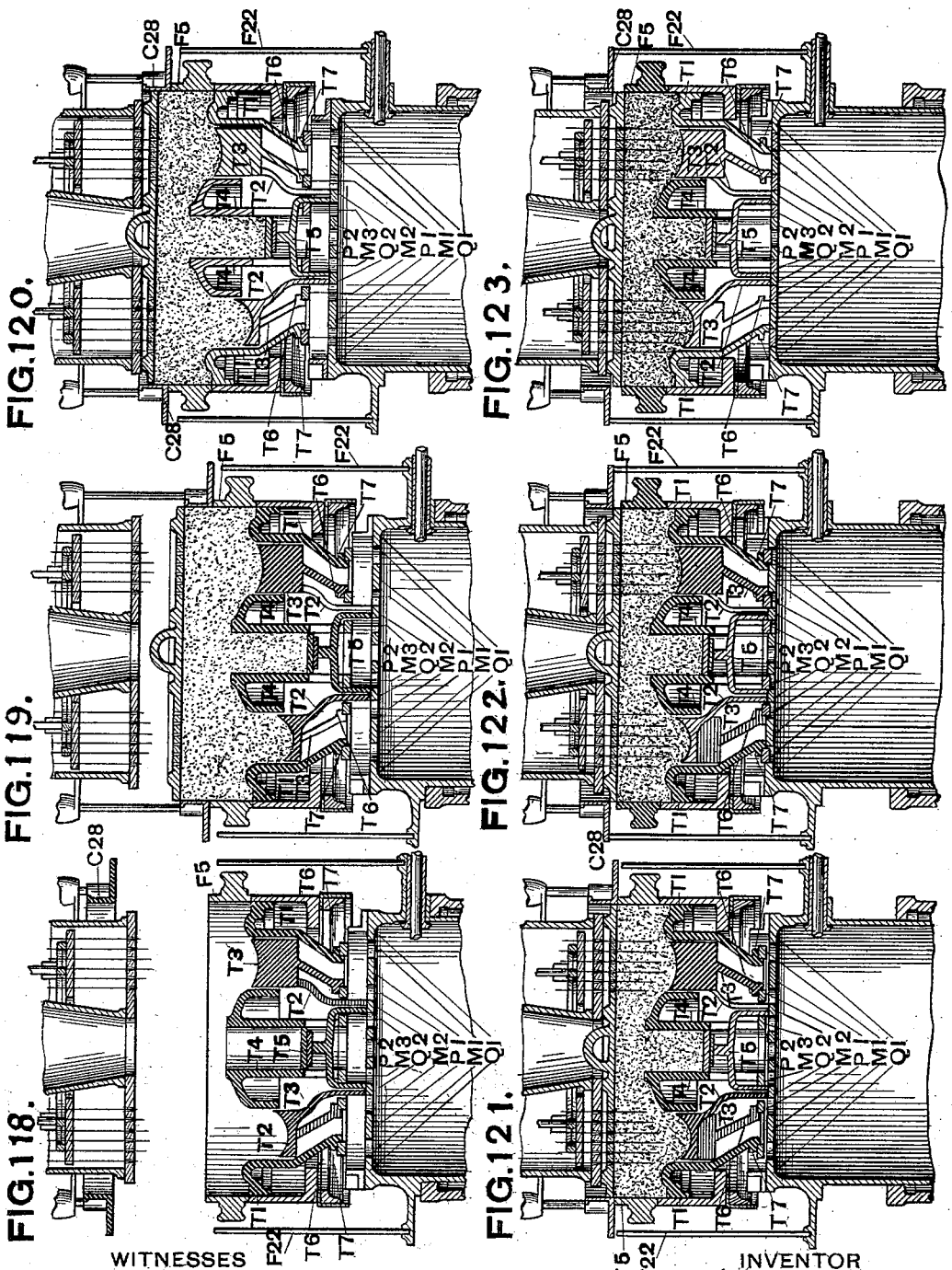

No. 632,242. Patented Sept. 5, 1899.
H. C. COOPER.
MOLDING MACHINE.
(Application filed Dec. 19, 1898.)
(No Model.) 20 Sheets—Sheet 18.
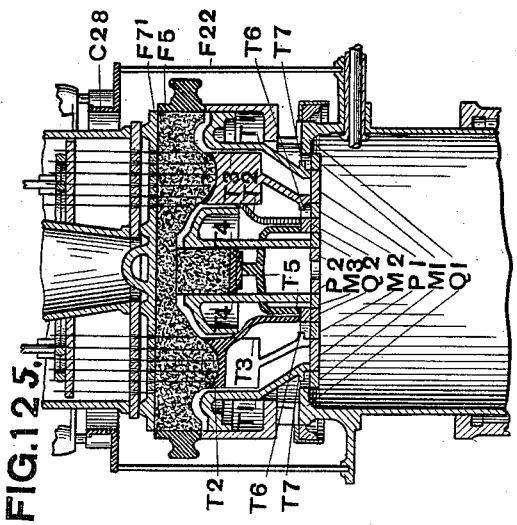
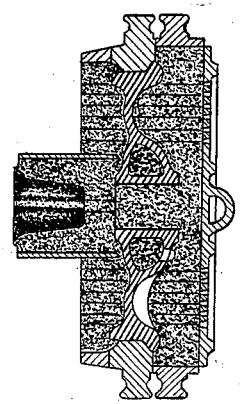
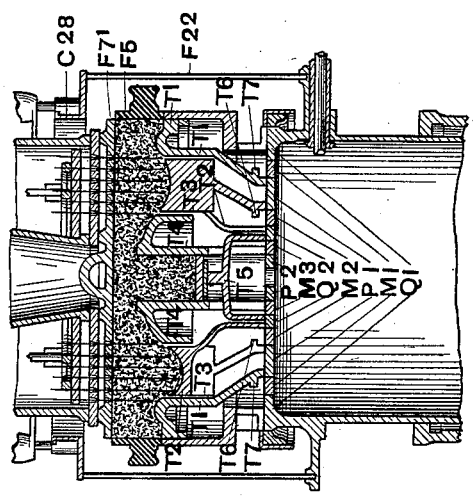
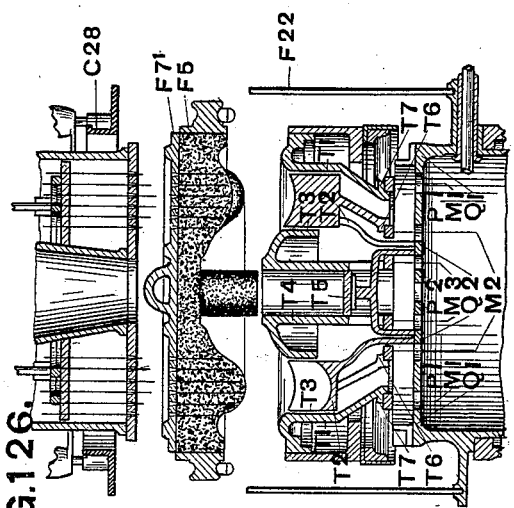
WITNESSES:
INVENTOR
Harry C. Cooper
BY
Walter H. Chamberlin
ATTORNEY.

No. 632,242. Patented Sept. 5, 1899.
H. C. COOPER.
MOLDING MACHINE.
(Application filed Dec. 19, 1898.)

(No Model.) 20 Sheets—Sheet 19.

WITNESSES: INVENTOR
Harry C. Cooper
BY
ATTORNEY.

No. 632,242. H. C. COOPER. Patented Sept. 5, 1899.
MOLDING MACHINE.
(Application filed Dec. 19, 1898.)

(No Model.) 20 Sheets—Sheet 20.

WITNESSES:

INVENTOR
Harry C. Cooper
BY
Walter H. Chamberlin
ATTORNEY.

UNITED STATES PATENT OFFICE.

HARRY C. COOPER, OF CHICAGO, ILLINOIS.

MOLDING-MACHINE.

SPECIFICATION forming part of Letters Patent No. 632,242, dated September 5, 1899.

Application filed December 19, 1898. Serial No. 699,720. (No model.)

*To all whom it may concern:*

Be it known that I, HARRY C. COOPER, a citizen of the United States, residing at Chicago, county of Cook, State of Illinois, have invented a certain new and useful Improvement in Molding-Machines; and I declare the following to be a full, clear, and exact description of the invention, such as will enable others skilled in the art to which it pertains to make and use the same, reference being had to the accompanying drawings, which form a part of this specification.

My invention has for its object the production of a molding-machine of that class wherein the pattern is suitably supported on vertically-movable mechanism and the sand composing the mold is discharged from above onto the pattern and the proper pressure then obtained through a series of mechanical movements.

The machine comprises several sets of mechanisms, among which are the following: mechanism for picking up the flask and properly placing it in the machine, mechanism for dropping the outer false flask onto the flask proper, mechanism for dropping the sprues into the flask, mechanism for discharging into the flask, and consequently onto the pattern, a suitable amount of sand for the preliminary operation, mechanism for dropping the inner false flask onto the cope, mechanism for dropping into the flask a plunger to assist in properly packing the sand, mechanism for dropping into the flask an additional body of sand, mechanism for moving the pattern upward into the flask, (this feature of the mechanism embodying several distinct operations for moving the different sections of the pattern and adjacent parts,) mechanism for inserting into the sand suitable vent-pins, mechanism for filling the sand-reservoir, mechanism for withdrawing the vent-pins, sprues, and plunger, mechanism for stripping the patterns from the sand, (this feature embodying several mechanical movements for stripping the patterns in parts,) mechanism for returning the pattern-supporting mechanism to its normal position, and mechanism for transferring the flask containing the sand-mold from the machine.

While I have just enumerated the various sets of mechanism which go to make up my completed machine, yet I wish it understood at the outset that my invention is not necessarily limited to a series of mechanisms operating in the chronological order above set forth or embodying necessarily all of the above mechanisms, the above enumerations being simply for convenience in describing the various mechanisms. I also desire at this point to call attention to the fact that my present application shows and describes both a cope-machine and a drag-machine—that is to say, a machine for forming the cope and another machine of substantially the same structure as the first and only modified sufficiently to properly form the drag—the two machines being in all essential particulars identical and one being a modification of the other only to the extent necessary to form the different parts of the mold. In my description which follows I will therefore describe first the cope-machine inasmuch as the drag-machine is the cope-machine with certain mechanisms omitted and the proper modifications made.

Figure 2:
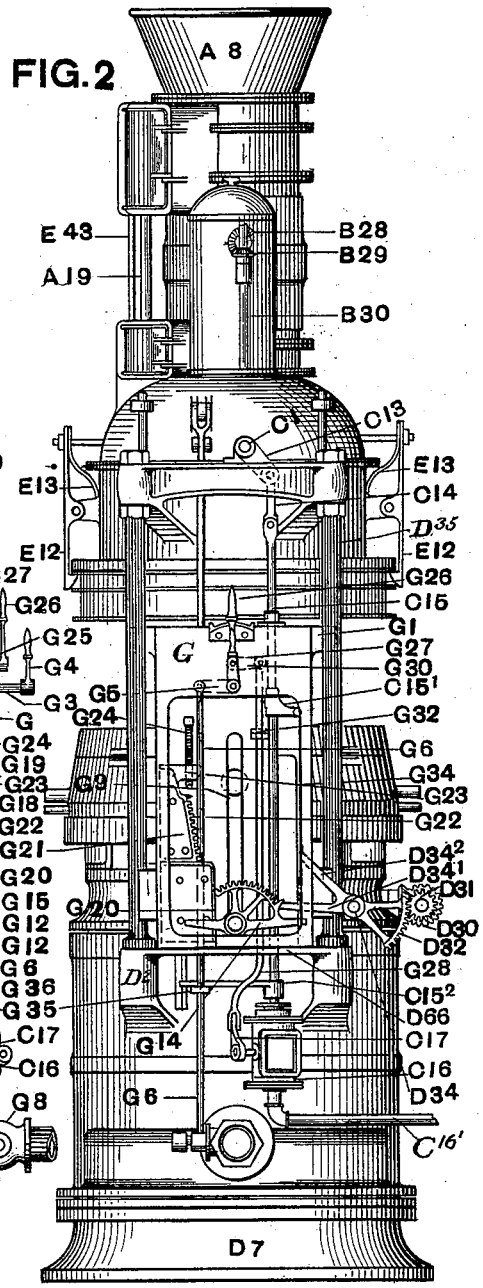
Figure 115:
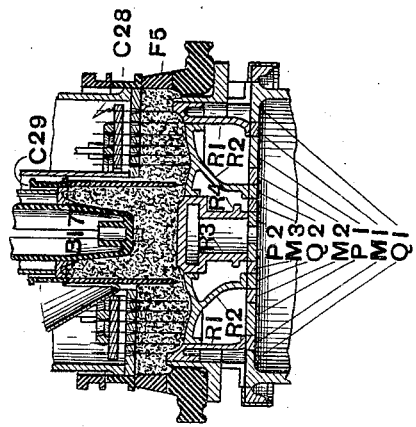
Figure 117:
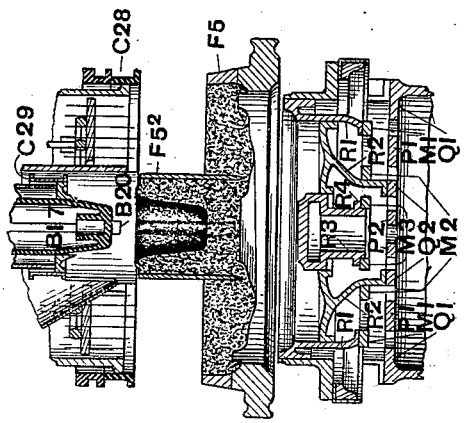
Figure 128:
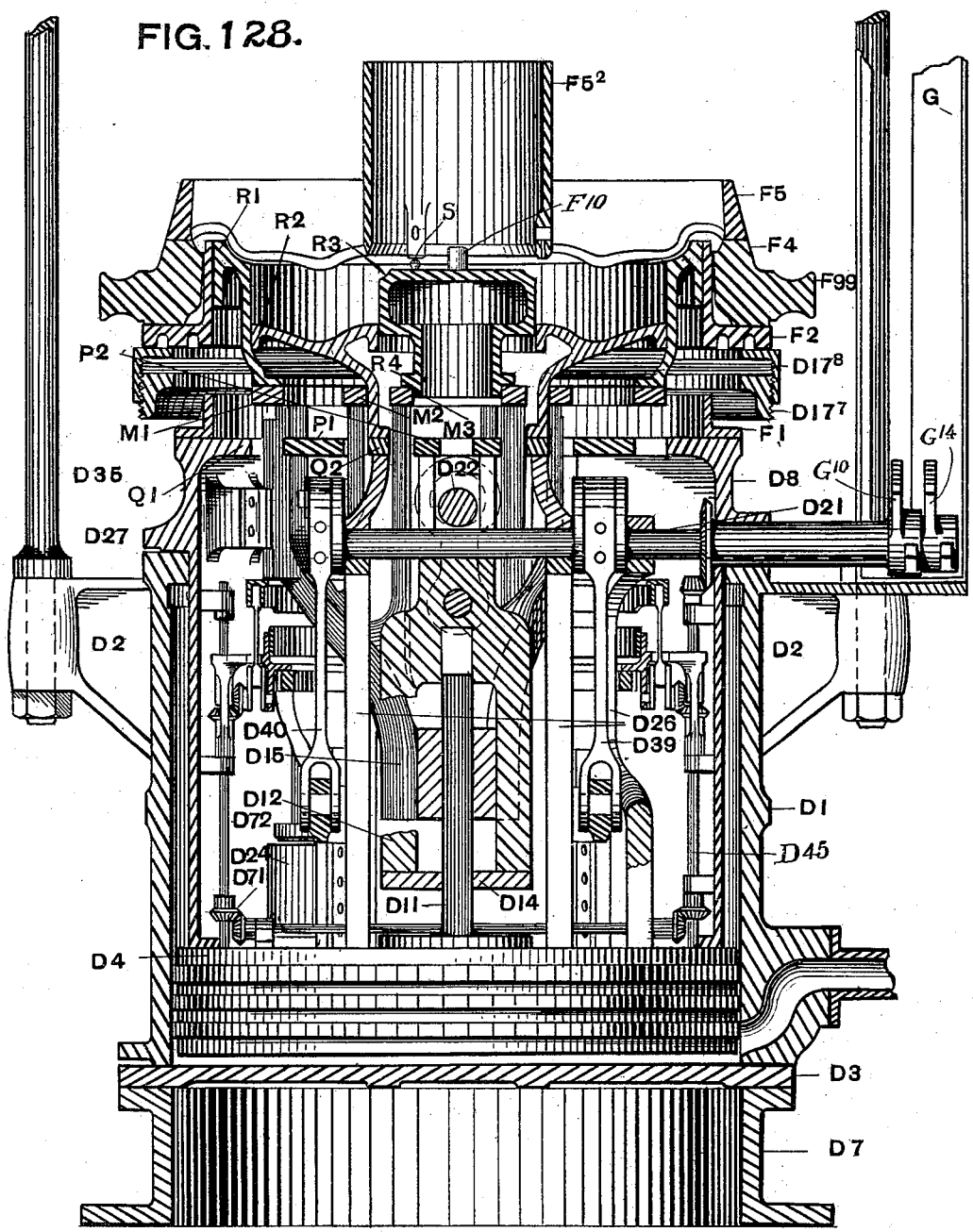
Figures 135, 136:
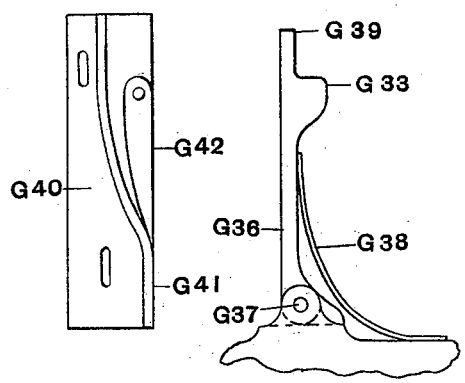
Figures 137, 138:
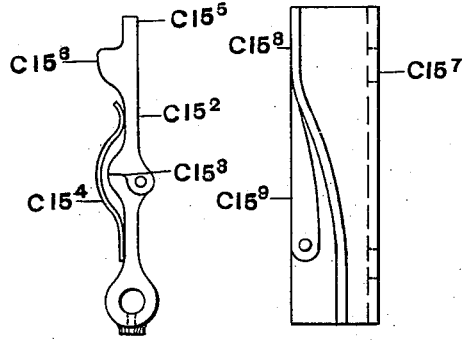

In the drawings, Figure 1 is a side elevation of the cope-machine. Fig. 2 is a side elevation at right angles to Fig. 1. Fig. 3 is a vertical section of the mechanism shown in Fig. 1, taken on the line 3 3 of Fig. 9. Fig. 4 is a vertical section of Fig. 2, taken on the line 4 4 of Fig. 9. Fig. 5 is a side elevation of the drag-machine. Fig. 6 is a side elevation at right angles to Fig. 5. Fig. 7 is a vertical section of Fig. 5, taken on the line 7 7 of Fig. 17. Fig. 8 is a vertical section of Fig. 6, taken on the line 8 8 of Fig. 17. Fig. 9 is a plan view of the mechanism shown in Fig. 1. Fig. 10 is a sectional view on the line 10 10 of Figs. 1 and 3. Fig. 11 is a view, partly in elevation and partly in section, on the line 11 11, Fig. 10, looking in the direction of arrow 11. Fig. 12 is a sectional view on the line 12 12 of Fig. 3. Fig. 13 is a view, partly in elevation and partly in section, taken on the line 13 13 of Fig. 12 and looking in the direction of arrow 13. Fig. 14 is a plan view of Fig. 13. Fig. 15 is a plan view illustrating the sand-feed chute of the cope-machine. Fig. 16 is a view with the lower end of the plunger in elevation, with the latter raised, and with the parts adjacent to the plunger in section. Fig. 17 is a plan view of the drag-machine, taken on the line 17 17 of Fig. 5. Fig. 18 is a sectional view illustrating the parts of the drag-machine which correspond with those of the cope-machine shown in Fig. 16. Fig. 19 is a view of the gear mechanism for operating the sprues, plunger, vent-pins, and sand-doors. Fig. 20 is a plan view of the mechanism shown in Fig. 19. Fig. 21 is another elevation looking in the direction of arrow 21, Fig. 20. Fig. 21$^\times$ is a side elevation of the arm D$^{34}$. Fig. 21$^{\times\times}$ is a plan view of the same. Fig. 22 is a sectional view of the plunger on the line 22 22 of Fig. 24, looking in the direction of arrow 22. Fig. 23 is a cross-sectional view on the line 23 23 of Fig. 22. Fig. 24 is a view of the end of the plunger as shown in Fig. 22, with parts in section. Fig. 25 is a sectional view of the plunger-casing and adjacent parts. Fig. 26 is a cross-section on the line 26 26 of Fig. 25. Fig. 27 is a view of the end of mechanism shown in Fig. 25. Fig. 28 is a cross-section illustrating the sleeve B$^9$. Fig. 29 is an end elevation of the same. Fig. 30 is an elevation, with the parts in section, of one of the sprues. Fig. 31 is a front elevation of the mechanism for operating the sprues. Fig. 32 is a sectional view on the line 32 32 of Fig. 31. Fig. 33 is a cross-section on the line 33 33, Fig. 32. Fig. 34 is a sectional view illustrating the construction of the chaplet-adjusters. Fig. 35 is a plan view of the same. Fig. 36 is a sectional view on the line 36 36 of Fig. 34. Fig. 37 is a front elevation of the sand-reservoirs and adjacent mechanism. Fig. 38 is a sectional view on the line 38 38 of Fig. 37 in direction of arrow 38. Fig. 39 is a horizontal section on the line 39 39, Fig. 38. Fig. 40 is a detail of the gear A$^{14}$. Fig. 41 is a detail of the gear A$^{16}$, rear view. Fig. 42 is a sectional view on the line 42 42, Fig. 39. Fig. 43 is a sectional view on the line 43 43 of Fig. 42. Fig. 44 is a detail of the gear A$^{18-2}$. Fig. 45 is an end elevation of the same. Fig. 46 is a detail of the gear A$^{21}$. Fig. 47 is a plan of the same. Fig. 48 is a detail vertical section. Fig. 48$^\times$ is a detail of the tripping-rod E$^{27}$. Fig. 48$^{\times\times}$ is a detail of the tripping-rod E$^{43}$. Fig. 49 is a plan view of vent-pins, frame, and board. Fig. 50 is a sectional view on the line 50 50 of Fig. 49. Fig. 51 is a plan view of the pressure-plate. Fig. 52 is a sectional detail illustrating the clamping arrangements for the vent-pins. Fig. 53 is a detail of one of the vent-pins. Fig. 54 is an elevation, with parts in section, of the outer section or frame of the flask and pattern-supporting mechanism D$^{17}$. Fig. 55 is a plan view of the same. Fig. 56 is an elevation of the middle section or frame of the pattern-supporting mechanism D$^{15}$. Fig. 57 is a plan view of the same. Fig. 58 is an elevation of the inner section or frame of the pattern-supporting mechanism D$^{12}$. Fig. 59 is a plan view of the same. Fig. 60 is a detail of the eccentric-shaft. Fig. 61 is a section on the line 61 61 of Fig. 60. Fig. 62 is an elevation of the guide mechanism for the pattern-supporting frames. Fig. 63 is an edge elevation of the same. Fig. 64 is an end elevation of the same. Figs. 65, 66, 67, and 68 are elevations of the sustaining-rods for the outer section or frame of the flask and pattern-supporting mechanism. Fig. 69 is a plan of the ring D$^{19}$. Fig. 70 is an edge elevation, with part in section, of the same. Figs. 71 and 72 are details of the air-cups for cushioning the drop of the outer frame. Fig. 73 is a detail of the crank-shaft for operating the outer frame. Fig. 74 is a sectional view on the line 77 77 of Fig. 73. Figs. 75 and 76 are details of the pattern-supporting-frame guide-posts. Fig. 77 is an elevation of the mechanism for moving the middle frame D$^{15}$. Fig. 78 is a sectional view of the same. Fig. 79 is a plan view of the same. Fig. 80 is a detail of the ring D$^{41}$. Fig. 81 is a view, partly in elevation and partly in section, on the line 84 84 of Fig. 80. Fig. 82 is a detail of the ring D$^{42}$. Fig. 83 is an elevation of the same. Fig. 84 is a sectional view on the line 87 87, Fig. 82. Fig. 84$^\times$ is a detail of the segments G$^{10}$ and G$^{14}$. Fig. 84$^{\times\times}$ is a plan view of the same. Fig. 85 is a detail of the ring D$^{43}$. Fig. 86 is a view of the same, partly in elevation and partly in section, on the line 89 89 of Fig. 85. Fig. 87 is an elevation illustrating mechanism for dropping the sand and dropping the plunger and sprues, &c. Fig. 88 is a plan view of the same. Fig. 89 is a side elevation at right angles to Fig. 87. Fig. 90 is a side elevation of the corresponding mechanism in the drag-machine. Fig. 90$^\times$ is a detail of the rod E$^{21}$. Fig. 91 is a plan view of the mechanism shown in Fig. 93. Fig. 92 is an elevation at right angles to Fig. 90. Figs. 93 and 94 are a sectional view and plan view, respectively, of the flask and accompanying chill of the cope-machine. Fig. 94$^\times$ is a cross-section of one of the flask-ribs. Figs. 95 and 96 are similar views of the flask for the drag-machine. Figs. 97 and 98 are respectively sectional view and plan view of the chill-supporting ring for the cope-machine. Figs. 99 and 100 are similar views of the flask-supporting ring for the drag-machine. Figs. 101 and 102 are a sectional view and a plan view, respectively, of the false flask of the drag-machine. Figs. 103 and 104 are respectively sectional view and plan view of the bottom plate or follower-board of the drag-machine. Fig. 105 is an elevation illustrating the crane for lifting the flask onto and off of the machine. Fig. 106 is an elevation at right angles to Fig. 105. Fig. 106$^\times$ is a side elevation of the crane-arm-tripping mechanism. Fig. 106$^{\times\times}$ is a plan view of the same. Fig. 107 is a plan view of the mechanism shown in Fig. 105. Fig. 107$^\times$ is a detail of the lever H$^{23}$. Fig. 107$^{\times\times}$ is a detail of the catch H$^{16}$. Figs. 108 to 127 are diagrammatic views illustrating the operation of the machine so far as the movement of the patterns and adjacent parts are concerned. Fig. 128 is an enlarged sectional view of the pattern and flask supporting mechanism. Figs. 129 to 134 are details illustrating the operation of the sleeve $A^{18-2}$ and segments $A^{20}$ and $A^{21}$. Fig. 135 is an elevation showing the switch mechanism on casing G. Fig. 136 is a plan view of the arm $G^{36}$. Fig. 137 is a plan view of the arm $C^{15-2}$. Fig. 138 is an elevation of switch mechanism on cylinder D'.

In carrying out my invention I will describe the various mechanisms in the order in which I have enumerated them above, first describing the general construction of the machine.

$D^7$, Figs. 5, 7, and 8, represents a suitable base-ring for the machine. Mounted on this is a plate $D^3$, Fig. 3, and above the plate a cylinder D', the plate $D^3$ constituting the bottom of the cylinder. Within the cylinder is a follower-plate $D^5$, carrying packing-rings $D^6$. $D^4$ is a piston-head working in the cylinder and resting on the plate $D^5$. Supported thereby is a casing $D^8$. The piston-head $D^4$ and the casing $D^8$ constitute the pattern and flask supporting mechanism, as will be hereinafter described. Supported by the cylinder D' from brackets $D^2$ are sustaining and guide rods $D^{35}$. The upper ends of these rods $D^{35}$ are engaged to brackets or arms $C^{24}$, Fig. 3, and these brackets or arms $C^{24}$ sustain and carry the casing $C^{23}$, and from this casing $C^{23}$ are supported the upper works of the machine, as will be hereinafter described. On the casing $D^8$ are arms $D^9$, Figs. 12 and 3, which slide against and are guided by the rods $D^{35}$, thus guiding the casing $D^8$ in its vertical movement. Engaged to the lower end of the casing $C^{23}$ is what I will term the "pressure-plate" $C^{20}$. The parts which I have just described constitute the general framework of the machine.

I will first describe in detail the mechanism for picking up the flask and properly placing it in the machine.

*Mechanism for picking up the flask and properly placing it in the machine.*—$F^4$ represents the chill and $F^5$ is the flask bolted thereto, but for the purpose of explanation I will term the flask and chill together the "flask," it being understood that when in the description the term "flask" is used I mean the flask attached to the chill. Extending from each side of the flask are trunnions $F^{99}$. (The flask is shown in detail in Fig. 93, Sheet 13.)

Suitably supported adjacent to the base of the machine is a cylinder H, Fig. 105, and working therein is a piston-head H' and a piston-rod $H^2$, attached to the latter. Above the cylinder are guides $H^3$. Working in these guides is a socket $H^4$, the latter being engaged to, or a part of, the piston-rod $H^2$. Carried by this socket is a rod $H^5$. The lower end of the rod enters the socket, as at $H^6$, and is provided with a collar $H^7$ to insure a perfect fit in the socket. The upper end of this rod $H^5$ is steadied and supported by the arm $H^8$, which extends over and is engaged to the standard $H^{50}$, which extends up from the floor. Engaged to the rod $H^5$ by the bearings $H^9$ is a crane-arm $H^{10}$. The vertical movement of the bearings and arm is limited by the collar $H^{11}$ on the rod, the crane-arm being free to swing on the rod. Extending out from the standard $H^{50}$ is a brace $H^{51}$, to which are engaged the guides $H^3$, the construction being thereby properly stiffened. The crane-arm is shaped, as shown in Fig. 108. with two arms $H^{12} H^{13}$, each one provided on its extremity with a suitable recess adapted to receive the trunnions $F^{99}$ on the flask $F^5$. On the arm $H^{10}$ is a suitable handle or projection $H^{14}$, whereby the arm $H^{10}$ may be easily thrown when necessary. Located on the inner face of the arm $H^{10}$ is a lug $H^{15}$. Engaged also to the inner face of the arm $H^{10}$ and above the lug $H^{15}$ is a spring-catch $H^{16}$, with a beveled end $H^{17}$. (See Figs. 105, 106, 107, and $107^{\times\times}$.) When, as later described, the crane-arm deposits the flask in the machine and moves on down, the beveled faces $H^{17\prime}$ and $H^{18\prime}$, acting against each other, will throw the catch out against its spring-pressure and the flask thus be released. On the flask $F^5$ is a lug $H^{18}$, Figs. 93 and 94. As the flask is dropped into the crane-arms this lug $H^{18}$ passes the beveled end $H^{17}$ of the spring-catch $H^{16}$ and engages under the latter, further downward movement being limited by the lug $H^{15}$, so that the flask is steadied and held in its proper horizontal position. This spring-catch $H^{16}$ also has the face $H^{17-1}$, which engages the flask beveled, and the corresponding face $H^{18\prime}$ of the flask is similarly beveled for a purpose above explained. On the inner face of the arm $H^{10}$ is a lug $H^{19}$.

$H^{20}$, Figs. 106 and 107, is a leaf-spring shaped as shown in Fig. 109, one end being engaged to the standard $H^{50}$, while the other end is free and is adapted to be struck by the lug $H^{19}$ when the arm is swung in toward the machine. Pivoted to the inner face of the arm $H^{10}$ is a beveled catch $H^{21}$, the catch being spring-impelled in the usual well-known manner. Thus when the arm is thrown in toward the machine the lug $H^{19}$ bears on the free end of the spring $H^{20}$ and is cushioned there by the beveled catch $H^{21}$ engaging the standard, as shown in Fig. 110. Also located on the inner face of the arm $H^{10}$ is another lug $H^{22}$. Pivoted on the brace $H^{51}$ is a bell-crank lever $H^{23}$, shaped substantially as shown in Fig. $110^\times$, one arm being curved outwardly and upwardly, as shown at $H^{24}$. Pivoted to the arm $H^{25}$ of this lever is a rod $H^{26}$. (Shown by dotted lines, Fig. 109.) Pivoted to the lower end of this rod is an arm $H^{27}$, extending from the valve-stem of the valve $H^{28}$, which controls the exit of the air from the cylinder. This valve $H^{28}$ is of the usual well-known release-valve form, with a spring on its stem for returning the valve to its normal or closed position when the strain on it is released. It will thus be seen that as the lug $H^{22}$ on the arm $H^{10}$ strikes the arm $H^{24}$ of the lever $H^{23}$ it will tilt the arm $H^{25}$ downward. This will throw the rod $H^{26}$ downward, will tilt the valve-arm $H^{27}$ down, and open the release-valve for the cylinder, thus allowing the piston-head H' and rod $H^5$, together with the arm $H^{10}$ and its load, to drop. As the arm $H^{10}$ descends, the catch $H^{21}$ rides off from the flange on the standard $H^{50}$, and simultaneously therewith the lug $H^{22}$ reaches the curved portion of the arm $H^{24}$ and thus releases the pressure on said arm, so that the spring in the valve can close the latter. This of course takes place when the piston-head has reached the lower end of the cylinder and the crane-arm $H^{10}$ has deposited the flask properly in the machine. Guides $H^3$ form shoulders against which the socket $H^4$ strikes, and the downward movement of the piston-head is thereby properly limited. Of course the moment the catch $H^{21}$ rides off from the flange on the standard $H^{50}$ the spring $H^{20}$ comes into play and throws the arm $H^{10}$ out ready to pick up another flask.

Extending from the cylinder H is a suitable pipe $H^{29}$, controlled by a suitable valve, and as the crane-arm swings out in its lower position it is placed under the trunnions $F^{99}$ on the flask, the valve on the pipe $H^{29}$ is opened, the pressure-fluid is allowed to enter the cylinder H, and the crane-arm is thereby lifted with its load and swung in, as above described.

In order to facilitate the ready picking up of the flask by the crane-arm $H^{10}$, I bevel the ends of the portions $H^{12}$ $H^{13}$, as at $H^{30}$, Figs. 106 and 107, and I also provide on said arm upward projections $H^{31}$, thereby insuring the proper registration between the trunnions $F^{99}$ on the flask and the recesses in the arms to receive them.

When the flask is placed in the machine, as just described, it is supported by the cylinder $D^8$ through the mechanism which will be subsequently described, and it is now ready to receive the outer false flask.

I will now describe the mechanism for dropping the outer false flask onto the flask proper.

*Mechanism for dropping the outer false flask onto the flask proper.*—Supported from the casing $C^{23}$, Fig. 87, is what may be termed a "casing" $C^{30}$. Extending from this casing are two arms E, as shown in Fig. 90, and in dotted lines, Fig. 91. Pivoted between these arms is a bell-crank lever E'. Pivoted to one arm of this lever is a rod $E^2$. On the lower end of this rod $E^2$ is a projection $E^3$. As the crane-arm and the flask which it carries descend one trunnion $F^{99}$ on the flask strikes this projection $E^3$ and pulls the rod $E^2$ downward, thus tilting the bell-crank lever E'. Pivoted to the bell-crank lever E' is a rod $E^4$, which extends back and is pivoted to an arm $E^5$, depending from the rod or shaft $E^6$, so that a tilting of the bell-crank lever gives the shaft $E^6$ a partial revolution. Depending from the shaft $E^6$ are two arms $E^7$. (Shown in Figs. 91 and 92.) Pivoted to each of these arms is a rod $E^8$. Each of these rods $E^8$ is pivoted to a bell-crank lever $E^9$, the latter being pivoted to the casing $C^{23}$. Pivoted to each bell-crank lever $E^9$ is a rod $E^{10}$. Extending from the opposite sides of the cylinder $C^{23}$ are arms or brackets $E^{11}$, and pivoted to each of these brackets is a beveled catch $E^{12}$, provided with a spring $E^{13}$ for keeping them in their normal engaging position. The rod $E^{10}$ extends through the upper end of this catch $E^{12}$ and is provided with an adjusting-nut $E^{14}$, so that the proper position of the catches may be regulated. As will be seen by reference to Fig. 92, these beveled catches $E^{12}$ engage and hold the outer false flask $C^{28}$ until released. This false flask (as well as the inner false flask which I will presently describe) is made up of horizontal sections $C^{28-6}$, Fig. 3. These may be any desired height. In Fig. 3 I have shown the section above the lowest section to be one-half the height of the lowest section and the top section to be one-half the height of the middle section. By engaging the guide-rods $C^{28-2}$ to the lowest section and providing the other sections with slotted ears to engage the guide-rods the height of the false flask can be changed without taking the lowest section out of the machine. When the upper sections are in place, they may be bolted together in any suitable manner. Obviously, through the mechanism just described, when the rod $E^2$ is pulled down the catches $E^{12}$ will release the outer false flask $C^{28}$ and permit it to drop onto the flask $F^5$. Engaged to the outer false flask $C^{28}$, Fig. 1, are guide-rods $C^{28-2}$, extending up through the arms $C^{28-1}$, engaged to the cylinder $C^{23}$. Above these arms are cups $C^{28-4}$, and on the upper end of each rod is a disk or plunger $C^{28-3}$. Thus as the flask descends, as above described, the disk or plunger $C^{28-3}$ enters the cup $C^{28-4}$ and the descent of the flask is cushioned.

*The sprues and mechanism for dropping them into the flask.*—Preferably an integral part of the cylinder $C^{23}$ and supported by ribs $C^{25}$ is an inner casing $C^{26}$. (Shown in Figs. 3 and 10.) On the upper end of this casing $C^{26}$ is a flange $C^{33}$, Figs. 3 and 16.

$B^2$ is a hollow casing supported in the casing $C^{26}$ and engaged thereto by the flange $B^5$, bolted to the flange $C^{33}$. The upper end of this casing $B^2$ is interiorly threaded, as at $B^3$, Fig. 25, and engaged in said threads is a ring $B^{10}$. On the ring $B^{10}$ is a bearing $B^8$, and underneath the ring $B^{10}$ is another plate $B^{11}$, the bearing $B^8$ having projections which extend down to the plate $B^{11}$, and the latter is engaged to said projections. Pivoted in the bearing $B^8$ is what I will term a "crank-sleeve" $B^9$, carrying a disk $B^{9-4}$. Supported in the crank-sleeve $B^9$ is a crank-shaft $B^{10-2}$, having a crank-arm $B^{10-1}$, Fig. 25. Pivoted to the arm $B^{10-1}$ is a rod $B^{14}$. Engaged to the under side of the plate $B^{11}$ is a guide-plate $B^{15}$, shaped, as shown in Figs. 31 and 33, with a central channel. (Shown in Fig. 33.) In this guide-plate and free to move vertically therein is a fitting $B^{16-1}$, having a projection $B^{16}$, and the lower end of the rod $B^{14}$ is pivoted to this projection $B^{16}$. Extending through the fitting $B^{16-1}$ and free to turn therein is a rod $B^{16-2}$, the upper end of said rod being turned at right angles, as shown in Fig. 33, to hold it in the fitting, while below the fitting is a spring $B^{16-3}$, adapted to normally keep the rod from turning on its longitudinal axis. On the lower end of the rod $B^{16-2}$ is a foot or projection $B^{16-4}$. (Shown in Figs. 31 and 32 and by dotted lines, Fig. 33.) Sliding vertically in the plunger $B^{17}$, Fig. 22, (the construction of the latter to be later described,) is a fitting $B^{18}$, having arms $B^{18-1}$, which extend through vertical channels $B^{19-2}$ in the plunger $B^{17}$, and these arms $B^{18-1}$ carry the sprues $B^{20}$, the sprues being suitably fixed to said arms. In the present instance I have shown three of these sprues; but the number may of course be varied. I wish at this point to call attention to the fact that throughout my specification and claims I have termed these pins $B^{20}$ for forming the sprue-holes in the mold "sprues." Technically they are sprue-forming pins; but I have adopted the term commonly applied to them in the foundry. In Fig. 30 a part section of one of these sprues is shown. It is hollow and has its end beveled, as at $B^{20-2}$, and is provided on the interior with a plug or diaphragm $B^{20-1}$, having a restricted orifice $B^{20-3}$. In the face of the plunger $B^{17}$ and registering with the channels $B^{19-2}$ are concave depressions $B^{19-1}$ to support and guide the sprues in their movements. In the stem of the fitting $B^{18}$ is a series of notches $B^{18-2}$, and in these notches the foot $B^{16-4}$, previously described, engages. On the lower end of the interior of the plunger $B^{17}$ is a cup $B^{21}$, and on the fitting $B^{18}$ is a diaphragm or plunger $B^{19}$ to cushion the descent of the sprues when they are released and dropped.

Referring now back to Figs. 90, 91, and 92, extending up from the shaft $E^6$ is an arm $E^{15}$, and pivoted thereto is a rod $E^{16}$. This rod extends to and is pivoted to an arm $E^{17}$ on the vertical shaft $E^{18}$, the latter extending up from the casing $C^{23}$, as shown in Fig. 87. On the upper end of this vertical rod or shaft $E^{18}$ is fixed an arm $E^{19}$. This arm $E^{19}$ extends through a slot in the face of the casing $B^2$. Engaged to the under side of the plate $B^{11}$ is the bracket $E^{20}$. (Shown in detail in Fig. 93×.) Carried by this bracket is a rod or shaft $E^{21}$, having on its upper end an arm $E^{22}$ and on its lower end an arm $E^{23}$ and a spring $E^{24}$ for keeping the shaft normally in the desired position. The arm $E^{23}$ when the rod $E^{21}$ is revolved strikes a lateral projection on the upper end of the rod $B^{16-2}$ and revolves the rod, and, as before explained, the foot $B^{16-4}$ of this rod engages the notches $B^{18-2}$ of the sprue-fitting $B^{18}$, so that a revolution of the shaft $E^6$, as before explained, pushes the rod $E^{16}$ and throws the arm $E^{19}$, and this arm striking the arm $E^{22}$ revolves the arm $E^{21}$, consequently moving the arm $E^{23}$, and the latter revolves the rod $B^{16-2}$, thus releasing the foot $B^{16-4}$ from the notches in the sprue-fitting $B^{18}$ and allowing the latter, together with the sprues, to drop down onto the pattern. The descent of the sprues is cushioned by the plunger $B^{19}$ entering the cup $B^{21}$, Fig. 22. In addition to this it will be observed that the sprues are hollow, as shown in Fig. 30. On the pattern $R^3$ (shown in Fig. 3) are projections $F^{10}$, having beveled ends, as shown, and as the sprues descend the end of each sprue passes over one of these projections. The fitting between the two is more or less snug, and the air in the sprues thus acts as a cushion for the first blow of the sprues in striking the pattern; but the orifice $B^{20-3}$ allows the air to escape and allows the sprues to gradually settle down to their proper place. The air-passage through the sprues also performs another function. When the sprues are withdrawn after the mold is formed, the air passing down through the sprues destroys any vacuum caused by the stripping of the sprues or patterns. Above I have mentioned the beveled end $B^{20-2}$ of the sprue. When the end of the sprue fits over the projection $F^{10}$ on the pattern, (or the said projection could be on some other sprue-supporting portion,) the beveled end forms a thin connecting-web between the casting and the plug formed by pouring in the sprue-hole, so that said plug can be easily knocked off from the casting without either leaving a projection on the casting or a recess on the same.

*Mechanism for discharging into the flask the preliminary amount of sand.*—Substantially simultaneously with the descent of the sprues, as above explained, the preliminary discharge of sand takes place. Supported from the casing $C^{23}$ and preferably a part of the casing $C^{30}$ is a sand-chute $C^{41}$, having an opening $C^{31}$, Figs. 3 and 16, at its lower end. An inclined diaphragm $C^{42}$ leads from the lower end of the chute $C^{41}$ down to a point adjacent to the opening $C^{43}$ in the inner casing $C^{26}$, where the sand is discharged, as hereinafter explained. Mounted above the chute $C^{41}$ are the sand reservoirs and hopper, constructed as follows: Mounted directly on the chute $C^{41}$ is a cylinder $A^9$, Fig. 3, and above this is mounted a second cylinder $A^{30}$ $A^{31}$. The abutting ends of the cylinders $A^{30}$ $A^{31}$ are engaged together by an interiorly-threaded ring $A^{11}$ engaging the exterior threads on the cylinders $A^{30}$ $A^{31}$, as shown in Fig. 48. Mounted on the upper end of the cylinder $A^{31}$ is another cylinder $A^{32}$, and mounted above this is still another cylinder $A^{33}$. The various cylinders just described, with the exception of the abutting ends of the cylinders $A^{30}$ $A^{31}$, are engaged together by flanges, as shown in Figs. 37 and 38. Above the cylinder $A^{33}$ is a hopper $A^8$. The various cylinders which I have just described constitute sand-reservoirs. They are shown circular in cross-section, but need not necessarily be this shape. Preferably they are mounted one above the other, as shown, the reservoirs being separated from each other by suitable horizontal doors or valves, which when opened permit the sand to pass downward. The lowest set of doors I have designated at $A^{10}$, Fig. 3, the next set above $A^{34}$, and the upper set $A^{35}$. The sets of doors are substantially duplicates of each other and are shown in plan view Fig. 39. Each set is composed of a center piece $A^{36}$, trunnioned on a center line, as at $A^{37}$ $A^{38}$, and two side doors $A^{39}$ $A^{40}$, also trunnioned, as at $A^{41}$ $A^{42}$ $A^{43}$. It is of course obvious that the specific construction of these doors is immaterial; but I prefer the form shown. The adjusting-ring $A^{11}$ is for the purpose of increasing or decreasing the size of the reservoir between the doors $A^{10}$ and $A^{34}$, so that the proper amount of sand for the preliminary discharge can be regulated. Engaged to the trunnion $A^{38}$ is a gear $A^{16}$, toothed on two opposed portions of its periphery $A^{44}$ $A^{45}$. The teeth on the periphery and its gear $A^{16}$ extend only across a portion of the periphery, the balance being smooth, as shown at $A^{46}$, Fig. 38, and this smooth portion is provided with a notch $A^{49}$, Fig. 41. On each trunnion $A^{42}$ $A^{43}$ is a segment-gear $A^{15}$. (Shown in detail in Fig. 42 and shown also in Fig. 37.) These segment-gears $A^{15}$ mesh with the teeth $A^{44}$ $A^{45}$ on the gear $A^{16}$, so that a revolution of the gear $A^{16}$ and a consequent movement of the door $A^{36}$ also moves the gear $A^{15}$, and consequently the doors $A^{39}$ $A^{40}$. Surrounding each trunnion $A^{42}$ $A^{43}$ is a collar $A^{15-3}$, having its face toothed, as at $A^{15-4}$. This collar $A^{15-3}$ is fixed to the casing. Surrounding the pinion $A^{42}$ is a spring $A^{15-1}$, one end engaged to the pinion $A^{15}$, while the other end is engaged to the ratchet-ring $A^{15-2}$, the ratchet-ring having its face adjacent to the collar $A^{15-3}$ toothed to correspond with the face of the latter, so that when the pinion $A^{15}$ is revolved it does so against the pressure of the spring $A^{15-1}$ and compresses the latter. The tension of the spring can of course be regulated by the ratchet-ring $A^{15-2}$. These springs $A^{15-1}$ are for the purpose of tilting the doors to dump the sand when the doors are released, (by mechanism which which I will presently describe,) inasmuch as the construction of the doors, as shown in Fig. 39, is such that the doors are balanced when the weight of the sand is on them. If additional spring-tension is desired, other springs might be located at any desirable point. Extending from the cylinder $A^9$ is a projection $A^{16-2}$, Fig. 38, and pivoted thereon is a spring-catch $A^{16-1}$, adapted to engage in the notch $A^{49}$ in the periphery of the gear $A^{16}$ to normally hold the doors closed against the spring-pressure of the springs $A^{15-1}$. Pivoted to the rod $E^{16}$ below the arm $E^{17}$ is a link $E^{25}$, and pivoted thereto is another arm $E^{26}$ on the end of the shaft $E^{27}$, all as shown in Figs. 90 and 91. This shaft $E^{27}$ is also shown by a dotted line in Fig. 37 and is shown in detail in Fig. 48$^\times$. Extending from the upper end of this shaft $E^{27}$ is an arm or projection $E^{28}$, which terminates just above the tail of the catch $A^{16-1}$, so that a revolution of the shaft $E^{27}$ through the links $E^{25}$ $E^{26}$ will tilt the catch $A^{16-1}$ out of the notch and allow springs $A^{15-1}$ to tilt the doors and dump the sand. The latter passes down through the chute $C^{41}$ and slide $C^{42}$, through the opening $C^{43}$, and drops down into the flask just a short time after the sprues.

*Mechanism for dropping the inner false flask onto the runner-box.*—I have previously called attention to Fig. 93, wherein is shown the construction of the flask. Referring now to that figure and the adjacent Fig. 97, $F^{5-1}$ are webs extending from the periphery of the flask inward and supporting the runner-box $F^{5-2}$. These ribs preferably have their upper and lower edges more or less sharpened, Fig. 94$^\times$, so that the sand can readily pass in either direction without meeting an abutting edge. For the same reason the lower edge of the runner-box is more or less sharpened, as at $F^{16}$.

It will be observed by reference to Fig. 96 that the inner faces of the flask $F^5$ and chill $F^4$ where they join form a continuous line or face without a substantial break or angle. This is accomplished by making the face $F^{14}$ of the flask continuous without an angle or pocket and by curving or tapering the corner of the chill, as at $F^{15}$, and having the faces $F^{14}$ $F^{15}$ register with each other. Thus when the pressure is applied the curved or tapered surface throws the sand out against the portion of the pattern opposite the point where the face $F^{15}$ terminates and compresses it tightly against the pattern. This is a material advantage where machine-pressure is used, as in my case.

$C^{29}$, Fig. 3, is the inner false flask, movable vertically within the casing $C^{26}$ and guided by the rods $C^{29-1}$, engaged to the flask and extending through suitable orifices in the flanges $B^5$ $C^{33}$. This flask is held in its upper position by the catch $E^{29}$, Fig. 92, and the latter is pivoted on a projection extending up from the casing $C^{23}$ and is tilted out to release the flask by pressure on the upper end, obtained as follows: Supported in bearings $E^{30}$ on the casing $C^{23}$ is a rod or shaft $E^{31}$, Fig. 88, having on its ends handles $E^{32}$ to be grasped by the operator. Extending from the shaft $E^{31}$ is an arm $E^{33}$, and pivoted thereto is a rod $E^{34}$, which is pivoted to a bell-crank $E^{35}$, supported from the casing $C^{23}$. The end of this bell-crank $E^{35}$ bears on the end of the pivoted catch $E^{29}$, so that a revolution of the shaft $E^{31}$ tilts the bell-crank lever $E^{35}$ and releases the catch $E^{29}$ from the false flask $C^{29}$ and allows the latter to drop down onto the runner-box. Of course the operator drops this inner false flask as soon as the preliminary sand has dropped down into the flask proper and the runner-box.

*The plunger and mechanism for dropping it into the flask.*—In connection with the description of the sprues I have already mentioned the plunger, and I will now specifically describe the same.

Referring to Sheet 7, $B^{17}$ is the plunger proper. It is tapered on its lower end, as shown, and slides vertically in the casing $B^2$, being properly guided by the bearing-ring $B^6$, engaged to the lower end of the casing $B^2$. This bearing-ring also has a function of a pressure plate or ring. Its under face is made concave, as shown at $B^{6-1}$, with a downwardly-projecting shoulder or flange $B^{6-2}$. Thus as the sand is forced up against the ring, as will be hereinafter described, it packs tightly against the ring, but is not thrown out laterally, as would be the case if the flange $B^{6-2}$ were not present.

Referring now to the crank-sleeve $B^9$, (shown in detail Fig. 28,) $B^{9-3}$ are ears extending from said sleeve and constituting a crank, and in these ears is pivoted the connecting-rod $B^{12}$, and this connecting-rod $B^{12}$ is pivoted to the plate $B^{13}$. Pivoted to this plate $B^{13}$ is a spring-catch $B^{13-1}$, the said catch adapted to engage the plunger when it is raised against the plate $B^{13}$ and hold the two together until the catch is disengaged.

Referring to Fig. 91, on the shaft $E^{31}$ is an arm $E^{36}$, and pivoted thereto is a rod $E^{37}$. The latter is pivoted to an arm $E^{38}$ on the vertical shaft $E^{39}$. On this shaft $E^{39}$ is another arm $E^{40}$. This arm $E^{40}$ passes through a slot in the casing $B^2$ and terminates immediately under the plate $B^{11}$, Fig. 25. When the plunger and its accompanying plate $B^{13}$ are raised to the maximum height, a revolution of the shaft $E^{39}$ will throw the arm $E^{40}$ against the catch $B^{13-1}$ and will thus release the plunger and allow it to drop. The mechanism for raising the plunger to a point where the arm $E^{40}$ can strike the catch will be later described. Suffice it to say, that when the operator revolves the shaft $E^{31}$ the plunger is at its maximum height and is released from the plate $B^{13}$ and allowed to drop. In the flanged upper end of the plunger and on opposite sides of the plunger are two recesses $B^{13-2}$, Fig. 24. Projecting from the inner face of the casing $B^2$ are lugs $B^{22}$, and mounted in these lugs are screws $B^{24}$, provided on the upper ends above the lugs with pinions $B^{23}$. The lower ends of the screws are journaled in the bearing or pressure ring $B^6$. Mounted on the screws is an adjusting-ring $B^{27}$. To raise and lower this ring, the doors $B^4$ in the casing $B^2$, Figs. 25 and 26, are opened, and by means of a suitable rack-bar the pinions, and consequently the screws, are revolved, thus raising and lowering the ring $B^{27}$. Surrounding the screws above the ring $B^{27}$ are springs $B^{26}$, and above the springs is a buffer-plate $B^{25}$. When the plunger is released from the catch $B^{13-1}$, the flanged upper end $B^{17-1}$ of the plunger strikes the buffer-plate $B^{25}$, and the descent of the plunger is cushioned thereby. When the plunger drops, the lower end enters the runner-box $F^{5-2}$, and as the patterns and runner-box ascend they carry the plunger back up with them until it strikes the plate $B^{13}$, as hereinafter explained, and it then becomes a part of the pressure mechanism, together with the ring $B^6$ and the pressure-plate $C^{20}$.

*Mechanism for dropping into the flask an additional lot of sand.*—Referring now to Fig. 3, it will be remembered that the first lot of sand was contained in the reservoir between the doors $A^{10}$ and $A^{34}$ and that there is an additional lot of sand in the reservoir between the doors $A^{34}$ and $A^{35}$. It will of course be understood that the preliminary lot of sand filled the flask and the runner-box and that when the plunger and the inner false flask were dropped there remained space in the inner false flask, and to a greater or less extent in the runner-box, to be filled with sand. The mechanism for dropping this additional lot of sand I will now describe.

The construction of the doors $A^{34}$ is substantially the same as the construction of the doors $A^{10}$, (shown in Fig. 39,) the exception being in the device for releasing the doors to allow the sand to drop. On the trunnion $A^{38}$ of the middle door is fixed a dish-shaped gear $A^{14}$. (Shown in Figs. 38 and 40.) On the inner face of the periphery of this gear $A^{14}$ is a notch $A^{14-3}$. Revolving on the trunnion $A^{38}$ is a beveled gear $A^{14-1}$, held there by the collar $A^{14-4}$, keyed to the trunnion, and carried by this beveled gear is a spring-catch $A^{14-2}$, adapted to engage in the notch $A^{14-3}$. The purpose of the beveled gear $A^{14-1}$ will be later explained. Suffice it to say, that the catch $A^{14-2}$, engaging in the notch $A^{14-3}$, normally holds the doors closed against the spring-pressure of the springs $A^{15-1}$. Pivoted to the end of the rod $E^{37}$, Figs. 87 and 88, is a link $E^{41}$, the other end being pivoted to the arm $E^{42}$ on the shaft $E^{43}$. This shaft $E^{43}$ extends up and terminates adjacent to the catch $A^{14-2}$, where there is a projecting arm $E^{44}$. A detail of this shaft is shown in Fig. 48$^{\times\times}$, and it is also indicated by a dotted line in Fig. 37. Thus a revolution of the shaft $E^{43}$ through the arm $E^{44}$ tilts the catch $A^{14-2}$ out of the notch $A^{14-3}$ and allows the springs $A^{15-1}$ to tilt the doors $A^{34}$ and dump the sand above them down into the inner false flask. Some of this sand may overflow this flask and drop onto the sand in the outer false flask, and, if necessary, the operator then smooths it off by hand before the pressure is applied, as hereinafter explained. It will thus be seen that a manual revolution of the shaft $E^{31}$ drops the inner false flask, drops the plunger, and drops the additional sand necessary to fill up the inner false flask around the plunger.

*The patterns and mechanism for supporting and moving the same.*—Referring now to Fig. 3, it will be observed that the pattern illustrated in the present instance is for forming a car-wheel mold, and I wish at this point to state that while I have herein shown a specific form of pattern, yet it is obvious that my machine is adapted for forming any desired shape or form of mold, and I do not wish to be understood as limiting myself in this direction in any particular. So, also, in the cope-machine shown in Fig. 3 I have illustrated the pattern as composed of three pieces, but, as will be seen when I have completed the description of the mechanism, the latter is adapted to manipulate a pattern of any desired number of pieces and to form a mold of any desired surface. It will be observed that some of the pattern parts are provided on the downward-extending legs with lugs—as, for instance, the lug $R^4$ on the pattern $R^3$, Fig. 128, and the lug $T^6$ on the part $T^3$, Fig. 118, and the lug $T^7$ on the part $T'$, Fig. 118. These are for the purpose of providing shoulders or bearing parts on the pattern parts which are out of vertical alinement with other bearing parts in the same section of pattern, so that the pattern can be carried at different stages of its manipulation by different portions of the pattern and flask supporting mechanism. These lugs or bearing parts are also usually out of horizontal alinement, and by regulating these bearing parts with respect to each other the pattern parts can be picked up at any stage of the operation by any desired portion of the supporting mechanism, as hereinafter described.

As explained at the beginning of my description, the piston-head $D^4$ and the casing $D^8$ constitute the flask and pattern supporting mechanism, and I will now describe the same in detail.

Extending up vertically from the piston-head $D^4$ and properly secured thereto are three standards $D^{26}$, carrying in their upper ends a crank-shaft $D^{21}$. (Shown also in detail in Figs. 76 and 77.) This crank-shaft extends out through the casing $D^8$ and is provided within the casing with two cranks $D^{65}$. Engaged to these cranks are pitmen $D^{39}$ $D^{40}$. (Shown in detail Figs. 65, 66, 67, and 68.) The lower ends of these pitmen are pivoted to the frame $D^{17}$ at $D^{17-6}$, Fig. 54. The shape of this frame $D^{17}$ is shown in Figs. 54 and 55. It is what may be termed a "spider-frame," with an upper rim or ring exteriorly threaded, as at $D^{17-7}$, and engaged to this rim by said threads is a ring $D^{17-8}$, the latter being adjusted vertically through the medium of the threads. This frame is given a vertical motion through the crank-shaft $D^{21}$, as hereinafter explained. It is guided and steadied in its movement by the beveled guides $D^{17-5}$, sliding in the grooves $D^{23-2}$ in the guide-posts $D^{23}$, which extend up from and are secured to the piston-head. The shape of these guide-posts is shown in Figs. 62, 63, and 64. It is also guided and steadied by the guides $D^{17-3}$, Fig. 54, traveling against the guide-pieces $D^{53}$ on the casing $D^8$. (See Fig. 12.)

$F^2$ is a ring, approximately of angle-iron shape in cross-section, (see Fig. 3,) constituting the chill-support. It is shown in detail in Fig. 97. The upwardly-extending flange $F^{17}$ of this chill-support is recessed, as shown at $F^{18}$, Fig. 97, and this portion of the chill-support constitutes the portion of the pattern to form the outer edge of the tread of the wheel-casting beyond that formed by the chill. This recess would of course make a correspondingly-raised portion on the tread portion of the mold. The formation of this raised portion of the tread-mold is old, the novelty in my construction being the formation of the recess (to form this raised portion) in the chill-support instead of the pattern. It will also be observed that the horizontal portion $F^{19}$, Fig. 97, has its top surface inclined, as shown, with the chill-supporting ribs $F^{20}$ at intervals. The under side of the portion $F^{19}$ is provided with channels $F^{21}$. The purpose of the above formation is to allow any sand that may accumulate on either side of the portion $F^{19}$ to clear itself, and thus give the flask a square bearing. This chill-support rests upon the adjusting-ring $D^{17-8}$, and the chill $F^4$ and flask $F^5$ rest upon the chill-support $F^2$, so that, as will be seen, the flask is carried and supported from the piston-head by the frame $D^{17}$. It will be observed by reference to Figs. 54 and 55 that the frame $D^{17}$ is made up of four vertical legs, and on the inner face of each of these legs is journaled an adjusting-screw $D^{18}$, Figs. 54 and 55, the lower end resting in the socket $D^{17-4}$, while the upper end is journaled in the bracket $D^{18-2}$. Each screw is provided with a pinion $D^{18-1}$. Meshing with each of these pinions is a toothed ring $D^{19}$, (shown in detail in Figs. 69 and 70,) said ring resting upon the shoulder $D^{19-1}$ of each leg.

$D^{42}$, Figs. 78, 82, 83, and 84, is a ring provided with lugs $D^{42-1}$, said lugs having threaded orifices through which the screws $D^{18}$ pass, so that a revolution of the screws through the medium of the ring $D^{19}$ will adjust the ring $D^{42}$ vertically with respect to the frame $D^{17}$. The interior of the periphery of the ring $D^{42}$ is screw-threaded, as at $D^{42-2}$. $D^{43}$, Figs. 85 and 86, is another ring having the exterior of its periphery threaded, as at $D^{43-1}$, to fit the threads $D^{42-2}$ of the ring $D^{42}$, so that the inner ring $D^{43}$ can be adjusted vertically with respect to the ring $D^{42}$. On the ring $D^{42}$ are depending lugs $D^{44}$ and $D^{44-1}$, and journaled in said lugs is a crank-shaft $D^{46}$. Pivoted in the crank-arms $D^{46-1}$ of the same is a pitman $D^{46-2}$, and the latter is pivoted in the ring $D^{41}$. The mechanism just described is duplicated on the opposite side of the ring $D^{42}$, as shown in Fig. 86 and also Figs. 3 and 131, so that both sides of the ring will be simultaneously moved. Keyed to each shaft $D^{46}$ is a beveled gear $D^{50}$. Carried in the lug or sleeve $D^{44}$ is a vertical shaft $D^{45}$, and keyed thereto is a beveled gear $D^{48}$, which meshes with the beveled gear $D^{50}$, so that a revolution of the shaft $D^{45}$ revolves the shaft $D^{46}$ and moves the ring $D^{41}$ vertically. The mechanism for revolving the shaft $D^{45}$ will be later described. The shaft $D^{45}$, Figs. 3 and 128, extends down to the bottom of the casing $D^8$, where it is journaled, and it is here provided with a beveled gear $D^{67}$, which meshes with the beveled gear $D^{68}$ on the horizontal shaft $D^{69}$. On the opposite end of the shaft $D^{69}$ is a beveled gear $D^{70}$, which meshes with a beveled gear $D^{71}$ on the vertical shaft $D^{72}$. This shaft $D^{72}$ corresponds in function with the shaft $D^{45}$ and operates a pitman $D^{46-2}$ on the opposite side to raise and lower the rim $D^{41}$.

$D^{15}$, Figs. 56 and 57, is another spider-frame, and on each of the four legs of the same is a guide $D^{15'}$, which slides against the guide $D^{27}$ on the inner face of the casing $D^8$, Fig. 12. The lower end of each of these guides $D^{15'}$ forms a shoulder adapted to rest upon either the ring $D^{43}$ or $D^{41}$, as the case may be. The upper end of the frame $D^{15}$ is shown in Fig. 57, and consists of three concentric rings $M'$, $M^2$, and $M^3$. Each of these rings has a function in supporting and moving the various parts of the pattern during the pressing and stripping operation. The rings are shown in section and can perhaps be better understood by reference to one of the diagrammatic views—say, for instance, Fig. 108. $D^{12}$ is another spider-frame, shaped as shown in Figs. 58 and 59. This frame is supported from the eccentric-shaft $D^{22}$. (See Fig. 4.) The shaft is also shown in detail in Figs. 60 and 61. It is journaled in the standards $D^{25}$, extending up from and secured to the piston-head $D^4$. On the eccentric-shaft $D^{22}$ are the usual eccentrics, and engaged thereto are the straps $D^{22-1}$, the latter being pivoted to the frame $D^{12}$ by the pivots $D^{22-3}$, passing through the orifices $D^{12-4}$, Fig. 58. In the upper end of the frame $D^{12}$ is a slot $D^{12-2}$ to permit the top of the frame to pass above the eccentric-shaft and also another slot $D^{12-3}$ to permit the frame to pass above the crank-shaft $D^{21}$. The frame $D^{12}$ is guided in its vertical movement by the guides $D^{12-1}$, Fig. 58, traveling in the guides $D^{23-1}$ of the post $D^{23}$, Figs. 62 and 63. It is also guided by the post $D^{11}$, Figs. 4 and 128, and also shown in detail Figs. 75 and 76, which extends up from piston-head $D^4$. Secured to the lower end of the frame $D^{12}$ is a plate $D^{14}$. It will be observed by reference to Figs. 12 and 131 that the legs of the frame $D^{15}$ pass through the slots $D^{14-1}$, so that the lower end of the frame $D^{15}$ can at a certain stage in the operation rest upon and be supported by the plate $D^{14}$ and yet be free to move vertically independent of the frame $D^{12}$ because of the of the slots $D^{14-1}$. The upper end of this frame $D^{12}$ is provided with an outer ring $P'$ and an inner plate or ring $P^2$, and these rings are shown in section in diagrammatic view Fig. 108.

It will be seen from the above description that all the parts which directly support the pattern and flask are in turn supported from the piston-head and that the latter has a vertical movement in the cylinder $D'$. Thus all the parts are carried upward by the piston-head, while in addition to this upward movement the frame $D^{17}$ has an auxiliary or additional vertical motion through the crank-shaft $D^{21}$, and the frame $D^{12}$ has an additional vertical movement through the eccentric-shaft $D^{22}$, and as the frame $D^{15}$ is supported either by the frame $D^{17}$ through the medium of the rings $D^{41}$ and $D^{43}$ or by the frame $D^{12}$ through the medium of the bottom plate $D^{14}$ (depending upon the stage of the operation) the said frame $D^{15}$ will move with the part that is carrying it.

In addition to the parts just described as being movable vertically with respect to the piston-head there is provided on the upper end of the casing $D^8$ the sectional supporting-rings $F'$. (Shown in Figs. 13 and 14.)

Throughout most of the operation the frame $D^{17}$ supports the flask; but when the frame $D^{17}$ is lowered to the full extent the ring $D^{17-7}$ drops below the level of the sectional ring $F'$, and the latter carries the chill-support $F^2$, and consequently the chill and flask $F^4$ and $F^5$.

I will now describe the mechanism for revolving the two crank-shafts $D^{21}$ and the eccentric-shaft $D^{22}$, and thus moving the parts supported, respectively, by these shafts.

Referring now to Figs. 1 and 2, it will be observed that the arms $D^3$ are connected by a cross arm or web $D^{66}$, and resting on this cross-arm is a casing G. The lower end of the casing is bolted or otherwise secured to cross-arm $D^{66}$, while the upper end has arms $G'$, which extend out and engage the rods $D^{35}$. The face of the casing is provided with a door $G^2$, and tripping mechanisms for the various automatic mechanisms in the machine are contained within the casing. Mounted in the casing and extended outside of the same, as shown in Fig. 1, is a shaft $G^3$, and located thereon is a lever $G^4$ for revolving the shaft. On the shaft is an arm $G^5$, and pivoted thereto is a rod $G^6$, which extends down and is pivoted to the arm $G^7$ on the stem of the valve governing the fluid-inlet pipe for the cylinder $D'$, so that a tilting of the lever $G^4$ will open or close the valve $G^8$, as the case may be. As before explained, the admission of fluid into the cylinder $D'$ moves the piston upward, carrying with it all the parts mounted thereon. As will be seen by reference to Fig. 128, the shaft $D^{21}$ extends through the wall of and into the casing G and passes through a slot $G^9$, Fig. 2, in the back of the casing. Located on the shaft $D^{21}$, Fig. 78, but adapted to revolve loosely thereon is a sleeve $D^{73}$, carrying a beveled gear $D^{74}$, which meshes with the beveled gear $D^{75}$ on the upper end of the shaft $D^{45}$. Located on the sleeve $D^{73}$ is a segment-gear $G^{10}$. (Shown in Figs. 77, 78, 79, and 128.) This segment-gear $G^{10}$ is also shown in detail in Figs. $84^{\times}$ and $84^{\times\times}$, where, as will be seen, there is the segment $G^{11}$ and two arms $G^{12}$ and $G^{13}$, the arm $G^{13}$ being out of line laterally with the segment $G^{11}$, as shown in Fig. $84^{\times\times}$, for a purpose hereinafter explained. Keyed to the shaft $D^{21}$ is another segment $G^{14}$. (Shown in elevation in Fig. 128.) The segment $G^{10}$ and segment $G^{14}$ are duplicates of each other. Extending up from the bottom of the casing G is a piece $G^{15}$, Fig. 1, which acts as a guide when the parts are being returned to their normal position, as hereinafter explained. Above this piece $G^{15}$ is a piece $G^{16}$, having a rack-bar $G^{17}$ on its face or edge and provided on its upper end with an arm $G^{18}$, which carries a screw $G^{19}$. The parts just named are substantially duplicated, as shown at $G^{20}$, $G^{21}$, $G^{22}$, $G^{23}$, and $G^{24}$, in both Figs. 1 and 2. It will be observed that the end of the screw $G^{19}$ is at a slightly lower level than the screw $G^{24}$. Now as the piston-head rises, as before explained, the segments $G^{10}$ $G^{14}$ and the respective parts to which they are attached are carried up until the arm $G^{13}$ on the segment $G^{10}$ strikes the screw $G^{19}$. The continued upward movement of the piston causes the sleeve $D^{73}$ (to which the segment $G^{10}$ is keyed) to revolve, and this of course revolves the shafts $D^{45}$ and $D^{72}$, and thus the pitmen $D^{46-2}$ are moved and the ring $D^{41}$ dropped. The ring $D^{41}$ with the parts which it carries have considerable weight, and to prevent the ring when the shafts $D^{46}$ are tripped from falling too rapidly I provide on the ring $D^{42}$ a series of brackets $D^{77}$, each carrying a dash-cup, and on the ring $D^{41}$ a plunger $D^{78}$ for each cup. By regulating the exit of fluid from the cups the descent of the ring $D^{41}$ can be accurately timed with the ascent of the piston. A half-revolution of the shafts $D^{46}$ will lower the ring $D^{41}$ to the maximum extent. Up to this time the frame $D^{15}$ has been resting on the ring $D^{41}$, but when the latter is lowered, as just explained, the frame $D^{15}$ drops down and rests on the ring $D^{43}$. By the time the ring $D^{41}$ is lowered, as just explained, the arm $G^{13}$ of the segment $G^{14}$ strikes the screw $G^{24}$, and this segment being keyed to the shaft $D^{21}$ throws the latter off its center and allows the frame $D^{17}$ to drop, together with the frame $D^{15}$, which at this time is resting on the ring $D^{43}$. Attached to each leg of the frame $D^{17}$ through the medium of the lug $D^{17-2}$ is what I will term a "plunger-rod" $D^{17-9}$, having on its lower end a plunger. Located on the piston-head $D^4$ under each plunger is a dash pot or cup $D^{24}$, (shown in detail in Fig. 71,) and the plungers $D^{17-9}$ entering these cups the descent of the frame $D^{17}$ is cushioned. By regulating the discharge of fluid from the cups the speed of the descent of the frame $D^{17}$ can be timed so as to coöperate with the advancing upward movement of the piston-head, or, in other words, the descent of the frame $D^{17}$ can be so regulated as that it will remain stationary with respect to the pressure-plate above while the piston-head $D^4$ and the other parts are being moved upward. Before the frame $D^{17}$ reaches its lower limit with respect to the piston-head $D^4$ the frame $D^{15}$ has struck the plate $D^{14}$ on the frame $D^{12}$ and is thereupon carried upward by the frame $D^{12}$, which is being moved by the piston $D^4$, the frame $D^{17}$, as before explained, remaining stationary with respect to the pressure-plate above. As the piston-head $D^4$ continues to move upward (with the frame $D^{17}$, and consequently the ring $D^{17-8}$, remaining stationary with respect to the pressure-plate above) the sectional ring $F'$, which is being carried upward by the piston-head $D^4$, will reach the chill-support $F^2$, and as the flask $F^5$ is bearing against the pressure-plate above the piston $D^4$ has necessarily reached its maximum upward movement, and thereupon the frame $D^{17}$ settles down slightly with respect to the piston-head $D^4$ and reaches it maximum depression with respect thereto. This carries the ring $D^{17-8}$ away from the chill-support and leaves the latter supported by the sectional ring $F'$.

It will now be seen that I have brought all parts of the pattern up into the flask and have created the necessary pressure on the same to form the mold. The exact function of each movement and each pattern part and flask in attaining this pressure will be later described. Meantime and simultaneously with the upward movement of the pattern into the sand I insert the vent-pins into the mold.

*Mechanism for inserting the vent-pins into the sand.*—As explained at the beginning of the specification, the pressure-plate $C^{20}$ is engaged to the lower end of the casing $C^{23}$, and as the entire pressure of the machine is thrown on this plate it is preferably stiffened by ribs $C^{21}$, Figs. 50 and 51. The pressure-plate is provided with suitable tapered orifices $C^{22}$ to permit the vent-pins to pass through.

$C^{18}$, Figs. 49 and 50, is a plate for carrying the vent-pins $C^{19}$. The plate proper is engaged to and supported by a frame $C^{18-1}$. In the plate proper is a series of grooves or channels $C^{18-9}$, and in these grooves or channels is placed the pin-clamping mechanism. This mechanism is shown in detail in Fig. 52. The plate is provided with a series of orifices $C^{19-1}$ to receive the pins $C^{19}$, and a tapered strip or segment $C^{18-2}$ is held to the plate and its height adjusted by a screw $C^{18-4}$, engaged in the plate and provided with a clamping-nut $C^{18-5}$. Springs $C^{18-6}$ are located under the segments $C^{18-2}$ and surround the screws $C^{18-4}$. Their purpose is to raise the segments $C^{18-2}$ against the clamping-nuts $C^{18-5}$. Between the segment $C^{18-2}$ and the orifices $C^{19-1}$ are clamping strips or segments $C^{18-3}$, each segment grooved at the point opposite the orifice. Obviously a depression of the segment $C^{18-2}$ will force the segment $C^{18-3}$ against the pins and clamp them. The vent-pins $C^{19}$ are tapered or sharpened on their lower ends, and the body of each pin is preferably roughened or milled, as shown in Fig. 53, to permit it to be tightly clamped in place. As will be later described, this vent-pin plate or board $C^{18}$ has a vertical motion to force the vent-pins into and withdraw them from the mold. In order to permit this plate $C^{18}$ to move upward past the sand-chute $C^{42}$, I cut the plate $C^{18}$ and accompanying parts away to form an opening or recess $C^{44}$, Fig. 49. Of course in the drag-machine this recess is not necessary, as the sand-chute is in the center of the machine, as hereinafter described. Supported by a bracket extending from the cylinder $D'$, Fig.

3, is a cylinder $C^{16}$, Fig. 2, having a fluid-inlet pipe $C^{16-1}$ and controlled by a valve $C^{17}$. Pivoted in the casing G is a shaft $G^{25}$, Fig. 1, having an operating-handle $G^{26}$. On the shaft $G^{25}$ is an arm. (Shown by dotted line $G^{27}$, Fig. 2.) Pivoted to this arm is a rod $G^{28}$, extending down to and pivoted to the valve-arm $C^{17}$. By tilting the lever $G^{26}$ the valve $C^{17}$ is opened or closed, as the case may be.

$C^{15}$ is the piston-rod, extending from the piston in the cylinder $C^{16}$ and is pivoted to a link $C^{14}$, and the latter is pivoted to an arm $C^{13}$ on the shaft $C'$, Figs. 2 and 3. This shaft is also shown in Fig. 20. Located on this shaft is a gear $C^3$, Figs. 19 and 20.

Supported by the ribs $C^{25}$ of the casing $C^{23}$ is a frame $C^9$, and this frame supports one end of each of the shafts $C^2$ $C^{2-10}$. The other end of each shaft is supported by boxes $C^8$ $C^{8'}$, bearing on the ribs $C^{25}$. On one end of the shaft $C^{2-10}$ is a crank $C^{5-1}$, having teeth $C^{5-2}$, as shown in Fig. 19, and on the other end of the shaft $C^{2-10}$ is a crank $C^{7'}$. Pivoted to the crank $C^{5-1}$ is a rod $C^{10}$, and pivoted to the crank $C^{7'}$ is a rod $C^{10-1}$. On one end of the shaft $C^2$ is a crank $C^5$, having a gear-face $C^{5-2}$, and pivoted to this crank is a rod $C^{10}$. On the other end of the shaft $C^2$ is a crank $C^7$, and pivoted thereto is a rod $C^{10-1}$. The four rods $C^{10}$ $C^{10-1}$ have their respective lower ends pivoted to the ears $C^{18-7}$ on the frame $C^{18-1}$, Fig. 50. On this frame are guide-posts $C^{18-8}$, which travel in the guides $C^{37}$ on the casing $C^{23}$, Fig. 10. The gear $C^3$, Fig. 19, is toothed on opposite sides of its periphery to mesh with the teeth $C^{5-2}$ on the crank $C^{5-1}$ and also to mesh with the intermediate pinion $C^6$, mounted in bearings on the frame $C^9$. The latter pinion meshes with the teeth $C^{5-2}$ on the crank $C^5$. It will thus be seen that a revolution of the shaft $C'$ through the medium of the piston-rod $C^{15}$ revolves the shafts $C^2$ and $C^{2-10}$, and thus raises or lowers the vent-pin plate or board $C^{18}$, as the case may be.

Located on the shaft $G^{25}$ on the outside face of the inner wall of the casing G is an arm $G^{30}$, and pivoted thereto is a depending rod $G^{31}$, Fig. 1, having a projection $G^{32}$ at its lower end. On the side of the casing $D^8$ is an arm $G^{36}$, Fig. 1. This arm is shown in detail in Fig. 136. It is hinged, as at $G^{37}$, so that it can swing horizontally, and a spring $G^{38}$ tends to keep it normally in one position. It is provided with a projection $G^{33}$ and an end $G^{39}$.

$G^{40}$, Fig. 135, is a plate engaged to the outer face of the inner wall of the casing G by slots in one member and bolts passing through the same to make it adjustable vertically. On the plate is a track $G^{41}$. Pivoted to the plate is what I will term a "switch" $G^{42}$, having a spring on its pivot to keep the free end of the switch normally against the track.

The arrangement of the parts is such that the spring $G^{38}$ tends to keep the end $G^{39}$ normally against the track $G^{41}$. As the casing $D^8$, carrying the arm $G^{36}$, ascends, the end $G^{39}$ will ride up on the face of the switch $G^{42}$. This brings the projection $G^{33}$ in the path of the projection $G^{32}$ on the rod $G^{31}$ and moves the latter upward. When the projection $G^{32}$ has been raised the desired height, the end $G^{39}$ rides off the face of the switch $G^{42}$ and is thrown over against the track $G^{41}$ by the spring $G^{38}$. This carries the projection $G^{33}$ away from the projection $G^{32}$, and the arm $G^{36}$ can move up as far as desired. When the casing $D^8$ drops down, the spring $G^{38}$ will keep the end $G^{39}$ against the track $G^{41}$ until the switch-point has been passed, and on the upward movement the same operation takes place. The upward movement of the projection $G^{32}$ tilts the arm $G^{30}$ and revolves the shaft $G^{25}$. This opens the valve $C^{17}$ and admits the fluid to the cylinder $C^{16}$ to raise the piston-rod $C^{15}$, and the latter, through the shaft $C'$, forces the vent-pin board down and forces the vent-pins, which have been previously set to the required height, into the sand, their ends terminating closely adjacent to, but not quite reaching the point reached by the pattern when it has finally formed the mold. I prefer to allow about a thirty-second of an inch, more or less, between the end of each vent-pin and the adjacent face of the pattern when the pattern has reached its maximum height.

*Mechanism for filling the sand-reservoirs.*—As before explained, the revolution of the shafts $C^{2-10}$ and $C^2$ drops the vent-pin board. On this shaft $C^2$, Fig. 20, is a gear $A^{26-1}$ which meshes with a gear $A^{26}$ on the counter-shaft $A^{25}$, carried in the boxing $A^{25-1}$, the latter supported from the ribs $C^{25}$. On the shaft $A^{25}$ is a beveled gear $A^{24-1}$, which meshes with the beveled gear $A^{24}$ on the shaft $A^{23}$, Figs. 19, 20, 21, and 37. Keyed to the shaft $A^{23}$, Fig. 37, is what I will term a "double" segment $A^{21}$. This double segment-gear is shown in detail in Figs. 46 and 47 and is provided with two-part segments $A^{50}$ $A^{51}$ out of alinement with each other. (Shown in Fig. 46.) Pivoted on the segment $A^{50}$ is a catch $A^{21-1}$, one end, $A^{21-3}$, of said catch projecting out and being in line with the teeth of the segment $A^{50}$, while the other end, $A^{21-4}$, of the catch bears against a shoulder on the hub of the segment. A spring $A^{21-2}$ keeps the end $A^{21-4}$ normally against this shoulder, but allows the end $A^{21-3}$ to tilt out of alinement with the teeth $A^{50}$ against the spring-pressure. The shaft $A^{23}$ extends through the frame $A^{29}$, Fig. 37, depending from the casing $A^9$, and the upper end is journaled in the flange of the casing $A^{9-1}$, the lower end being journaled in the boxing $A^{25-1}$, Fig. 21. $A^{19}$ is another shaft, the lower end journaled in the frame $A^{29}$, Figs. 37 and 38. The upper end of this shaft is journaled in the frame $A^{27}$, extending from the casing $A^{31}$ $A^{32}$. Keyed to the lower end of the shaft $A^{19}$ is a segment $A^{20}$, adapted to mesh with the segment $A^{51}$ in the gear $A^{21}$. Surrounding the shaft $A^{19}$ above the segment $A^{20}$ is a sleeve $A^{18-2}$, provided with a segment $A^{18-4}$, the latter having a projection $A^{18-3}$. The end of the segment has one or two of its teeth cut away, as at $A^{18-5}$, and the tooth $A^{18-6}$ on the end is projected slightly beyond the plane of the other teeth, as shown clearly in Fig. 45, for a purpose which I will later explain. Engaged to the sleeve $A^{18-2}$ is a beveled gear $A^{18-1}$. On the face of the gear $A^{16}$ is a beveled segment $A^{17}$, which meshes with the beveled gear $A^{18-1}$, so that a revolution of the sleeve $A^{18-2}$ will revolve the gear $A^{16}$, and, as previously described, the movement of the gear $A^{16}$ opens or closes the doors $A^{10}$, as the case may be. Engaged to the shaft $A^{19}$ by a feathered engagement is a beveled gear $A^{18}$. The engagement is feathered to permit the gear $A^{18}$ to move vertically on the shaft when the casing $A^{31}$ $A^{32}$ is adjusted and yet insure a revolution of the pinion $A^{18}$ with the shaft. Surrounding the trunnion $A^{33}$ of the doors $A^{34}$ is a beveled segment $A^{14-1}$, held onto the trunnion by the collar $A^{14-4}$. This beveled segment carries the catch $A^{14-2}$, which engages in the notch $A^{14-3}$ on the inner periphery of the gear $A^{14}$, as previously explained. Engaged to the shaft $A^{19}$ is another beveled gear $A^{19-1}$, similar to the gear $A^{18-1}$, and engaged also by a feathered engagement for the same reason. This meshes with the beveled segment $A^{12-1}$ on the face of the segment $A^{12}$. The latter is keyed to the trunnion of the middle door, and the side doors are operated through the segment $A^{13}$ on the trunnions of the side doors, the operation in this respect being substantially the same as the other two sets of doors. Now, as will be seen, the revolution of the shaft $C^2$ for moving the vent-pin board also revolves the shaft $A^{23}$, and the latter revolves the segment $A^{21}$.

Figure 129:
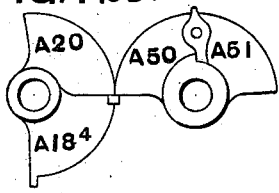
Figure 130:
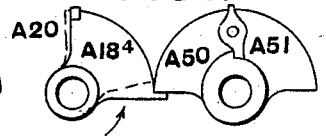
Figure 131:
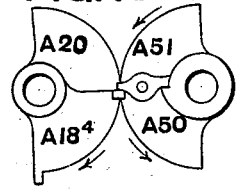
Figure 132:
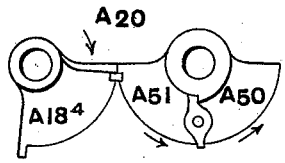
Figure 133:
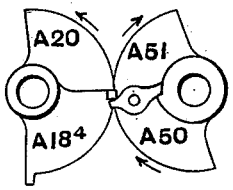
Figure 134:
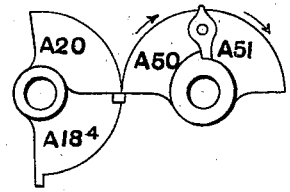

In order that the operation of the sand-doors may be clearly understood, I have provided a series of diagrammatic views, (shown in Figs. 129 to 134, inclusive,) illustrating the various positions of the segments during the various operations of opening and closing the doors, and I wish to call attention at this point to the fact that where one segment—as, for instance, $A^{20}$—is directly beneath the other segment—as, for instance, $A^{18-4}$—I have thrown them slightly out of alinement when viewed in plan, so they may both be seen. Referring now to Fig. 129, the various segments are in the position which they would occupy with all the sand-doors closed. Through the operation of opening the lower sand-doors, as previously described, the beveled gear $A^{17}$, Fig. 37, revolves, and this revolves the beveled gear $A^{18-1}$ on the sleeve $A^{18-2}$, and the segment $A^{18-4}$ is thereby thrown to the position shown in Fig. 130, the other segment of course remaining unmoved. The relative position between the segments $A^{14-4}$ and $A^{50}$ is such that the teeth $A^{18-4}$ will not engage with $A^{50}$ when but one of the segments is moving—as, for instance, in the movement just described. At the tail end of the movement of the segment $A^{18-4}$ the cut-away portion $A^{18-5}$ comes opposite the end of the segment $A^{50}$, with the tooth $A^{18-6}$ resting against the tooth $A^{53}$. The shaft $A^{23}$ is now revolved, carrying with it the segments $A^{50}$ $A^{51}$. The initial movement of the segment $A^{50}$, bearing against the tooth $A^{18-6}$, starts the segment $A^{18-4}$, and this causes the teeth $A^{50}$ to engage with the teeth on the segment $A^{18-4}$ and revolve the segment $A^{18-4}$ to the position shown in Fig. 131. This of course revolves the lower sand-doors and closes them. Now a continued revolution of the shaft $A^{23}$ brings the tooth $A^{21-3}$ on the catch $A^{21-1}$ against the projection $A^{18-3}$ on the segment $A^{18-4}$ and kicks the latter out of the way, so that its teeth will not engage with $A^{50}$ on the return movement. The initial quarter-turn of the shaft $A^{23}$ just described has meantime brought the segment $A^{51}$ around to the point where its teeth will engage with the segment $A^{20}$, as shown in Fig. 131. The continued movement of the shaft $A^{23}$, or the second quarter-turn thereof, revolves the segment $A^{20}$ to the position shown in Fig. 132. This revolves the shaft $A^{19}$. At this point I will digress to call attention to the fact that, as previously explained, when the middle doors $A^{34}$ were opened the catch $A^{14-2}$, which was on the beveled segment $A^{14-1}$, was disengaged from the notch $A^{14-3}$ in the gear $A^{14}$, thus allowing the gear $A^{14}$ when the doors open to revolve around to the position shown in Fig. 40. Now as the second quarter-turn of the shaft $A^{23}$, as illustrated in Fig. 132, gives the shaft $A^{19}$ the quarter-turn just described and this brings the catch $A^{14-2}$ around to the notch $A^{14-3}$ and permits it to engage in said notch. This same quarter-turn of the shaft $A^{19}$, just described, acts through the gear $A^{19-1}$, meshing with the beveled gear $A^{12-1}$ on the gear $A^{12}$, to open the upper sand-doors $A^{35}$. It will thus be seen that by the half-turn of the shaft $A^{23}$ (and this is its maximum movement) we have closed the lower sand-doors, permitted the middle sand-doors to remain open, (but engaged them so that the return movement will close them,) and opened the upper sand-doors. This of course will allow the sand in the hopper above the upper sand-doors to drop down and fill both reservoirs. Now on the reverse movement of the shaft $A^{23}$ (and the mechanism for accomplishing this will be later described) segment $A^{51}$, which has of course remained in mesh with the segment $A^{20}$, will throw the segment $A^{20}$ to the position shown in Fig. 133, thus of course giving the shaft $A^{19}$ a quarter-turn and operating through the catch $A^{14-2}$, engaging in the notch $A^{14-3}$, to close the middle sand-doors and of course closing the upper sand-doors, the movement being simply the reversal of that in opening them. This same quarter-turn of shaft $A^{23}$ in the reverse movement has brought the segment $A^{50}$ to the position shown in Fig. 133, but the segment $A^{50}$ will not disturb the segment $A^{18-4}$, for the reason that the pivoted catch $A^{21-1}$ when the tooth $A^{21-3}$ strikes the projection $A^{18-3}$ tilts against the spring-pressure $A^{21-2}$ and permits the segment $A^{50}$ on the last quarter-turn of the reverse movement to slip past the segment $A^{18-4}$ without engaging it. This brings us to the position shown in Fig. 134, which is the initial position with all the doors closed and corresponds with Fig. 129.

It will now be seen that the operation of forming the mold and including the insertion of the vent-pins is completed and we are ready to withdraw the various parts from the sand or mold.

*Mechanism for withdrawing the vent-pins, sprues, and plunger.*—Before describing the withdrawal of the parts, however, I wish to call attention to the fact that when the piston-head $D^4$ reaches its maximum height it forces the inner false flask $C^{29}$ up until the catch $E^{29}$, Fig. 89, can engage the flask, and the latter is held there when the plunger descends ready for the next operation. At the same time the outer false flask $C^{28}$ has also been forced up and is engaged by the catches $E^{12}$, Fig. 89, so that when the piston descends it is held up ready for another operation.

The operator to withdraw the vent-pins grasps the lever $G^{26}$ and moves it, say, to the right, as shown in Fig. 2, and this, through the arm $G^{27}$ and rod $G^{28}$, moves the valve $C^{17}$ in the cylinder $C^{16}$, and this allows the fluid beneath the piston-head to escape and admits pressure above the piston-head and forces the latter down, thus carrying the rod $C^{15}$ down and revolving the shaft $C'$ in the direction opposite to that in which it was revolved to force the vent-pins down. This reverse revolution of course carries the vent-pins up out of the sand. Referring now to Fig. 20, it will be observed that the gear $C^3$ has fixed to it a beveled gear $C^4$, which meshes with a beveled gear $B^{31}$ on the lower end of the shaft $B^{30}$, Figs. 19 and 21. This shaft $B^{30}$ is also shown in Figs. 1, 2, and 3 and is provided on its upper end with a beveled gear $B^{29}$, having a feathered engagement with the shaft $B^{30}$, so that the gear can be adjusted vertically on the shaft and yet revolve therewith. This adjustment is to correspond with the adjustment of the ring $B^{10}$, which carries the sprue-lifting mechanism. On the shaft $B^{10-2}$ previously described and outside of the casing $B^2$ is a beveled gear $B^{28}$, which meshes with the beveled gear $B^{29}$, Figs. 25 and 27. Thus a revolution of the shaft $B^{30}$ acts to revolve the shaft $B^{10-2}$. Of course when the shaft $C'$, Fig. 20, is revolved to force the vent-pins into the sand the shaft $B^{30}$ will be revolved and the crank-arm $B^{10-1}$ would be thrown to its lower position—that is, to the position shown in Fig. 25. This same movement of the crank-arm acts through the arm $B^{36}$ coming in contact with the shoulder $B^{9-2}$ on the disk $B^{9-4}$ to revolve said disk, and thus through the pitman $B^{12}$ acts to lower the plate $B^{13}$ where it engages the upper end of the plunger and acts to stop the latter in its upward movement, thus causing the plunger to act as a part of the pressure mechanism. When the patterns have reached their maximum height, the plate $B^{13}$ is ready for the catch $B^{13-1}$ to engage the plunger. Now when the shaft $B^{30}$ is revolved in the opposite direction—that is, when the vent-pins are being lifted—the rod $B^{14}$, and consequently the fitting $B^{16\prime}$, are lifted. It will be remembered in the description of the mechanism for dropping the sprues I described how the foot $B^{16-4}$ was disengaged from the notches $B^{18-2}$ of the sprue-fitting, thus allowing the latter to drop. The fitting $B^{16\prime}$ and the rod $B^{16-2}$ have now been moved to their lower position, as just described, and as the pattern ascends and carries the sprues upward when the pattern has reached its maximum height it has brought the sprue-fitting $B^{18}$ to the point where the foot $B^{16-4}$ can engage in the teeth $B^{18-2}$, the foot being held there by the spring-pressure $B^{16-3}$. Now, as just explained, a revolution of the shaft $B^{10-2}$ acts through the rod $B^{14}$ to lift the fitting $B^{18}$, and consequently the sprues $B^{20}$. On the disk $B^{9-4}$ of the sleeve $B^9$ is another projection or shoulder $B^{9-1}$ and on the crank-arm $B^{10-1}$ another arm $B^{35}$, the latter adapted to contact with the shoulder $B^{9-1}$. The first quarter-turn of the shaft $B^{10-2}$, as just described, brings the arm $B^{35}$ around to the shoulder $B^{9-1}$. This revolution of the shaft $B^{10-12}$ through the rod $B^{14}$ draws up or strips the sprues through the plunger and through the plate or fitting $B^6$. At the end of this quarter-turn the arm $B^{35}$, coming in contact with the shoulder $B^{9-1}$, starts the revolution of the disk $B^{9-4}$, and for the other quarter-turn the plunger and sprues are moved together to their maximum height, thus tripping them through the ring $B^6$.

*The pattern-stripping mechanism.*—In the operations just described it will be remembered that the piston-rod $C^{15}$ descends in the operation of lifting the vent-pin, sprues, and plunger. It will also be remembered that I have described the piston $D^4$ as having reached its maximum height. This would of course bring all of the parts supported by the piston-head to their maximum height. Extending from the side of the casing $D^3$ are two arms $D^{10}$, Fig. 12, and journaled in these arms is a shaft $D^{29}$. On the end of this shaft $D^{29}$ is a beveled gear $D^{30}$, which meshes with the gear $D^{28}$ on the shaft $D^{22}$, Figs. 4 and 12. On the other end of the shaft $D^{29}$ is a pinion $D^{31}$ and meshing therewith is a rack-bar $D^{32}$. Keyed to shaft $D^{33}$, one end of the latter being journaled in the arm $D^{10}$, while the other end is journaled in the box $D^{9-1}$ on the arm $D^9$, Fig. 12, is what I will term a "compound" arm $D^{34}$. (Shown in detail in Figs. $21^{\times}$ and $21^{\times\times}$ and shown also in Fig. 2.) This arm $D^{34}$ has two arms $D^{34-1}$ and $D^{34-2}$, and the ends of the arms when in position are out of vertical alinement with each other. Obviously when the piston-head $D^4$ is raised the arm $D^{34-1}$ will travel up to a point below the arm $C^{15-1}$ on the piston-rod $C^{15}$. Now as the piston-head descends in the operation of raising the vent-pins, &c., arm $C^{15\prime}$ strikes the arm $D^{34-1}$, revolves the shafts $D^{33}$ and $D^{29}$, and throws the eccentric-shaft $D^{22}$ off its center, when the weight of the frame $D^{12}$ and the parts which it carries will carry it down the maximum distance permitted by the eccentrics. $G^{34}$, Fig. 2, is a guide carried by the casing G and on the interior of the same, the casing being provided with a slot opposite, in which the arm $D^{34-2}$ travels, the end of the arm $D^{34-2}$ bearing on said guide. When the arm $D^{34-2}$ reaches the top of the guide, it rides off and permits the arm $D^{34-1}$ to be tilted by the arm $C^{15-1}$. Later, when the piston-head is dropped this arm $D^{34-2}$ rides onto the face of the guide $G^{34}$ and through the mechanism above described again throws the eccentric-shaft to its upper position. Engaged adjustably to the piston-rod $C^{15}$ is another arm $C^{15-2}$. This arm is shown in detail in Fig. 137. It is substantially a duplicate of the arm $G^{36}$ previously described, is hinged, as at $C^{15-3}$, is provided with a spring $C^{15-4}$, has an end $C^{15-5}$, and a projection $C^{15-6}$. Supported adjustably from a lug or arm extending from the cylinder $D'$ is a plate $C^{15-7}$, carrying a track $C^{15-8}$ and spring-impelled switch $C^{15-9}$. As the rod $C^{15}$ moves down, the end $C^{15-5}$ of the arm $C^{15-2}$ rides along the face of the switch $C^{15-9}$, and the projection $C^{15-6}$ is thereby held out into the path of the projection or shoulder $G^{35}$ on the rod $G^6$, thus moving the latter down and opening the valve $G^8$ of the cylinder $D'$. As soon as the requisite depression of the rod $G^6$ is obtained the end $C^{15-5}$ rides off the pivoted end of the switch and the spring $C^{15-4}$ carries it over to the track $C^{15-8}$ and out of the path of the shoulder $G^{35}$. When the rod $C^{15}$ again ascends, the end $C^{15-5}$ rides up the track $C^{15-8}$ past the switch and projection $G^{35}$ until it passes the switch-point, when on its downward movement the switch picks it up and the operation is repeated. The movement of the shoulder $G^{35}$, as just described, by the arm $C^{15-2}$ is just after the dropping of the frame $D^{12}$, and thus the valve $G^8$ is opened just after the frame $D^{12}$ is dropped. This allows the pressure fluid to escape, thus letting the piston-head and all the parts thereon drop away. It will be remembered that in the description of the mechanism for forcing the patterns and flask up the crank-shaft $D^{21}$ was thrown off its center by the segment $G^{14}$, while the auxiliary crank-shafts $D^{46}$ were thrown off their centers by the segment $G^{10}$. Both these cranks in reaching their lower limit would give the segments $G^{10}$ $G^{14}$ a half-revolution, so that when the piston-head is at its maximum height the arm $G^{12}$ of each segment $G^{10}$ $G^{14}$ would be above the upper end of its respective piece $G^{16}$ $G^{21}$. Now as the piston-head starts down the arms $G^{12}$ will bear on the guides $G^{16}$ $G^{21}$ and will be tilted until the teeth in the segments $G^{11}$ will engage with the respective rack-bars $G^{17}$ $G^{22}$, and the latter will continue the revolution of the segments $G^{10}$ $G^{14}$ until the guides $G^{15}$ $G^{20}$ are reached, when the end of each segment $G^{11}$ will ride on these guides and complete the return of each segment $G^{10}$ $G^{14}$. The revolution of these segments will, of course, through the mechanism previously described throw the crank-shafts up with respect to the piston-head, or, in other words, will increase the distance between the parts carried by the crank-shafts and piston-head. It will be remembered that the sectional ring F′, which is carried directly by the casing $D^8$, bore against the chill-support $F^2$ with the ring $D^{17-8}$ below the level of the sectional ring F′, when the parts reach their maximum height. Now as the piston-head descends it carries with it the sectional ring F″. As soon as the crank-shafts are brought into operation, the ring $D^{17-8}$ (which is supported from the frame $D^{17}$ and later supported from the shaft $D^{21}$) slows its speed very materially, remaining almost stationary with respect to the mold and pressure-plate, while the sectional ring F′ descends with the speed of the piston-head, the result being that the ring $D^{17-8}$ soon picks up the chill-support and carries it on down. It will be remembered that the frame $D^{15}$, when the parts were at their maximum height, rested on and was supported by the plate $D^{14}$ on the frame $D^{12}$. Even when the frame $D^{12}$ was dropped through the revolution of the shaft $D^{22}$, as previously explained, the frame $D^{15}$ would not reach its supporting-ring $D^{43}$ on the frame $D^{17}$; but as the frame $D^{17}$ is moved by the crank-shaft $D^{21}$ and its downward speed materially retarded thereby the downward movement of the piston-head and the frame $D^{12}$ causes the frame $D^{15}$ to overtake the frame $D^{17}$, and the frame $D^{15}$ is thereupon picked up by the ring $D^{42}$, resting on the lower ends of the guides $D^{15\prime}$. About this time the crank-shafts $D^{46}$ are brought into play, as above described, and they cause the ring $D^{41}$ to rise with respect to the ring $D^{43}$ and pick up the frame $D^{15}$, and the parts will continue to descend with the piston-head to the position from whence they started.

*Mechanism for transferring the flask containing the sand mold from the machine.*—At the beginning of the specification I described a crane-arm for picking up the flask and carrying it into the machine. On the opposite side of the machine, Fig. 107, is a similar crane-arm for picking up the flask as the piston-head descends and carrying it out of the machine. I do not consider it necessary to specifically describe this crane-arm. For the purpose of distinguishing it from the crane-arm $H^{10}$, I will letter it $H^{52}$, Figs. 106 and 107. On the inner face of this arm is a spring-catch $H^{53}$, corresponding substantially with the spring-catch $H^{21}$. This catch when the arm $H^{52}$ is thrown in engages a vertically-movable shoulder $H^{54}$ on the standard $H^{50}$, Fig. 106. A spring $H^{60}$ tends to keep the shoulder normally in its lower position. Pivoted in a lug H$^{61}$, extending from the standard H$^{50}$, is a lever H$^{62}$. Extending up from the portion H$^{64}$ of said lever is a vertically-movable rod H$^{65}$, the upper end bearing on but not engaged to the shoulder H$^{54}$. On the arm D$^9$, Fig. 12, is a projection H$^{66}$. As the casing D$^8$ descends the projection H$^{66}$ strikes the arm or portion H$^{63}$ of the lever, and thus tilts the portion H$^{64}$, forces up the rod H$^{65}$, and forces up the shoulder H$^{54}$ until the latter clears the catch H$^{53}$ and allows the spring H$^{20}$ to throw the arm out. When the casing D$^8$ again moves up, the lever H$^{62}$ tilts on its pivot and allows the projection H$^{66}$ to ride past without affecting the shoulder H$^{54}$, the latter having been returned to its lower position by the spring H$^{60}$ and its descent limited by the stop H$^{67}$. When the crane-arm H$^{52}$, carrying the flask, has been thrown out, as just described, the operator then opens a suitable valve controlling the cylinder which supports the arm H$^{52}$ and allows the arm to deposit the flask at the desired point outside the machine.

*The chaplets.*—Referring now to Figs. 34, 35, and 36, I will describe the chaplets and the shield for protecting the same from sand. In the lower edge of the runner-box, as shown in Figs. 93 and 94, are the chaplets S. Three of them are shown in this case, but their number might of course be varied. Each chaplet is provided with a stem S', Fig. 34, which enters a corresponding orifice in the runner-box F$^{5-2}$, a proper frictional engagement being provided by wrapping a piece of paper or other combustible substance around the stem S' before the insertion of the stem in the orifice, the idea being to cause enough friction to hold the stem in the orifice, but not enough to prevent the chaplet being adjusted therein, as hereinafter described. Extending up from the pattern, which in the present instance is section R$^2$ thereof, (although it might extend from any other part of the pattern mechanism,) is a flange S$^2$, forming a socket in which the casing S$^3$ of the chaplet is engaged, preferably by screw-threads, as shown. A flange S$^4$ acts as a stop and also as a bearing-flange to form a perfectly solid engagement. S$^5$ is a tube having a bearing S$^6$ on its end and sliding in the casing S$^3$. S$^7$ is a spring, one end bearing on the tube S$^5$, while the other end bears on the flange of the casing S$^3$, the spring tending to keep the tube normally in the upper or outer position. S$^8$ is a bearing-ring screwed into the interior of the casing S$^3$ and forming a bearing for the tube S$^5$ as it emerges from the casing S$^3$. S$^9$ is a plug-fitting extending up into the casing S$^3$ and into the tube S$^5$. It is provided on its end with a cap S$^{10}$, interiorly threaded to fit exterior threads on the end of the casing S$^3$, so that by a revolution of the stem or plug or fitting S$^9$ the end will be adjusted in or out with respect to the outer end S$^{11}$ of the tube S$^5$. The stem S$^9$ may, if desired, be provided with orifices S$^{12}$, whereby it may be revolved from the upper side of the pattern to properly adjust it. S$^{13}$ is a ring engaged into the interior threads of the casing S$^3$ and adjustable by means of said threads. It forms a stop for the upper or outer movement of the tube S$^5$. The operation is obvious. The chaplets S are inserted in the lower edge of the runner-box with an engagement sufficiently loose to permit them to move up when pressure is brought against them. The tube S$^5$ is of sufficient length so that before the patterns are moved up it will reach and engage over the chaplet, as shown in Fig. 34, and have a firm bearing against the bottom of the runner-box F$^{5-2}$. Thus when the sand is introduced into the flask the tube S$^5$ prevents it from reaching the chaplet, and as the pattern ascends the tube will be forced down into the casing S$^3$. Finally the chaplet will bear against the end S$^{12}$ of the plug S$^9$, and the latter will force the chaplet into the cope and adjust it so that it projects from the runner-box the requisite distance. Thus as the pattern recedes the chaplets project through the mold in the usual manner; but they have all the time been protected from the sand by the tube S$^5$.

*Operation of forming the sand mold.*—I have previously described the mechanism for manipulating the patterns and flasks, and I will now describe the effect of the operation of those mechanisms in forming the mold, and in doing so a reference to Figs. 108 to 117 will aid in explaining the operation. It will be remembered that under the heading "The pattern and mechanism for moving the same" I described the frame D$^{15}$ as provided on its upper end with three concentric rings M', M$^2$, and M$^3$ and the frame D$^{12}$ provided with two concentric rings P' and P$^2$. These rings, together with the inwardly-projecting ring flange Q' on the casing D$^8$, Fig. 4, and the ring Q$^2$, supported directly by the posts or supports D$^{25}$, Fig. 4, constitute the pattern-supporting rings. It should also be borne in mind that the rings Q' and Q$^2$ are immovable with respect to the piston-head and only move with the latter, that the rings P' and P$^2$ are, through the frame D$^{12}$, supported and operated with respect to the piston-head by the eccentric-shaft D$^{22}$, and that the rings M', M$^2$, and M$^3$ (which are on the frame D$^{15}$) may be moved either by the eccentric-shaft D$^{22}$ when they are supported from the frame D$^{12}$ or by the crank-shaft D$^{21}$ when they are supported from the ring D$^{43}$ on the frame D$^{17}$ or by the crank-shafts D$^{46}$ when they are supported from the ring D$^{41}$, (which is carried and moved by the crank-shafts D$^{46}$,) the latter of course being carried by the frame D$^{17}$. In this instance the pattern is made up of three pieces R', R$^2$, and R$^3$, the portion R' at the beginning of the operation resting on the ring M', the portion R$^2$ resting on the ring Q$^2$, and the portion R$^3$ resting on the ring M$^3$ through the medium of the lugs R$^4$ on the portion R$^3$ of the pattern. I wish also at this point to explain the term "pressure mechanism," as employed in my specification and claims. The pressure-plate $C^{20}$, ring $B^6$, and plunger $B^{17}$ (when the latter has been arrested in its upward movement, as before explained) constitute a stationary mechanism, against which the sand is forced by the upward movement of the pattern and flask supporting mechanism. My term "pressure mechanism" does not, therefore, necessarily mean movable mechanism. In my claims, however, I have referred to "vertically-movable" pressure mechanism. When this term is employed, it relates, of course, not to stationary pressure mechanism, but to the mechanism which moves the pattern parts or flask, or both, upward to obtain the desired compression, said movable pressure mechanism operating against the pressure mechanism above.

Figure 114:
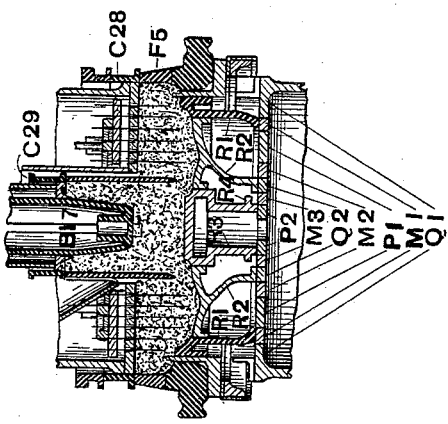

The relative position of the pattern parts at the beginning of the operation is shown in Fig. 128 and is also shown in diagrammatic Fig. 108. The flask is then placed in the machine and the sprues and outer false flask dropped, as shown in Fig. 109, and at this point the first lot of sand is dropped. In Fig. 110 the inner false flask has been dropped, together with the plunger and the second lot of sand. The piston-head is now advancing or rising, and all the parts move with it without a change in their relative position until the outer false flask has moved up to bring the pressure-plate about half-way down the outer false flask. The operation up to this point is illustrated in Fig. 114. When the parts reach the position, as shown in Fig. 114, just described, the sand has received its preliminary pressure, the compression, so long as the flask is moving upward, taking place on the top of the sand. Of course above the high parts of the pattern—that is, where the sand is thinnest—it is compressed to a greater degree than that above the lower parts of the pattern. It therefore becomes desirable to allow the higher parts of the pattern to remain stationary with respect to the pressure-plate while the lower parts are still advancing. This is accomplished through the crank-shafts $D^{46}$. When they are revolved, they permit the rings $M'$ $M^2$ $M^3$ to remain stationary with respect to the pressure-plate while the piston-head and the balance of the parts are advancing. This causes the parts $R'$ $R^3$ of the pattern to cease their upward movement and the part $R^2$ of the pattern, together with the flask, to move up to the position shown in Fig. 112, with the flask bearing against the pressure-plate. Meantime the vent-pins have been dropped. This last movement of the flask and portion $R^2$ of the pattern has caused the sand above the portion $R^2$ and along the flask to be compressed still further and has given us all the pressure desired along the flask. Thereupon the shaft $D^{21}$ is thrown, thus permitting the flask to remain stationary with respect to the pressure-plate, while the piston-head still advances, carrying the portion $R^2$ of the pattern.

Figure 116:
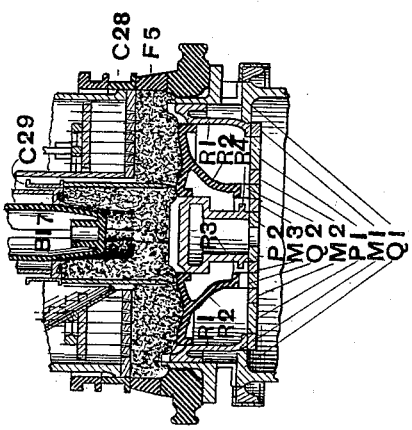

This brings us to the position shown in Fig. 116. At this point the pattern $R^3$ is picked up by the ring $P^2$, which, it will be remembered, is on the frame $D^{12}$, which is advancing with the piston-head. Thereupon the portions $R^2$ $R^3$ of the pattern are advancing with the piston-head, the portion $R'$ and the flask remaining stationary with respect to the pressure-plate, thereby compressing the sand still more above the portions $R^2$ $R^3$ of the pattern. This brings us to the position shown in Fig. 114. When this point is reached, the sand is compressed substantially the same throughout the mold. At this point the frame $D^{12}$, and consequently the rings $M'$, $M^2$, $M^3$, $P'$, $P^2$, and $Q^2$, (all being in horizontal alinement,) are advanced together, the flask meanwhile remaining stationary with respect to the pressure-plate. Now, as just mentioned, the sand being compressed to substantially the same extent throughout the flask and the patterns all being in proper alinement to form the mold, it is desirable to give an additional pressure to the entire mold on the face of the pattern. The advance of the entire pattern, which now takes place, accomplishes this, the final resting-point being shown in Fig. 118. This completed motion of the pattern has brought the complete pattern up to its desired point with relation to the vent-pins, the latter standing a very slight distance above the pattern and the sectional ring $F'$ on the casing $D^8$ resting against the chill-support, as previously described. It will be remembered that near the beginning of the operation the plunger was dropped down onto the sand within the runner-box. As the flask and runner-box advance upward they carry the plunger back up within the casing $B^2$ (which is stationary) until the plunger strikes the ring $B^{13}$, which, as previously explained, has been dropped down to its lower position. This plate $B^{13}$ here acts as a stop for the plunger, thus causing the lower end of the plunger, together with the ring $B^6$ on the casing $B^2$, to act as a pressure-plate for the sand within the runner-box, the parts remaining in this position until the final position (shown in Fig. 118) is reached. From the above it will be seen that the first movement of the piston compresses the sand in the top of the flasks, and this continues as long as the flasks move upward, that the most compression in this first movement is over the highest parts of the pattern, that these parts ceasing their movement the compression above them ceases, that as soon as the flasks cease their upward movement the compression on the top ceases, and that the upward movement of the pattern parts when the flasks are stationary compresses the sand on the lower side—that is, the sand on the face of the moving pattern parts. We are now ready for the stripping. First, the vent-pins are withdrawn, stripping through the pressure-plate. Substantially at the same time the sprues are withdrawn, stripping through the ring $B^6$ and the plunger. The plunger is then withdrawn, stripping through the ring $B^6$. The parts above the mold are now all stripped. Just after the vent-pins, sprues, and plunger have started the arm $C^{15-1}$ strikes the arm $D^{34-1}$ and moves the eccentric-shaft $D^{22}$. This causes the frame $D^{12}$, (carrying also $D^{15}$,) and consequently the rings $P'$, $P^2$, $M'$, $M^2$, and $M^3$, to move down before the piston-head starts down, and consequently while the casing $D^8$ and flask which is resting thereon and also the rings $Q^2$, carrying the portion $R^2$ of the pattern, remain stationary the other parts drop away, thus stripping the portion $R'$ and $R^3$ of the pattern through the portion $R^2$ of the pattern and the chill-support. The result of this movement is illustrated in Fig. 116. When this movement is completed, the arm $C^{15-2}$ has reached in its downward movement the lug $G^{35}$, and the latter opens the valve of the cylinder $D^8$ and allows the pressure to escape therefrom, thus permitting all the parts to drop away from the pressure-plate. At this point, however, the segment $G^{14}$ commences to revolve the shaft $D^{21}$, so that while the piston is descending the frame $D^{17}$ is descending at a slower speed, and as soon as the flask, which up to this time has been supported by the sectional rings $F'$ on the casing $D^8$, overtakes the ring $D^{17-8}$ on the frame $D^{17}$ the said ring $D^{17-8}$ assumes the support of the flask, and the piston thereupon carries the portion $R^2$ away from the mold, this portion being the last to leave the mold. As soon as the runner-box has cleared the pressure-plate the trunnions of the flask strike the crane-arm, and as soon as all of the parts below the mold have cleared the flask the latter is swung out.

*The drag-machine.*—It will be remembered that in the opening of my specification I called attention to the fact that the drawings showed both a cope and a drag machine; that the drag-machine was substantially the same as the cope-machine, except that certain mechanisms of the cope-machine were dispensed with in the drag-machine; that I would therefore first describe the cope-machine and then describe the drag-machine. Comparing now Figs. 3 and 4 and 7 and 8, it will be seen that the machines are identical up to and including the mechanism on which the pattern and flask directly rest. In other words, in the drag-machine, with one or two minor variations which I will later describe, the structure is the same as the cope-machine up to and including the rings $M'$, $M^2$, $M^3$, $P'$, $P^2$, $Q'$, and $Q^2$. The cope-machine of course forms one-half of or what is technically termed the "cope" of the mold. Consequently when the drag is formed there is no necessity of any sprues nor of any pressure-plate for the cope, which, as above explained, is the plunger and ring $B^6$, nor is there any inner false flask. So, also, there is necessity for only one lot of sand. In the drag-machine therefor I have dispensed with all the mechanism relating to the sprues, plunger, inner false flask, and the dumping of the second lot of sand. The removal of the plunger and sprue mechanism enables me to locate the sand reservoir and chute directly above the central opening of the pressure-plate and allows me to feed the sand directly down therethrough. In the drag-machine as soon as the sand has been dropped the bottom board is swung into place, and as the pattern mechanism advances upward the bottom board comes to a bearing against the pressure-plate and in turn becomes the pressure-plate. The dumping of the first lot of sand is accomplished in exactly the same way as in the cope-machine, the dropping of the outer false flask is accomplished in the same way, and the movement upward of the pattern and flask supporting mechanism is of course the same. I will now describe in detail the mechanism peculiar to the drag-machine.

In the first place there is no chill accompanying the flask, and the part that corresponds with the chill-support in the cope-machine I will term the "flask-support" in the drag-machine. This is shown at $F^3$, Fig. 7. Instead of having an outwardly-extending rim or flange $F^{19}$, as shown in the cope-machine, Fig. 97, it has an inwardly-extending flange $F^{3-1}$, Fig. 99, the purpose being to carry the flange inside the machine as long as it is not needed to support the chill. The upwardly-projecting flange $F^{17}$ is slightly longer than in the cope-machine and is not of course provided with the recess $F^{18}$. Extending up from two of the arms $D^9$, Fig. 7, and on opposite sides of the machine are rods $F^{22}$. (Shown also in diagrammatic Figs. 118 to 126, inclusive.) The purpose of these rods is to lift the false flask off the flask proper when the sand gets the final pressure through the final upward movement of the patterns, while the flask remains stationary, as hereinafter explained. The necessity of moving this false flask off the flask proper is to enable the clamps whereby the bottom board is clamped to the flask to be placed in position.

The general operation of the drag-machine is briefly as follows: The flask is swung on by the crane-arm and lowered to its position in the machine, the trunnion of the flask striking the projection $E^3$ on the rod $E^2$, as in the cope-machine, thus dropping the outer false flask and the sand. As soon as this is accomplished the operator, if necessary, evens up the sand in the flask and then swings in an additional crane-arm $H^{55}$, (shown by dotted lines in Fig. 105 and also by dotted lines in Fig. 107.) This crane-arm carries the bottom board $F^{7-1}$ by means of a handle or eye $F^{7-3}$ on the top of the bottom board. As soon as the bottom board reaches its position over the false flask the operator allows still more air to escape from the cylinder which supports the crane-arm, and this permits the crane-arm to drop and lowers the bottom board onto the sand within the false flask. The bottom board is provided with recesses $F^{7-2}$, Fig. 104, and the false flask $C^{28}$ is provided with projections $C^{28-5}$ to fit in the recesses $F^{7-2}$, so that as the bottom board descends in the false flask it is properly registered and guided therein. In order to facilitate the accurate centering of the bottom board with respect to the false flask, I provide on the bottom of the bottom board, Fig. 103, a series of beveled projections $F^{7-4}$, and these striking the top edge of the false flask will accurately center the bottom board with respect thereto. As soon as the bottom board is placed the operator turns the valve to admit the fluid into the main cylinder $D'$, as in the cope-machine, and the pattern parts are lifted as in that machine. I will later describe these pattern parts and their function in forming the drag-section of the mold. Suffice at the present time to say that when the piston-head $D^4$ reaches its maximum height the mold has been formed. The upward movement of the pattern parts, as in the cope-machine, has operated the vent-pin mechanism and forced the vent-pins down into the mold, the vent-pins passing through suitable orifices in the bottom board, which register with the orifices in the pressure-plate. These orifices are tapered, as in the pressure-plate, to enable the pins to readily enter them. When the mold has been formed, the operator opens the valve to the cylinder controlling the vent-pin-operating mechanism and allows said mechanism to withdraw the vent-pins, as in the cope-machine, and this action trips the eccentric-shaft $D^{22}$, as in the cope-machine, and then opens the valve controlling the cylinder $D'$ and allows the parts to return to their normal position. Previously and before the operator has opened the valve to withdraw the vent-pins he clamps the bottom board to the flask by any suitable clamps, (not shown,) the false flask having been lifted off, as previously described, to permit this. The action of inserting the vent-pins into the mold has closed the lower sand-doors and has opened the upper sand-doors in the drag-machine, and the action of withdrawing the vent-pins closes the upper sand-doors, exactly as in the cope-machine. Thus we see that in the drag-machine there is substantially the same mechanism as in the cope-machine, except that certain mechanisms are dispensed with and the sand-reservoir is in the center of the machine.

*The patterns and the operation of forming the mold in the drag-machine.*—It will be remembered that in the cope-machine there were three sections $R'$, $R^2$, and $R^3$ of the pattern, together with the chill-support and the chill. In the drag-machine there are five sections of the pattern $T'$, $T^2$, $T^3$, $T^4$, and $T^5$. Now by reference to Figs. 7 and 8 and also diagrammatic Fig. 118, it will be seen that the section $T'$ of the pattern rests at the beginning upon the ring $M'$, which is a part of the frame $D^{15}$, through the projection $T^7$ on the pattern; that the section $T^2$ rests upon the ring $Q^2$, which is stationary with respect to the piston-head—that is, it moves only therewith; that the section $T^3$ is provided with a flange $T^6$, which at the beginning of the operation rests upon the ring $M^2$, which is a part of the frame $D^{15}$; that the section $T^4$ rests upon the ring $M^3$, which is a part of the frame $D^{15}$; that the section $T^5$ rests upon the ring $Q^3$, which is stationary with respect to the piston-head, and that the flask-support at the beginning of the operation rests upon the ring $D^{17-8}$, which is supported from the frame $D^{17}$. The arrangement of the parts as just described is also shown in diagrammatic Figs. 121 and 122, the former illustrating the parts before the flask is inserted and before the false flask is dropped and before the bottom board is inserted, while Fig. 122 shows the flask, false flask, and bottom board in place. The movement of the piston-head and frames $D^{17}$, $D^{15}$, and $D^{12}$ are exactly the same as in the cope-machine, the result being that at the first upward movement of the piston-head all the parts move for a distance in the same relation to each other as when they started, thus giving the preliminary pressure and compressing the sand at the top of the flask. This brings the bottom plate about half way down the false flask, as shown in Fig. 123. Thereupon the crank-shafts $D^{46}$ are tripped, thus allowing the frame $D^{15}$, and consequently the rings $M'$, $M^2$, and $M^3$ and the pattern parts carried thereby, to remain stationary with respect to the pressure-plate above, while the flask and the other pattern parts continue to advance toward the pressure-plate. This allows the sections $T'$, $T^3$, and $T^4$ to remain stationary with respect to the pressure-plate, while $T^2$ and $T^5$, (the low parts of the pattern,) together with the flask, move up to the position shown in Fig. 124. This brings the flask against the bottom board. Now a continued upward movement of the piston-head trips the crank-shaft $D^{21}$, and this permits the frame $D^{17}$, which carries the flask, and the frame $D^{15}$, which has been picked up by the ring $D^{43}$, to remain stationary with respect to the pressure-plate. Thus the sections $T'$, $T^3$, and $T^4$ continue to remain stationary with respect to the pressure-plate, with the flask also remaining stationary, while the sections $T^2 T^5$ continue to advance. This brings us to the position shown in Fig. 122. At this point the frame $D^{15}$ is picked up by the plate $D^{14}$ on the frame $D^{12}$. This advance to the position shown in Fig. 122 has brought the ring $P'$, which is on the frame $D^{12}$, up, so that it bears on the legs from the sections $T'$ $T^3$. Now the continued advance of the piston-head carries the sections $T'$ $T^3$, together with sections $T^5$ and $T^2$, upward, the only parts remaining stationary with respect to the pressure-plate being section $T^4$ and the flask. This brings us to Fig. 123, where the supporting-rings are all in alinement. This last movement to bring the parts in alinement has brought the frame $D^{12}$ up, so that the plate $D^{14}$ thereon will pick up the frame $D^{15}$, and now a continued advance carries upward the frame $D^{12}$, carrying the rings $P'$ $P^2$, the frame $D^{15}$ carrying the rings $M'$ $M^2$ $M^3$ and the stationary rings $Q'$ $Q^2$, while the flask still remains stationary. The last movement—namely, to the position shown in Fig. 124—now takes place, being, in other words, a final movement of the pattern, with the parts in their final position, toward the pressure-plate, with the flask remaining stationary, so that a final compression along the face of the pattern takes place. In stripping the first movement, as in the cope-machine, is to trip the eccentric-shaft $D^{22}$, thus allowing the frames $D^{12}$ and $D^{15}$ to drop away from the pressure-plate, or, in other words, lessen the distance between them and the piston-head. This drops the rings $P'$, $P^2$, $M'$, $M^2$, and $M^3$, and consequently would drop all the pattern parts except the portions $T^2$ $T^5$, which are held up against the mold to support it. The flask is also held stationary, since it during the final motion upward of the pattern mechanism has been picked up by the sectional ring $F'$ on the casing $D^3$. As soon as the parts above enumerated have been stripped the vent-pin-operating mechanism in its continued movement operates on the valve of the cylinder $D'$, as in the cope-machine, and exhausts the fluid in the cylinder and allows all of the parts to drop away, the crane-arm meanwhile having been swung in to pick up the flask with its accompanying bottom board, as shown in Fig. 126. When the flask has been removed from the machine, its position is reversed, or, in other words, it is turned upside down. The cope-flask is then placed upon it and the mold is complete, as shown in Fig. 127.

*Conclusion.*—I have now described completely both the cope-machine and also the same machine in all essential particulars for forming the drag portion of the mold. It will be seen from my description that I have produced a machine which is substantially automatic throughout in that from the time the flask is placed upon the crane at one side of the machine until it is delivered by the crane at the other side of the machine substantially every movement of the machine is automatic; one in which the sand is automatically measured and is fed through the pressure-plate, thereby securing an equal distribution throughout the flask; one in which the vent-pins are automatically and accurately inserted into the mold throughout, insuring perfect alinement and perfect height with respect to the pattern and insuring also a perfect stripping when withdrawn from the mold, and the stripping being in perfect alinement orifices left by the pins will be kept clear and will not fill in; one in which the sprues are automatically inserted and are perfectly stripped in withdrawing them; one in which one portion of the cope pressure-plate automatically strips another portion thereof; one in which the pattern and flask supporting mechanism are so arranged and manipulated that any desired pressure may be obtained in the mold above any desired point in the pattern irrespective of the relative heights of the different portions of the pattern; one in which a perfect stripping of the pattern from the mold is obtained; one in which the chaplets are protected from the sand throughout the formation of the mold; one in which the bottom board is carried into the machine, and one in which the false flask is automatically lifted off the flask to permit the bottom board to be clamped to the flask. One of the important features of my invention, however, is in the pattern and flask supporting mechanism. When this mechanism is carefully analyzed, it will be seen that by virtue of the fact that the patterns and flask can be directly supported either from the piston-head direct or from any one of three auxiliary supporting-frames and that those frames, through a suitable arrangement of tripping mechanism, can be made to either advance with the piston-head or be tripped at any desired time during the upward movement of the piston-head. This enables me to cause any particular part or parts of the pattern or the flask to be given any movement or succession of movements desired and to cease their movement at any desired period of the pressing operation, the result being that any desired article can be molded irrespective of the shape or configuration of the surface. Of course to adapt my machine to mold different articles the tripping mechanisms might have to be altered or adjusted, but obviously that can be done without departing from the spirit of my invention. I wish also to have it clearly understood that while I have in my present application shown stationary pressure mechanism above the flask and movable pressure mechanism below the flask I do not wish to be limited in this direction, so far as the broad features of my invention are concerned. The most essential object in a molding-machine is to secure a proper compression of the sand at every point in the mold irrespective of the shape or configuration of the pattern and the mold to be formed. Therefore, while my present arrangement of stationary upper pressure mechanism and movable lower pressure mechanism is perhaps preferable, yet, in reality, the real gist of the invention lies not in the movement of the pressure mechanism with respect to the frame of the machine, but in the movement of the various parts of the pressure mechanism with respect to each other and to the pattern and flask.

What I claim is—

1. A mold-forming machine comprising mechanism for first inserting the sprues into the flask; mechanism for next compressing the sand mechanism for next inserting the vent-pins, and mechanism connecting the above-named mechanisms for causing them to operate in the order named substantially as described.

2. A mold-forming machine comprising mechanism for first inserting the sprues into the flask; mechanism for next placing the sand in the flask mechanism for next compressing the sand, and mechanism connecting the above-named mechanisms for causing them to operate in the order named substantially as described.

3. A mold-forming machine comprising mechanism for first inserting the sprues into the flask; mechanism for next inserting the sand into the flask; mechanism for next compressing the sand mechanism for next inserting the vent-pins, and mechanism connecting the above-named mechanisms for causing them to operate in the order named substantially as described.

4. A mold-forming machine comprising mechanism for first inserting the sprues into the flask; mechanism for next compressing the sand; mechanism for next inserting the vent-pins; mechanism for next stripping the sprues from the completed mold mechanism for next stripping the vent-pins, and mechanism connecting the above-named mechanisms for causing them to operate in the order named substantially as described.

5. A mold-forming machine comprising mechanism for first inserting the sprues into the flask; mechanism for next inserting the sand into the flask; mechanism for next compressing the sand mechanism for next stripping the sprues from the mold, and mechanism connecting the above-named mechanisms for causing them to operate in the order named substantially as described.

6. A mold-forming machine comprising mechanism for first inserting the sprues into the flask; mechanism for next inserting the sand into the flask; mechanism for next compressing the sand, mechanism for next inserting the vent-pins; mechanism for next stripping the sprues from the mold mechanism for next stripping the vent-pins from the mold, and mechanism connecting the above-named mechanisms for causing them to operate in the order named substantially as described.

7. A mold-forming machine comprising mechanism for first inserting the sprues into the flask, mechanism for next placing the false flask onto the flask; mechanism for next compressing the sand, mechanism for next inserting the vent-pins; mechanism for next stripping the sprues from the mold mechanism for next stripping the vent-pins from the mold, and mechanism connecting the above-named mechanisms for causing them to operate in the order named substantially as described.

8. A mold-forming machine comprising mechanism for first inserting the sprues into the flask; mechanism for next placing the false flask onto the flask; mechanism for next introducing the sand into the flasks; mechanism for next compressing the sand; mechanism for next introducing the vent-pins into the mold; mechanism for next stripping the sprues; mechanism for next stripping the vent-pins mechanism for next removing the false flasks from the flask, and mechanism connecting the above-named mechanisms for causing them to operate in the order named substantially as described.

9. A mold-forming machine comprising mechanism for carrying the flask proper into the machine; mechanism for placing the outer false flask onto the flask proper; mechanism for inserting the sprues into the flask; mechanism for inserting a preliminary lot of sand into the flask; mechanism for placing the inner false flask onto the flask or runner-box; mechanism for introducing a second lot of sand into the flask; mechanism for compressing the sand to form the mold; mechanism for inserting the vent-pins into the mold, mechanism for stripping the sprues and mechanism for stripping the vent-pins, substantially as described.

10. A mold-forming machine comprising mechanism for carrying the flask proper into the machine; mechanism for placing the outer false flask onto the flask proper; mechanism for inserting the sprues into the flask; mechanism for inserting a preliminary lot of sand into the flask; mechanism for placing the inner false flask onto the flask or runner-box; mechanism for introducing a second lot of sand into the flask; mechanism for compressing the sand to form the mold; mechanism for inserting the vent-pins into the mold; mechanism for stripping the sprues; mechanism for stripping the vent-pins and mechanism for transferring the flask containing the mold from the machine, substantially as described.

11. The combination with a molding-machine flask, of a crane for handling said flask, consisting of arms, adapted to engage the trunnions of the flask and a catch located on the arm to hold the flask in a horizontal position, the engaging face of said catch being beveled to permit the catch to pass down past the engaging face of the flask when the flask has been deposited, substantially as described.

12. The combination with the flask, of a crane-arm for handling same, said crane-arm provided with two arms and each adapted to engage one of the trunnions of the flask, the end of each arm recessed to receive the trunnions, each arm provided adjacent to the recess with a vertical projection or stop, substantially as described.

13. In a molding-machine, the combination with a vertically-movable portion of the machine and an arm or projection thereon, of a crane-arm; a stationary part; a spring-catch on the arm; a vertically-movable shoulder on the stationary part over which the spring-catch engages, a lever pivoted to the stationary part and connected with the vertically-movable shoulder; said lever tilted by the projection on the vertically-movable portion and adapted thereby to move the shoulder out of engagement with the catch, substantially as described.

14. In a molding-machine, the combination with the flask proper, of a false flask, means for normally suspending it above the flask proper, mechanism for dropping said false flask onto the flask proper, and mechanism for moving upward together the false flask and flask proper, substantially as described.

15. In a molding-machine, the combination with the flask proper, of a false flask, means for normally suspending it above the flask proper, mechanism for dropping said false flask onto the flask proper, and mechanism for moving the false flask upward until engaged by said suspending mechanism, substantially as described.

16. In a molding-machine, a false flask engaged in its normal position by catches engaged to a stationary part of the machine and means for freeing said catches to release the flask and allow it to drop, substantially as described.

17. In a molding-machine, a flask, a false flask, means for suspending it in the machine above the flask proper and guide-rods between the false flask and a stationary part of the machine adapted to guide the false flask in its vertical movement, substantially as described.

18. In a molding-machine, the combination with the flask proper and the false flask adapted to be moved against the flask proper, of cushions for relieving the blow when the false flask is moved against the flask proper, substantially as described.

19. In a molding-machine, a false flask means for suspending it in the machine and permitting it to be dropped therein, and a cushion for relieving the blow of said drop, substantially as described.

20. In a molding-machine, the combination of the flask proper and a false flask means for suspending it above the same and permitting it to be dropped thereon, guide-rods engaged to the false flask and cushions adjacent to the guide-rods and adapted to engage a part of the same and thus cushion the blow of the descending flask, substantially as described.

21. In a molding-machine, the combination with the flask proper, of a false flask means for suspending it in the machine, guide-rods engaged to the flask and movable in a stationary part of the frame, fluid-cups adjacent to said rods and plungers on the rods adapted to enter the fluid-cups whereby the rods and consequently the flask are cushioned, by the cups, substantially as described.

22. In a molding-machine, the combination with the flask proper and the mechanism for lowering the same to its position in the machine, of a projection in the path of the descending mechanism adapted to be struck thereby, a false flask, mechanism for supporting the same in the machine and connections between the said supporting mechanisms and said projection whereby when the projection is moved by the descending mechanism, the false flask is released, substantially as described.

23. In a molding-machine, the combination with the flask proper adapted to be lowered to its position in the machine, of a false flask means for supporting it from the frame of the machine above the flask proper and mechanism for holding it normally in its upper position, a projection in the path of the descending mechanism and connections between said projection and the false-flask-suspending mechanism whereby as the flask proper is lowered to its position, it strikes said projection and releases the false flask and allows the latter to drop onto the flask proper, substantially as described.

24. In a molding-machine, the combination with a pressure-plate provided with an opening, of a sand-delivery chute adjacent to said opening to deliver the sand through the opening, substantially as described.

25. In a molding-machine, the combination with a pressure-plate provided with an opening in its center, of a sand-delivery chute adjacent to said opening to deliver the sand therethrough, substantially as described.

26. In a molding-machine, the combination with the flask proper; mechanism for carrying the same to its position in the machine and a projection in line with said flask mechanism adapted to be struck and moved thereby, of a sand-reservoir one or more doors or valves controlling the discharge from the same; a vertically-movable sprue and mechanism for engaging it in its upper position; a vertically-movable false flask and mechanism for engaging it in its upper position and connections between said projection and the false-flask-engaging mechanism, the sprue-engaging mechanism, and the sand-reservoir discharge mechanism, whereby a movement of the projection operates to discharge the sand and move the false flask and sprue, substantially as described.

27. In a molding-machine, an outer false flask and an inner false flask, each vertically movable in the machine, and mechanism for guiding each in the vertical movement, substantially as described.

28. In a molding-machine, an outer false flask and an inner false flask, each vertically movable in the machine and each provided with guide-rods for guiding their movement, substantially as described.

29. In a molding-machine, the combination with the flask proper and its runner-box of an inner false flask adapted to move vertically in the machine, said flask being of substantially the same diameter as the runner-box on the flask proper and adapted to rest thereon when in its lower position and guide mechanism for guiding said inner false flask in its movement in the machine, substantially as described.

30. In a molding-machine, the combination with the flask proper and its runner-box, of an inner false flask adapted to move vertically in the machine, said flask being of substantially the same diameter as the runner-box, adapted to rest thereon when in its lower position, guide mechanism for directing its vertical movement and catch mechanism for engaging it in its upper position, substantially as described.

31. In a molding-machine, the combination of an outer and an inner false flask, mechanism for engaging the inner flask in its upper position and mechanism for releasing said engaging mechanism to allow the flask to drop, substantially as described.

32. In a molding-machine the combination with the vertically-movable pattern mechanism, the flask proper and its runner-box, of one or more sprues and means for temporarily suspending them above the pattern mechanism and a false flask surrounding the sprues and adapted to be dropped onto the runner-box, substantially as described.

33. In a molding-machine, the combination with the pressure mechanism provided with an opening in the center thereof, of mechanism engaged above said pressure mechanism and adapted to drop down and close said opening, substantially as described.

34. In a molding-machine, the combination with the pressure mechanism provided with an opening in the center thereof, of a plunger engaged above said pressure mechanism, adapted to drop down and close said opening and adapted to be pushed up by the upward movement of the pattern mechanism, substantially as described.

35. In a molding-machine, the pressure mechanism having an opening in the center, of a plunger engaged above said opening, adapted to be dropped down to close the opening and stop mechanism adapted to engage said plunger and arrest its upward movement and thus cause it to act as a part of the pressure mechanism, substantially as described.

36. In a molding-machine, the combination of a plunger, a pressure-ring through which the plunger slides and a pressure-plate provided with an opening through which the plunger passes, substantially as described.

37. In a molding-machine, the combination of the plunger, a pressure-ring through which the plunger slides and a pressure-plate provided with an opening through which the plunger passes, of stop mechanism adapted to engage the plunger in its upward movement whereby the pressure-plate, pressure-ring and plunger together constitute the pressure mechanism, substantially as described.

38. In a molding-machine, the combination with the flask its runner-box and vertically-movable pattern mechanism, of a plunger suspended in the machine above the pattern mechanism and constituting a pressure-plate for the runner-box and adapted when released to drop, said plunger constructed and arranged to be moved up by the upward movement of the pattern mechanism and mechanism adapted to engage said plunger in its upward movement and stop the same and to withdraw the plunger when the pressure has been completed, substantially as described.

39. In a molding-machine, the combination with a vertically-movable flask and its runner-box, of a plunger constituting a pressure-plate for the runner-box and mechanism for engaging the plunger in its upper position and hand mechanism for tripping said engaging mechanism to allow the plunger to drop, said plunger adapted to be moved upward by the upward movement of the flask, substantially as described.

40. In a molding-machine, the combination with the flask, the runner-box the plunger constituting a pressure-plate for the runner-box and mechanism for engaging the plunger in its upper position, said plunger adapted when released to drop, of a cushion for receiving the blow of the descending plunger, substantially as described.

41. In a molding-machine, the combination with the flask, the runner-box a vertically-movable plunger constituting a pressure-plate for the runner-box and mechanism for engaging the plunger in its upper position, said plunger adapted when released to drop, of a spring-cushion to receive the blow of the descending plunger, substantially as described.

42. In a molding-machine, the combination with the flask, the runner-box a vertically-movable plunger constituting a pressure-plate for the runner-box and mechanism for engaging the plunger in its upper position, said plunger adapted when released to drop, of a vertically-adjustable cushion to receive the blow of the descending plunger, substantially as described.

43. In a molding-machine, the combination with the flask and its runner-box of a vertically-movable plunger constituting a pressure-plate for the runner-box and mechanism for engaging the plunger in its upper position, a vertically-movable false flask and mechanism for engaging it in its upper position and hand mechanism connected with both said engaging mechanisms whereby a movement of the hand mechanism releases both the plunger and false flask, substantially as described.

44. In a molding-machine, the combination with the flask and runner-box, of pressure mechanism for the runner-box consisting of a ring or plate having an opening, a plunger adapted to fill the same, said ring and plunger adapted to enter the runner-box and said ring provided on its under side adjacent to the wall of the runner-box with a depending flange, substantially as described.

45. In a molding-machine, the combination with the flask and runner-box, of pressure mechanism for the runner-box consisting of a ring or plate having an opening, a plunger adapted to fill the same, said ring and plunger adapted to enter the runner-box and said ring provided on its under side adjacent to the wall of the runner-box with a depending flange, and with another depending flange adjacent to the plunger, substantially as described.

46. In a molding-machine, the combination with the flask, and its runner-box, of pressure mechanism therefor, consisting of a pressure-plate adapted to enter the flask and provided with an opening in line with the runner-box, a ring or plate having an opening, a plunger adapted to fill the same, said ring and plunger adapted to enter the runner-box and said ring provided on its under side adjacent to the wall of the runner-box with a depending flange, substantially as described.

47. In a molding-machine, the combination with the flask and its runner-box, of pressure mechanism therefor, consisting of a pressure-plate adapted to enter the flask and provided with an opening in line with the runner-box, a ring or plate having an opening, a plunger adapted to fill the same, said ring and plunger adapted to enter the runner-box and said ring provided on its under side adjacent to the wall of the runner-box with a depending flange, and with another depending flange adjacent to the plunger, substantially as described.

48. In a molding-machine, a main vertically-movable pressure mechanism, an auxiliary pressure mechanism carried thereby and movable vertically thereon, and engaging mechanism on a stationary part of the machine for actuating the auxiliary mechanism through the movement of the main mechanism, substantially as described.

49. A molding-machine comprising main vertically-movable pressure mechanism and two or more sets of auxiliary pressure mechanisms carried by said main pressure mechanism, each auxiliary mechanism movable vertically with respect to said main pressure mechanism and independent of each other, and engaging mechanism on a stationary part of the machine for actuating the auxiliary mechanism through the movement of the main mechanism, substantially as described.

50. In a molding-machine, a pattern and flask supporting mechanism consisting of a main vertically-movable portion carrying two or more sets of auxiliary supporting mechanisms, said auxiliary mechanisms movable with respect to the main portion, tripping mechanism for each of the auxiliary mechanisms for lessening the distance between the auxiliary mechanism and the main portion, and engaging mechanism on a stationary part to cause said tripping mechanism to operate, substantially as described.

51. In a molding-machine, a pattern and flask supporting mechanism consisting of a main vertically-movable portion carrying an auxiliary supporting mechanism and another auxiliary supporting mechanism supported by the first and mechanism for independently tripping each of the auxiliary mechanisms when desired to allow them to lessen the distance between themselves and between each and the main portion, substantially as described.

52. In a molding-machine, a pattern and flask supporting mechanism consisting of a main vertically-movable portion carrying two auxiliary supporting mechanisms independent of each other, one of said auxiliary mechanisms supporting a third auxiliary supporting mechanism and mechanism for independently tripping the said auxiliary supporting mechanisms at the desired time to allow the distance between the main portion and the respective auxiliary mechanisms to be lessened, substantially as described.

53. In a molding-machine, a flask and pattern supporting mechanism consisting of a main vertically-moving portion carrying two auxiliary supporting mechanisms, one of the said auxiliary supporting mechanisms carrying a third auxiliary supporting mechanism, mechanism for tripping the third auxiliary mechanism as the main portion moves upward, mechanism for tripping the auxiliary mechanism which carries said third auxiliary mechanism as the main portion moves up and mechanism for tripping the other auxiliary mechanism before the main portion moves down, substantially as described.

54. In a molding-machine, a flask and pattern supporting mechanism consisting of a vertically-movable portion, one or more supporting rings or parts carried directly by said portion and only movable therewith, a crank-shaft carried by said main portion, means for rocking the crank-shaft, a frame supported from said crank-shaft having one or more rings or parts for directly supporting the flask and pattern parts, said frame through the crank-shaft movable with respect to the main portion and another frame supported from another shaft carried by the main portion, said latter frame carrying one or more pattern and flask supporting parts and movable with respect to the main portion, substantially as described.

55. In a molding-machine, the combination with the flask and patterns, of mechanism for moving the same vertically consisting of a main vertically-movable portion and three frames carried thereby and movable independently thereof, one of said frames constructed and arranged to be directly supported alternately by the other two, substantially as described.

56. In a molding-machine, the combination with the flask and patterns, of mechanism for moving the same vertically consisting of three frames independent of each other, and mechanism for supporting two of the frames from the main portion but movably with respect thereto; and mechanism carried by one of the frames for supporting the third frame, said latter mechanism movable with respect to the frame which carries it, substantially as described.

57. In a molding-machine, the combination with the flask and pattern, of mechanism for moving the same vertically, consisting of a main vertically-movable portion, a crank-shaft carried thereby, said crank-shaft carrying a frame and the latter provided with pattern or flask supporting mechanism, an eccentric-shaft also carried by said main portion, said eccentric-shaft carrying a frame and the latter carrying a flask and pattern supporting rings or parts, another crank-shaft mounted in the frame on the first-named crank-shaft and a third frame carrying flask and pattern supporting rings or parts, said latter frame adapted to be alternately supported by the frame on the eccentric-shaft and by a ring carried on the second-named crank-shaft, substantially as described.

58. In a molding-machine, the combination with the flask and pattern, of mechanism for moving the same vertically, consisting of a main vertically-movable portion, a crank-shaft carried thereby, said crank-shaft carrying a frame and the latter provided with pattern and flask supporting mechanism, an eccentric-shaft also carried by said main portion, said eccentric-shaft carrying a frame and the latter carrying a flask and pattern-supporting rings or parts, another crank-shaft mounted in the frame on the first-named crank-shaft, a third frame-carrying flask and pattern-supporting rings or parts, said latter frame adapted to be alternately supported by the frame on the eccentric-shaft and by a ring carried on the second-named crank-shaft and one or more flask and pattern supporting rings or parts carried directly by the main portion and movable only therewith, substantially as described.

59. In a molding-machine, the combination with the flask and patterns, of mechanism for supporting same consisting of a movable frame $D^{17}$ two crank-shafts $D^{46}$, carried by said frame, a ring $D^{41}$ carried by said crank-shafts and a ring $D^{43}$ vertically adjustable in said frame, substantially as described.

60. In a molding-machine, the combination with the flask and patterns of mechanism for supporting same consisting of a movable frame $D^{17}$, a ring $D^{42}$, vertically adjustable on said frame $D^{17}$, two crank-shafts $D^{46}$ supported from said ring $D^{42}$, a ring $D^{41}$ supported from said crank-shafts and an adjustable ring $D^{43}$ carried by said ring $D^{42}$, substantially as described.

61. In a molding-machine, the combination with a pressure-plate and flask and means for moving one with respect to the other, of a pattern mechanism independent of the pressure-plate and composed of two or more parts, mechanism for simultaneously advancing said parts into the sand, mechanism for permitting one or more of the parts to cease their advance while one or more of the sections continue to advance and mechanism for finally advancing all the parts simultaneously, substantially as described.

62. In a molding-machine, the combination with a pressure-plate, a flask and two or more pattern parts independent of the pressure-plate, said flask movable with respect to the pressure-plate, of mechanism for moving one or more of the pattern parts into the flask while one or more of the parts remain stationary with respect to the flask and mechanism for picking up said stationary portion and moving it into the flask, substantially as described.

63. In a molding-machine, the combination with a pressure-plate, a flask and two or more pattern parts independent of the pressure-plate, said flask movable with respect to the pressure-plate, of mechanism for advancing one or more of the pattern parts into the flask while one or more of the pattern parts remain stationary with respect to the flask and mechanism for subsequently moving said stationary part of the pattern with the part previously moved while the flask remains stationary, substantially as described.

64. In a molding-machine, the combination with pressure mechanism, of a flask and two or more pattern parts, said flask supported independent from the pattern parts; mechanism for moving the flask and pattern parts toward the pressure mechanism and mechanism for permitting one or more of the pattern parts to stand still with respect to the pressure mechanism while the flask and one or more of the pattern parts continue to advance toward the pressure mechanism, substantially as described.

65. In a molding-machine, the combination with pressure mechanism, and a flask and means for moving it with respect to the pressure mechanism, of a pattern independent of the pressure mechanism and composed of two or more parts, mechanism for advancing the pattern parts toward the pressure mechanism and mechanism for allowing one or more of said pattern parts to cease its movement with respect to the pressure mechanism while the other part or parts still advance toward it, substantially as described.

66. In a molding-machine, the combination with pressure mechanism and the flask, of a pattern composed of one or more parts, mechanism for moving the pattern, flask and pressure mechanism each with respect to the other to create a pressure; mechanism for allowing one or more of said pattern parts to cease its movement with respect to the pressure mechanism while the flask and pressure mechanism move with respect to each other and mechanism for allowing the flask to stand still with respect to the pressure mechanism while the pattern and pressure mechanism move with respect to each other, substantially as described.

67. In a molding-machine, the combination with pressure mechanism, of a flask and two or more pattern parts; mechanism for raising simultaneously the flask and pattern parts toward the pressure mechanism; mechanism for permitting one or more parts of the pattern to cease its upward movement while one or more parts of the pattern and the flask continue to move upward; mechanism for permitting the flask to cease its upward movement while one or more of the pattern parts continue to move upward and mechanism for moving all the pattern parts upward while the flask remains stationary with respect to the pressure mechanism above, substantially as described.

68. In a molding-machine, the combination with pressure mechanism, of a flask and three or more pattern parts; mechanism for raising simultaneously the flask and pattern parts toward the pressure mechanism; mechanism for permitting two or more of the pattern parts to remain stationary with respect to the pressure mechanism while one or more of the pattern parts and the flask move upward; mechanism for permitting the flask to cease its upward movement while one or more of the pattern parts continue to move upward and mechanism for picking up the other pattern parts and moving all of them simultaneously while the flask remains stationary, substantially as described.

69. In a molding-machine the combination with stationary depending pressure mechanism, of a flask and two or more pattern parts, said flask and each of said parts each mounted independently of the other and mechanism for moving each of said parts and flask vertically with respect to the pressure mechanism and independently of each other, substantially as described.

70. In a molding-machine, the combination with vertically-movable flask and pattern supporting mechanism and a shaft carried by said vertically-movable mechanism, said shaft provided with means for actuating said flask or pattern, of an arm on said shaft and a stop on the frame of the machine whereby the arm and shaft are tilted as the mechanism ascends, substantially as described.

71. In a molding-machine, the combination with vertically-movable flask and pattern supporting mechanism, of a crank-shaft carried by said mechanism, another crank-shaft carried by said first-named crank-shaft and carrying the flask or a pattern, arms on each of the crank-shafts and stop mechanism on the frame whereby each of said shafts is tilted as the mechanism moves upward, substantially as described.

72. In a molding-machine, the combination with vertically-movable pattern and flask supporting mechanism, of at least two shafts carried by said mechanism each of said shafts provided with means for actuating said flask or pattern mechanism, and an arm on each shaft adapted as the mechanism and shafts move vertically to contact with a stationary portion and thus tilt each shaft, substantially as described.

73. In a molding-machine, the combination with vertically-movable flask and pattern supporting mechanism, of a shaft carried by said mechanism, said shaft provided with means for actuating said flask or pattern mechanism, an arm on the shaft, a stationary stop for tilting said arm as the mechanism ascends and means to engage the arm and revolve the shaft back to its normal position as the mechanism descends, substantially as described.

74. In a molding-machine, the combination with vertically-movable flask and pattern supporting mechanism, of a shaft carried by said mechanism, said shaft provided with means for actuating said flask or pattern mechanism, an arm on said shaft, provided with a segment-gear, stop mechanism carried by the frame to engage the arm and tilt it as the mechanism ascends and a rack carried by the frame to engage the segment and return the shaft to its normal position as the mechanism descends, substantially as described.

75. In a molding-machine, the combination of the flask and a plate carrying a series of vent-pins, said flask and plate movable with respect to each other and mechanism for adjusting each of said pins vertically in said plate, substantially as described.

76. In a molding-machine, the combination with a vent-pin frame carrying a series of vent-pins adjustable with respect to the frame, of mechanism for positively forcing said vent-pins into and withdrawing them from the sand, substantially as described.

77. In a molding-machine, the combination with a pressure-plate, of a vent-pin frame or plate carrying a series of vent-pins adjustably supported in said frame, said pressure-plate provided with a series of orifices through which the vent-pins pass and strip, substantially as described.

78. In a molding-machine, the combination with a pressure-plate, of a vent-pin frame or plate carrying a series of vent-pins adjustably supported in said frame, said pressure-plate provided with a series of tapered orifices through which the vent-pins pass and strip, substantially as described.

79. In a molding-machine, the combination with a pressure-plate, of a vent-pin frame or plate carrying a series of vent-pins adjustably supported in said frame, said pressure-plate provided with a series of orifices, through which the vent-pins pass and strip and mechanism for positively moving the vent-pins vertically in both directions, substantially as described.

80. In a molding-machine, a vent-pin plate or frame carrying a series of vent-pins, said pins adjustably clamped in place by a series of strips and clamping-screws, substantially as described.

81. In a molding-machine, a vent-pin plate or frame carrying a series of vent-pins, said pins adjustably clamped in place by a series of tapered strips and clamping-screws, substantially as described.

82. In a molding-machine, the combination with vertically-movable pattern mechanism and a series of vertically-movable vent-pins, of mechanism for operating on the vent-pins to force them into the mold and mechanism between the pattern mechanism and the vent-pin-operating mechanism whereby a movement of the pattern mechanism operates the vent-pin-operating mechanism, substantially as described.

83. In a molding-machine, the combination with vertically-movable flask and pattern supporting mechanism, of a series of vent-pins and mechanism for forcing them into the mold and engaging mechanism on the vertically-movable flask and pattern supporting mechanism for throwing said vent-pin-operating mechanism into operation, substantially as described.

84. In a molding-machine, the combination with a vent-pin frame or plate, a series of vent-pins carried thereby of a fluid-cylinder, connections between the piston of said cylinder and the vent-pin plate for moving the plate vertically and mechanism on a movable part of the machine connected with the valve of said cylinder for moving said valve, substantially as described.

85. In a molding-machine, the combination with a series of vertically-movable vent-pins and mechanism for forcing them into the mold, of a sand-reservoir, one or more doors or valves controlling the outlet thereof and connections extending from said doors or valves to said vent-pin-operating mechanism whereby the motion of the latter closes the said sand doors or valves, substantially as described.

86. In a molding-machine, the combination with a series of vent-pins and mechanism for moving them vertically, of vertically-movable sprue-lifting mechanism adapted to engage the sprues and lift them out of the mold, and connections between said sprue-lifting mechanism and said vent-pin-operating mechanism whereby a movement of the latter moves the sprue-lifting mechanism, substantially as described.

87. In a molding-machine, the combination with the vent-pins and mechanism for moving them vertically, of plunger-engaging mechanism adapted to lift the plunger out of the mold, and connections between the plunger-lifting mechanism and the vent-pin-operating mechanism whereby the movement of the latter, moves the plunger-lifting mechanism, substantially as described.

88. In a molding-machine, the combination with a series of vent-pins and mechanism for moving them vertically, of a sand-reservoir and one or more doors or valves for controlling the outlet of the same, connections between said doors or valves and the vent-pin-operating mechanism whereby the motion of the latter closes the doors or valves, one or more sprues and mechanism adapted to engage the same and lift said sprue or sprues out of the mold, connections between said sprue-lifting mechanism and the vent-pin-operating mechanism whereby a movement of the vent-pin-operating mechanism, moves the sprue-lifting mechanism and a plunger, mechanism for engaging said plunger and lifting it out of the mold, connections extending from said plunger-lifting mechanism to the vent-pin-operating mechanism whereby a movement of the latter carries the plunger-lifting mechanism to its engaging position, the construction being such, that a movement of the vent-pin-operating mechanism to force the vent-pins into the mold closes the sand-reservoirs, doors or valves, moves the sprue-lifting mechanism and plunger-lifting mechanism to their engaging position, substantially as described.

89. In a molding-machine, the combination with a series of vent-pins and mechanism for moving them vertically, of a sand-reservoir, one or more doors or valves controlling the inlet to the same, and connections between the vent-pin-operating mechanism and said doors or valves, whereby a movement of the vent-pin-operating mechanism, moves the doors or valves, substantially as described.

90. In a molding-machine, the combination with a series of vent-pins, mechanism for moving the same vertically of two sand-reservoirs with one or more doors or valves controlling the passage between them and connections between said doors or valves and the vent-pin-operating mechanism whereby a movement of the latter closes said doors or valves, substantially as described.

91. In a molding-machine, the combination with a series of vent-pins and mechanism for moving the same vertically, of two sand-reservoirs, one or more doors or valves between the two, and one or more doors or valves governing the admission to the upper one and connections between said doors or valves and the vent-pin-operating mechanism, whereby a movement of the latter operates to close both said sets of doors or valves, substantially as described.

92. In a molding-machine, the combination with a series of vent-pins and mechanism for moving the same vertically of two sand-reservoirs, one above the other, one or more doors or valves between the two, one or more doors or valves governing the admission to the upper one, connections between said doors or valves and the vent-pin-operating mechanism, the sprue-lifting mechanism and connections to the vent-pin-operating mechanism, and the plunger-lifting mechanism and connections to the vent-pin-operating mechanism whereby a movement of the latter closes both sets of sand-doors and lifts both the sprue-lifting mechanism and plunger-lifting mechanism, substantially as described.

93. In a molding-machine, the combination of the flask, two or more pattern parts and mechanism for carrying them into the flask from below, mold-forming mechanism above the flask, mechanism above the flask for withdrawing therefrom the desired upper parts, and connections between said upper withdrawing mechanism and one or more of the pattern parts whereby a movement of said upper withdrawing mechanism operates to drop one or more of the pattern parts, substantially as described.

94. In a molding-machine, the combination with two or more pattern parts and mechanism for carrying the same into the mold, of a series of vent-pins and mechanism for operating the same vertically, and connections between said vent-pin-operating mechanism and the supporting mechanism for one or more of the pattern parts whereby a movement of the vent-pin-operating mechanism acts to move the pattern-supporting mechanism and drop one or more of the pattern parts away from the mold, substantially as described.

95. In a molding-machine, the combination of the flask, the pattern-lifting mechanism for carrying the pattern mechanism into the flask, mold-forming mechanism above the flask, mechanism above the flask for withdrawing therefrom the upper parts desired and connections between the upper withdrawing mechanism and the pattern-lifting mechanism whereby a movement of said upper withdrawing mechanism releases the pattern-lifting mechanism and allows it to drop, substantially as described.

96. In a molding-machine, the combination with mold mechanism having an engaging portion and means for reciprocating said mold mechanism of another set of mold mechanism and means for reciprocating it, said latter set of mechanism provided also with an engaging portion and switch mechanism adapted on one movement of the parts to bring the engaging portions in line with each other whereby the movement of one will move the other and on another movement of the parts to bring the engaging portions out of line so they will not engage each other, substantially as described.

97. In a molding-machine, the combination with two sets of mold mechanism each provided with means for reciprocating it in paths parallel with and adjacent to the other, of a stationary arm or projection on one set and a pivoted arm or projection on the other set and switch mechanism adapted to engage the pivoted arm and carry the latter alternately into and out of the path of the other projection, substantially as described.

98. In a molding-machine, the combination with a false flask, a bottom board adapted to slide therein and a series of vent-pins, of guide mechanism between the false flask and bottom board for guiding the bottom board in its movement within the false flask, said bottom board provided with orifices to permit the vent-pins to pass through it, substantially as described.

99. In a molding-machine, the combination with the false flask and a series of vent-pins of a bottom board adapted to move in the false flask and projections on one part adapted to enter recesses on the other part whereby the movement between the two is guided, said bottom board provided with orifices to permit the vent-pins to pass through it, substantially as described.

100. In a molding-machine, the combination with the vertically-movable flask and pattern-supporting mechanism and a false flask, of mechanism extending from the vertically-movable flask and pattern-supporting mechanism adapted to engage the false flask and lift it off the flask proper, substantially as described.

101. In a molding-machine, the combination with the flask and pattern-supporting mechanism and the false flask, of rods extending up from the flask and pattern-supporting mechanism, adapted to engage and lift the false flask at the latter end of the movement of the flask and pattern-supporting mechanism, substantially as described.

102. In a molding-machine, the combination with two or more pattern-supporting parts movable with respect to each other, of a pattern part provided with a bearing portion for each of the said pattern-supporting parts, substantially as described.

103. In a molding-machine the combination of a false flask, a bottom board provided with orifices and adapted to move within the false flask, a series of vent-pins and mechanism for moving the pins into and out of the false flask through the bottom board, substantially as described.

104. In a molding-machine, the combination with the flask proper, mechanism for carrying the same to its position in the machine and an engaging portion in line with said flask mechanism adapted to be struck and moved thereby, of a sand-reservoir and means for controlling the discharge from the same, a vertically-movable false flask and mechanism for engaging it above the flask proper and connections between the above-named engaging portion, the false-flask-engaging mechanism and the sand-reservoir-discharge mechanism whereby a movement of said engaging portion operates to discharge the sand and release the false flask, substantially as described.

105. In a molding-machine, the combination with a flask and mechanism for moving it to its position in the machine, of a false flask; mechanism for engaging said false flask in its upper position; a vertically-movable sprue and mechanism for engaging it in its upper position; an engaging portion in the path of the flask mechanism adapted when struck by the flask mechanism to be moved; and connections between said sprue-engaging mechanism, said false-flask-engaging mechanism and said engaging portion, whereby a movement of the flask mechanism releases the false flask and sprue, substantially as described.

106. In a molding-machine, a sand-reservoir provided with one or more doors or valves through which the sand is discharged, mechanism engaging said doors or valves when closed; a vertically-movable plunger and mechanism for engaging it in its upper position; a flask and its runner-box; said plunger constituting a pressure-plate for the runner-box; a vertically-movable false flask and mechanism for engaging it in its upper position and connecting mechanisms between all said three engaging mechanisms whereby a movement of the connecting mechanism will release all said parts, substantially as described.

107. A mold-forming machine, comprising mechanism for placing the outer false flask onto the flask proper; mechanism for inserting the sprues into the flask; other mechanism for placing the inner false flask onto the flask or runner-box; mechanism for introducing the sand; mechanism for compressing the sand to form the mold; mechanism for inserting the vent-pins into the mold and mechanism for stripping the sprues, vent-pins and patterns from the mold, substantially as described.

108. A mold-forming machine comprising mechanism for placing the outer false flask onto the flask proper; mechanism for inserting the sprues into the flask; mechanism for inserting the sand into the flask; other mechanism for placing the inner false flask onto the flask or runner-box; mechanism for compressing the sand to form the mold; mechanism for inserting the vent-pins into the mold; mechanism for stripping the sprues and mechanism for stripping the vent-pins, substantially as described.

109. In a molding-machine, the combination with the flask and mechanism for moving it to its position in the machine, of a projection in the path of the descending mechanism adapted to be struck thereby, a vertically-movable sprue; mechanism for engaging said sprue in its upper or normal position and connections between said sprue-engaging mechanism and said projection whereby the descent of the flask releases the sprue, substantially as described.

110. In a molding-machine, the combination with the flask and mechanism for moving it to its position in the machine, and a projection in the path of said flask mechanism, adapted to be struck thereby, of a sprue and mechanism engaging said sprue, and connections between said mechanism and said projection whereby a movement of said projection moves the said sprue, substantially as described.

111. In a molding-machine, the combination with the flask and mechanism for moving it to its position in the machine, vertically-movable pattern mechanism and a vertically-movable sprue adapted to drop down and rest on the pattern and to be carried up thereby, of mechanism for engaging the sprue when carried up by the pattern mechanism to lift the sprue to its maximum height, a projection in the path of the flask mechanism; connections between said projection and the sprue-lifting mechanism whereby the descending flask mechanism releases the sprue and allows it to drop on the pattern mechanism, substantially as described.

112. In a molding-machine, the combination with the flask and mechanism for moving it to its place in the machine, of a sand-reservoir provided in its lower end with one or more doors or valves through which the sand is discharged, a projection in line with the flask mechanism adapted to be struck thereby, and connections between the projection and the sand-doors for opening the latter, substantially as described.

In testimony whereof I sign this specification in the presence of two witnesses.

HARRY C. COOPER.

Witnesses:
JOHN H. GLENDENING,
JOSEPH M. WEBER.